(12) United States Patent
Reik et al.

(10) Patent No.: US 6,230,862 B1
(45) Date of Patent: May 15, 2001

(54) ACTUATING ARRANGEMENT

(75) Inventors: Wolfgang Reik; Norbert Esly, both of Bühl (DE)

(73) Assignee: LuK Getriebe-Systeme GmbH, Bühl/Baden (DE)

( * ) Notice: Subject to any disclaimer, the term of this patent is extended or adjusted under 35 U.S.C. 154(b) by 0 days.

(21) Appl. No.: 09/368,001

(22) Filed: Aug. 3, 1999

Related U.S. Application Data

(62) Division of application No. 08/815,348, filed on Mar. 11, 1997, now Pat. No. 5,967,939, and a continuation of application No. PCT/DE96/01292, filed on Jul. 11, 1996.

(30) Foreign Application Priority Data

Jul. 12, 1995 (DE) .............................................. 195 25 331

(51) Int. Cl.⁷ .................................................. B60K 41/22
(52) U.S. Cl. .......................... 192/3.56; 74/335; 74/337.5
(58) Field of Search .............................. 192/3.56; 74/335, 74/337.5

(56) References Cited

U.S. PATENT DOCUMENTS

| | | | | |
|---|---|---|---|---|
| 1,893,644 | * | 1/1933 | Fleischel | 192/3.56 X |
| 4,567,969 | * | 2/1986 | Makita | 192/3.56 |
| 4,739,864 | * | 4/1988 | Numazawa et al. | 192/3.56 |
| 4,938,088 | * | 7/1990 | Langley et al. | 74/335 |
| 5,219,391 | * | 6/1993 | Edelen et al. | 74/335 |
| 5,743,143 | * | 4/1998 | Carpenter et al. | 74/335 |

* cited by examiner

Primary Examiner—Rodney H Bonck
(74) Attorney, Agent, or Firm—Darby & Darby

(57) ABSTRACT

The actuating arrangement includes a torque transmitting system that includes a first device for initiating, discontinuing or regulating the transmission of torque. A transmission includes a second device for initiating a gear shifting operation within one of a plurality of gear shifting paths. The transmission further includes a third device for initiating the gear ratio selecting operation among the gear shifting paths. An electronic control unit is operatively connected to at least one actor. The at least one actor activates in a predetermined manner, one of the first device, second device and third device for the initiation of the transmission of torque, gear shifting or gear ratio selecting operation.

47 Claims, 31 Drawing Sheets

ACTUATING ARRANGEMENT

This is a division of application Ser. No. 08/815,348, filed Mar. 11, 1997 now U.S. Pat. No. 5,967,939, and a continuation of PCT/DE96/01292, filed Jul. 11, 1996. Each of these prior applications is hereby incorporated herein by reference, in its entirety.

BACKGROUND OF THE INVENTION

1. Field of the Invention

The invention relates to actuating arrangements, particularly for motor vehicles with an engine, a torque transmitting system such as a friction clutch, and a transmission such as for example a change speed gear.

The invention further relates to a method of initiating, such as controlling or regulating, the actuation of a torque transmitting system and/or of a transmission for automated operation of these aggregates.

2. Discussion of the Related Art

Such actuating arrangements serving the purpose of automated actuation of transmissions and/or clutches exhibit the advantage of a comfortable gear shifting and/or clutch actuating operation which can be initiated by the driver of the vehicle, such as particularly a passenger car or a truck, or is started automatically on the basis of an implemented program due to operating conditions and the values of operational parameters.

Such actuating arrangements became known for automated initiation of the automated gear shifting and gear ratio selecting operation of a change speed gear.

These actuating arrangements, which are especially suitable to automate the gear shifting and the gear ratio selecting operations, comprise an actor, such as a hydraulic cylinder, for each of the gear shifting and gear ratio selecting operations so that the actuations for the purposes of gear shifting and gear ratio selecting can be carried out independently of each other. Furthermore, automated circuits require an additional actor which serves to actuate the clutch, i.e., a discrete actor is required for each of the actuating functions.

There is further known an actuating arrangement of the above outlined character which is designed to effect the initiation of the gear shifting and gear ratio selecting operations by way of shifting cylinders. Such shifting cylinders are disposed in the interior of the transmission.

For the purposes of a planned initiation of operation of a transmission, it can be of advantage to take into consideration protective functions or undertakings in the course of an automated gear shifting operation for the transmission ratios of the transmission. For example, such functions protect the transmission and/or the actuating arrangement from damage in the event of an erroneous actuation or for example during bringing of the gears into mesh. The present invention draws, in addition, attention to the earlier German application DE 19609924 the disclosure of which is hereby incorporated by reference, and is, therefore, to be considered unequivocally as forming part of the disclosure of the present application.

Furthermore, it can be of advantage in accordance with the invention if the aforementioned torque transmitting system is to be actuated, for example, in accordance with the torque follow-up method. The torque follow-up method determines the selected transmissible torque essentially on the basis of the then existing engine torque and the transmissible torque, such as clutch torque, is disposed within the range of certain predeterminable tolerances below, at or above the actually prevailing engine torque. The present invention further relates to that disclosed in German aplication No. 19504847 the disclosure of which is also hereby incorporated by reference, and is, therefore, to be considered unequivocally as forming part of the present application.

SUMMARY OF THE INVENTION

An object underlying the present invention is to to provide arrangements of the above outlined character which can be produced with a relatively small outlay for parts and materials and which can be installed, in a simple manner and wise, on a transmission or a clutch bell for automated initiation of a gear shifting, gear ratio selecting and/or clutch actuating operation.

A further object of the invention is to provide an integrated actuating arrangement by means of which the operation of a transmissiom and of a torque transmitting system can be initiated in a planned manner.

A further object of the invention is to provide an actuating arrangement which reduces the number of actors as a result of the utilization of transfer gearings.

A further object of the invention is to provide an arrangement which can be constructed in a simpler manner due to the fact that it takes advantage of periodicities in the gear shifting and/or gear ratio selecting and/or clutch actuating operation and, as a result thereof, exhibits for example a smaller size so that it requires a smaller amount of space for installation.

It is a further object to provide an arrangement which is simple and can be constructed in an inexpensive manner.

In accordance with the invention, this is accomplished in an actuating arrangement of the above outlined character, especially for motor vehicles with an engine, a torque transmitting system such as a friction clutch, and a transmission, wherein the torque transmitting system comprises a first means for initiating and/or discontinuing the transmission of torque or for regulating the torque which can be transmitted by the torque transmitting system, and wherein the transmission comprises at least one second means for initiating the gear shifting operation within the gear shifting paths and, if necessary, a third means for the initiation of the gear ratio selecting operation between the gear shifting paths, in that an electronic control or regulating unit serves to operate at least one actor which is arranged to activate in a planned manner one of the three means for the regulation of the clutch actuating, gear shifting or gear ratio selecting operation.

Furthermore, it can be of advantage in an actuating arrangement of the above outlined character, particularly for motor vehicles with an engine, a torque transmitting system such as a friction clutch, and a transmission, wherein the torque transmitting system comprises a first means for initiating and/or discontinuing the transmission of torque or for regulating the torque which can be transmitted by the torque transmitting system, and wherein the transmission comprises at least one second means for initiating the gear shifting operation within the gear shifting paths and, if necessary, a third means for the initiation of the gear ratio selecting operation between the gear shifting paths, if an electronic control or regulating unit serves to operate two actors one of which is arranged to actuate in a planned manner two of the three means for the initiation of the clutch actuating, gear shifting and gear ratio selecting operations and the other of which is arranged to actuate in a planned manner the third means for the initiation of the clutch actuating, gear shifting and/or gear ratio selecting operation.

Furthermore, it can be of advantage if the electronic control or regulating unit actuates two actors one of which is arranged to actuate in a planned manner two of the three means for the initiation of the clutch actuating, gear shifting and/or gear ratio selecting operations and the other of which is arranged to actuate in a planned manner two of the three means for the initiation of the clutch actuating, gear shifting and gear ratio selecting operations.

In accordance with the invention, it is of advantage if the first actor actuates the means for coupling and selecting, and the second actor actuates the means for coupling and shifting.

In accordance with the invention, it is also of advantage if the first actor actuates the means for shifting and selecting, and the second actor actuates the means for coupling and shifting.

Furthermore, it is of advantage in accordance with the invention if the first actor actuates the means for coupling and selecting, and the second actor actuates the means for shifting and selecting.

Furthermore, it can be of advantage if an electronic control or regulating apparatus initiates the operation of an actor which actuates in a planned manner the three means for the initiation of the clutch actuating, shifting and/or selecting operation.

Still further, this is accomplished in accordance with the present invention in that the torque transmitting system comprises a first means for initiating and/or discontinuing the transmission of torque or for regulating the torque which can be transmitted by the torque transmitting system, and in that the transmission comprises at least one shaft, such as a shifting/selecting shaft, which is actuated to select or to shift within the gear shifting gate, there being a second means for the initiation of the shifting operation within the gear shifting paths and a third means for the initiation of the gear ratio selecting operation and for engaging the gearing of the transmission, an electronic control or regulating unit serving to operate one actor which actuates at least two of the means to initiate the clutch actuating, gear shifting or gear ratio selecting operation.

Furthermore, it can be of advantage if an electronic control or regulating unit with a central calculator or computer control serves to operate a first actor and a second actor, the first actor serving to actuate two of the three means for the initiation of the clutch actuating, gear shifting and gear ratio selecting operations, and the second actor serving to actuate that one of the means for the initiation of the clutch actuating, gear shifting or gear ratio selecting operations which is not actuated by the first actor.

In accordance with the inventive concept, it can be of advantage if, in addition to at least two of the three functions, such as actuation of the clutch, gear shifting operation and gear ratio selecting operation, the actuating arrangement also carries out additional actuations in an automated manner.

It can be of advantage if a first actor initiates the gear shifting and gear ratio selecting operations and a second actor initiates the clutch actuating operation. It can also be of advantage if a first actor initiates the clutch actuating and the gear shifting operations, and a second actor initiates the gear ratio selecting operation. Analogously, it can be of advantage if a first actor initiates the clutch actuating and the gear ratio selecting operations, and a second actor initiates the gear shifting operation.

In accordance with a further embodiment of the invention, it can be of advantage if the actuation or the initiation of operation of the clutch and of the gear shifting or gear ratio selecting procedure by means of an actor is arranged in such a way that, basically, the design of the actor determines a preselected timely sequence of actuation of the discrete means, such design including for example the configuration of cam discs or geneva movements.

In accordance with the inventive concept, it can be of advantage if, in actuating arrangements of the above outlined character, the initiation of the gear shifting and of the gear ratio selecting operations by way of at least one actor is carried out in such a way that the gear shifting into different ratios takes place in a sequential manner.

Furthermore, it can be of advantage if, by resorting to actuating arrangements of the above outlined character, the initiation of the gear shifting and gear ratio selecting operations and the design of the at least one actor are realised in such a way that one ensures or renders possible a shifting from one active gear ratio into any other active gear ratio.

In accordance with the inventive concept, it is advisable if, in actuating arrangements with at least one first actor and a driving element, such as for example a motor or electric motor, the actor converts by way of at least one transfer gearing a driving movement of the driving element into movements of at least two of the means for the initiation of the clutch actuating, gear shifting or gear ratio selecting operation.

Still further, it can be of advantage if the transfer gearing for the initiation of at least one of the clutch actuating, gear shifting or gear ratio selecting operation is a cam gearing, a disc cam mechanism or a geneva movement, or a slider crank or a lifting crank assembly or a worm gearing or a planetary.

Analogously, it can be of advantage if at least one transfer gearing is a unidirectionally acting cam gearing. Still further, it can be of advantage if at least one of the transfer gearings is a cam gearing with a form-locking coupling or with a restricted guidance. Under such circumstances, it can be of advantage if the form-locking coupling is realised, for example, by way of a lever arranged to enter a groove.

Furthermore, it can be of advantage if, in the novel actuating arrangement, at least one of the means for initiating the clutch actuating, gear shifting or gear ratio selecting operation is actuated by a cam gearing defining an axial cam track or a radial cam track to effect a translatory or pivotal movement of a pivotable arm or a pusher, such as for example a lever which is provided with a roller. It can also be of advantage if the cam gearing is designed in such a way that a roller travels on of at a cam track or along a plate to initiate the movement of a means for triggering the operation of the clutch or the transmission in response to axial or radial displacement.

In accordance with the inventive concept, it can be of advantage if a driving movement, such as rotation, threading or pushing, is converted by way of a transfer gearing into an actuating movement for coupling and/or switching and/or selecting, and the kinematics of the actor determine the characteristics of the actuation. The kinematics of the actor can encompass periodicities which are carried out during the performance of the clutch actuating, gear ratio selecting or gear shifting operations. If the automatised procedures involve repeatedly recurring systematics, it is possible to introduce planned or predetermined interruptions in order to achieve the periodocities which are knowingly taken advantage of and applied by resorting to the kinematics of the actor.

In accordance with the inventive concept, it can be of advantage if the sequence of functions for the initiation of at least two of the operations including coupling, shifting or selecting is carried out by a hydrostatic assembly in that a displacement of a piston, which displacement is controlled by way of ports as a function of the distance covered by the piston, serves for example for the actuation of the clutch and for the gear shifting operation.

Analogously, it can be of advantage if the initiation of at least two of the functions such as coupling, gear shifting and gear ratio selection is carried out by resorting to a hydraulic assembly with suitable valves which are activatable to respectively initiate the actuation of the clutch, the gear shifting or the gear ratio selecting operation. Furthermore, it can be of advantage if the schematic mode of operation to carry out the clutch actuating, gear shifting and/or gear ratio selecting operation can be imaged at the periphery or in the axial dirrection of a cylinder, either periodically or in series, and is carried out in response to the setting in motion of the cylinder either in a cirumferential direction or axially to thus initiate the operation of the clutch and of the transmission with a sequentially proper periodicity.

For example, the term sequentially proper periodicity is to denote that, in response to an initiation of the clutching operation and of the gear shifting operation, an actuation of the clutch for the purpose of disengagement takes place ahead of an actuation to select a particular gear ratio and, once the gear shifting operation is completed, there again takes place an engagement of the clutch. Thus, a sequentially proper actuation can be as follows: disengaging the clutch—shifting into neutral—eventual change of paths as a result of a gear ratio selecting operation—shifting into a gear engaging the clutch.

In accordance with a further embodiment of the invention, it can be of advantage if, by taking advantage of the periodocities for the the initiation of the clutching, shifting or selecting operation, one can avoid the utilization of plural control cams by repeatedly tracking a single control cam.

An advantage of the novel actuating arrangement can be that, by taking advantage of periodicities in the initiation, it is possible to employ smaller actorics or a smaller actuating arrangement which occupy or occupies a smaller amount of space.

As a result of a further inventive concept, the actuating arrangement for the initiation of the operation of a transmission and/or a clutch for the automation of the shifting, selecting and clutching operations can be installed outside of the transission and, for the purpose of actuation, extends into the transmission to act for example upon the gear shifting/ratio selecting shaft by way of transfer means.

Accordingly, it can be of advantage if the distribution of actors and/or the location of the actuating arrangement is selected to be within or outside of the clutch bell but not within the transmission.

In accordacne with a further novel concept, it can be of particular advantage if the actor or actors and/or the actuating arrangement are or is arranged and coupled in such a way that it is possible to employ the actuating arrangement for the automation of a manually shiftable transmission without necessitating the carrying out of any basic alterations of the manually shiftable transmission.

Furthermore, it can be of advantage in connection with the novel arrangements of the above outlined character if the actuating arrangement can be installed on existing manually shiftable transmissions as an auxiliary component such as an add-on component part.

In accordance with a further inventive concept, it can be of advantage if an actuating arrangement is designed in such a way that there is provided at least one energy storing element as a force compensating and/or force assisting means to assist the actuating force of the at least one driving unit.

In accordance with an additional inventive concept, an actuating arrangement can preferably be designed in such a way that there is provided at least one energy storing element as a force compensating and/or force assisting means which assists the actuating force of the at least one driving unit by way of a cam profile. The present invention further refers to the earlier German application DE 19622643 the disclosure of which is hereby incorporated by reference, and is, therefore, to be considered unequivocally as forming part of the specification of the present application.

In accordance with the inventive concept, it can be of advantage to provide at least one sensoric unit which detects an actuating force and/or a value which is at least representative of a parameter, such as an actuation distance. The present invention is further related to that disclosed in the earlier German application DE 19622641 the disclosure of which is hereby incorporated by reference, and is, therefore, to be considered unequivocally as forming part of the disclosure of the present application.

Furthermore, in accordance with a further inventive concept, the actuating arrangement is preferably designed in such a way that elastic coponents are provided in a planned manner within the actuating arrangement and are stressed, for example, to compensate for tolerances in distance. The present invention is further related to that disclosed in the earlier German application DE 19613528 the disclosure of which is hereby incorporated by reference, and is, therefore, to be considered unequivocally as forming part of the disclosure of the present application.

Furthermore, it can be of advantage if a method of initiating the operation of a torque transmitting system with a control or regulating unit is realised in such a way that the vehicle begins to creep when the brake and the gas pedal are not actuated, when the transmission is shifted into a gear ratio other than neutral, and the prime mover is on. The present invention further relates to that disclosed in the earlier German application DE 19616055 the disclosure of which is hereby incorporated by reference, and is, therefore, to be considered unequivocally as forming part of the disclosure of the present application.

Furthermore, it can be of advantage to provide a method of initiating the operation of a torque transmitting system by way of a control or regulating unit according to which the operation of the torque transmitting system is controlled or regulated in such a way that, in the course of a starting operation, the engine torque being applied to the engine increases following an evaluating cycle. The present invention further relates to that disclosed in the earlier German application DE 19611147 the disclosure of which is hereby incorporated by reference, and is, therefore, to be considered unequivocally as forming part of that in the present application.

Furthermore, it can be of advantage if, in a novel method of initiating the operation of a torque transmitting system and/or of a transmission, wherein at least one control or regulating unit is in signal-transmitting communication with the electronics of an engine, the control or regulating unit initiates an increase/reduction of the engine torque when the vehicle is creeping. The present invention further relates to the earlier application DE 19621106 the disclosure of which is hereby incorporated by reference, and is, therefore, to be considered unequivocally as forming part of that in the present application.

Furthermore, it can be of advantage if a novel method of initiating the operation of a torque transmitting system and/or of a transmission wherein at least one control or regulating unit is in signal transmitting communication with an electronic unit of the engine electronics, is put to use in such a way that the control or regulating unit initiates an increase/reduction of the engine torque or of the rotational speed of the engine when the transmission is set into a gear other than a driving gear. Still further, the present invention relates to the earlier German application DE 19624008 the disclosure of which is hereby incorporated by reference, and is, therefore, to be considered unequivocally as forming part of that in the present application.

In accordance with a further inventive concept, it can be of advantage in a method of initiating the operation of a torque transmitting system and/or of a transmission for the utilization of an actuating arrangement if an initiation of operation is carried out by an actuating arrangement of the above outlined character.

BRIEF DESCRIPTION OF THE DRAWINGS

The invention will be explained with reference to an embodiment. There are shown in:

FIG. 17a to FIG. 17d gear shifting gates,

DETAILED DESCRIPTION OF THE PREFERRED EMBODIMENT

Figure 1:
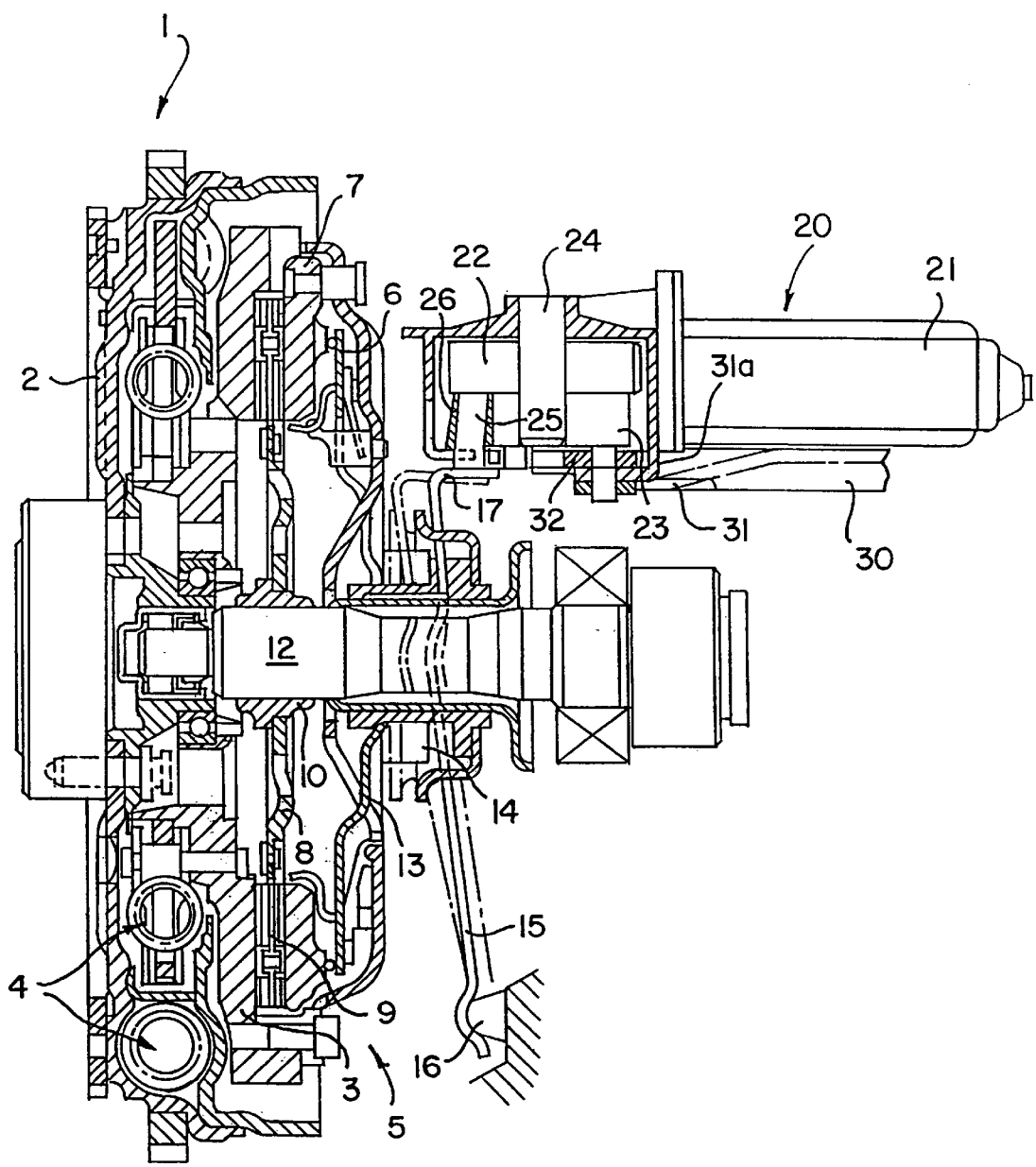
FIG. 1 a sectional view of an arrangement which embodies the invention.

FIG. 1 shows a composite flywheel 1 with a flywehel 2 at the primary side and a flywheel 3 at the secondary side as well as a torsional vibration damper 4 disposed in the power flow between the primary and secondary flywheels. A clutch 5, such as a friction clutch, is non-rotatably disposed at the secondary side 3 of the flywheel, for example by being secured by riveting, by threaded parts or by welding, together with a diaphragm spring 6, a pressure plate 7 and a clutch disc 8 with friction linings 9.

The torque which is being applied at the input side, for example, by a combustion engine is being transmitted from the primary side 2 of the split flywheel 1 by way of the torsional vibration damper 4 to the secondary flywheel 3 as well as to the pressure plate 7 of the clutch 5 whereby the friction linings 9 which are being frictionally engaged transmit the torque by way of the clutch disc 8 to an input part 12, such as the transmission input shaft, of a transmission at the downstream side thereof.

The diaphragm spring 6 is axially stressed in the axial direction in the region of its diaphragm spring tongues 13 for the purpose of initiating the engagement or disengagement as well as of controlling or regulating the magnitude of the torque which can be transmitted by the torque transmitting system 5 so that the pressure plate 7 is lifted off the friction linings 9 and can release the latter when the system 5 is disengaged. The radially inner portions of the tongues 13 of the diaphragm spring are being acted upon by a disengaging bearing 14 which, in turn, is actuated by a disengaging fork 15. The disengaging fork 15 is tiltably or pivotably mounted at a bearing location 16 and acts upon the disengaging bearing 14, and the region or portion 17 of the disengaging fork is actuated or moved by means of an actor 20.

The actor 20 comprises an electric motor 21 and a worm wheel transmission with a worm and a worm wheel 22, a cam disc 23 being disposed coaxially with the worm wheel 22. It is possible to make the worm wheel 22 and the cam disc 23 of one piece and to provide them with a radially inner receiving portion for a shaft 24.

In the region 17, the disengaging fork 15 comprises a receiving portion which is connected with a pin 25 that is urged against and tracks the cam disc 23. The biasing or urging of the disengaging fork 15 against the cam disc 23 takes place due to the prestressing of the diaphragm spring 6. The pin or follower 25 can be riveted, welded, calked or glued to the end portion 17 of the disengaging fork 15 or can be of one piece with the fork. A coating or jacket of low-friction material can be provided in the region of contact between the pin 25 and the cam disc 23.

The worm wheel 22 can be of one piece with the cam disc 23 or the two parts can be connected to each other. It is of particular advantage if the worm wheel 22 and the cam disc 23 constitute a one-piece synthetic plastic part, especially an injection molded part. It can also be of advantage if the worm wheel 22 is made of metal and the cam disc 23 is made of metal or a synthetic plastic material.

The actor 20 and its electric motor 21 can be installed externally of the transmission bell and the mechanism extends through an opening into the space within the transmission bell to initiate the operation of the clutch 5 as well as of the shifting/selecting shaft 30. The ratio changing gearing of the actor 20 can also be disposed externally of the bell and, in such instance, the actuation of the disengaging fork 15 and/or of the shifting/selecting shaft would take place by way of discrete linkages.

FIG. 1 further shows the shifting/selecting shaft, such as the shifting rod 30, which forms part of the transmission and the front portion 31a of which is provided with teeth 31. These teeth mesh with complementary teeth of a claw 32 which effects the axial displacement of the shifting/selecting shaft 30 by way of a transmission not unlike a geneva movement or a cam disc.

Figure 2A:
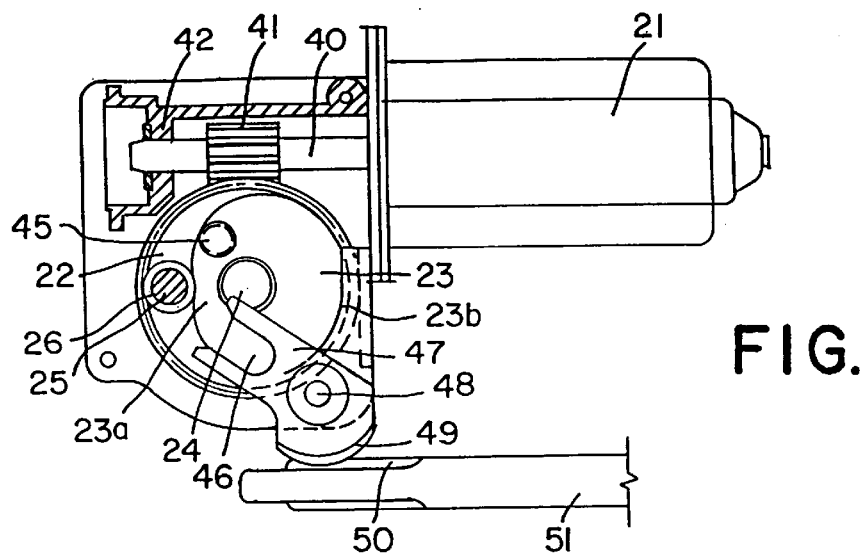
FIGS. 2a–2c an actor in section.
Figure 2B:
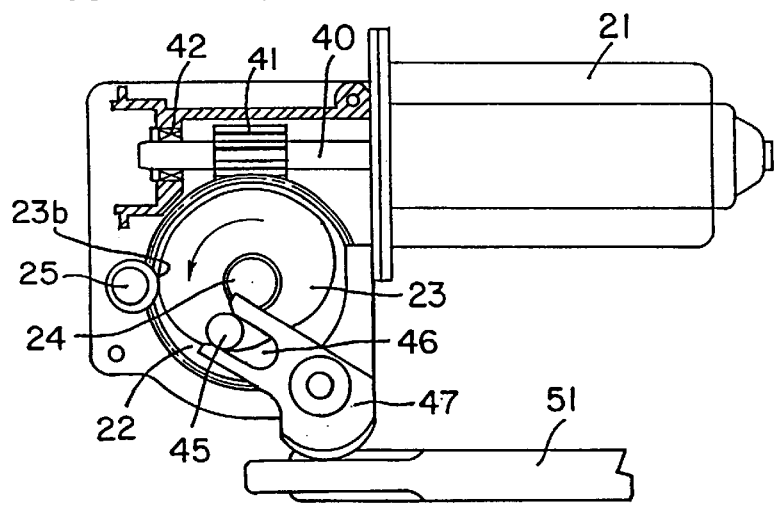
Figure 2C:
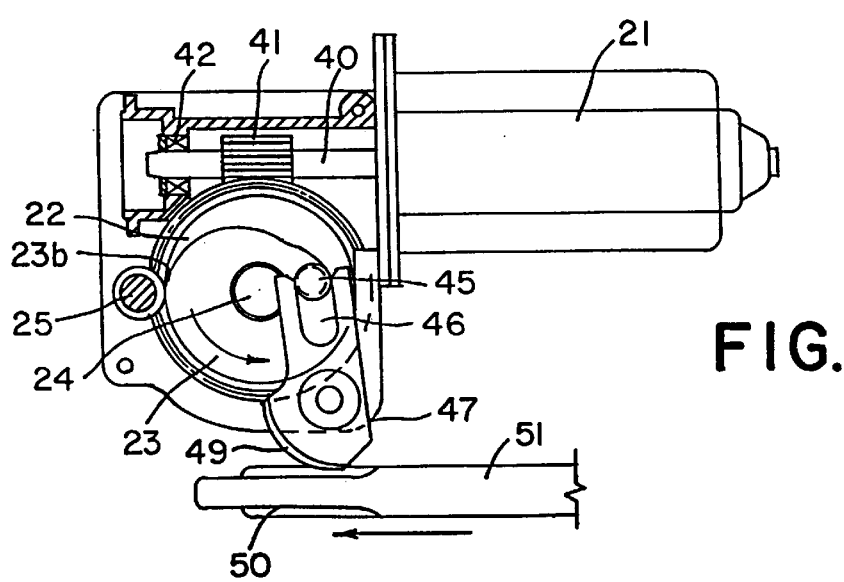

The FIGS. 2a to 2c illustrate the novel actuating arrangement in section, there being shown the electric motor 21, its output shaft 40 and the worm 41. There is further provided a bearing 42 for the shaft 40 of the electric motor 21. The worm wheel 22 meshes with the worm 41 and is rotatably mounted by means of a shaft 24.

The cam disc 23 is rotatably mounted on the shaft 24 and includes a portion 23a of smallest radius as well as a portion 23b having a maximum radius. The radius increases basically continuously between the portions 23a and 23b.

In accordance with a further embodiment of the invention, the cam disc 23 can include portions which are located between the portions 23a and 23b and have a constant radius. For example, such portions could be necessary in the neutral gear of the transmission.

The pin 25 which, if necessary, can be provided with an external coating and which is secured to the disengaging fork 15, is urged against the cam disc 23 as can be seen in FIG. 2a. In FIG. 2a, the pin 25 abuts the portion 23a of the cam disc 23. At such portion 23a of the cam disc, the clutch is engaged if the clutch is a push-type clutch. If the clutch is a pull-type clutch, one employs a mechanism wherein the pin is positively guided along the track of the cam disc.

FIG. 2a further shows a pin 45 which is non-rotatably connected with the cam disc 23 or with the worm wheel 22. This pin 45 can enter the claw 46 of a pivotable arm 47 in response to turning of the cam disc 23, the pivotable arm or rocker 47 being rotatably mounted on a shaft 48. The lower marginal portion of the rocker 47 (as viewed in FIG. 2a)

carries or is formed with teeth 49 which mesh with the teeth 50 of the shifting/selecting shaft 51. When the rocker 47 is pivoted about the axis of the shaft 48, the shifting shaft or rod 51 is caused to move axially.

The rocker 47 constitutes or forms part of a simple geneva movement or bar movement which has a single claw or opening 46. The pin 45 penetrates into the claw 46 and pivots the claw, i.e., the rocker 47, prior to leaving the claw.

That position of the rocker 47 which is shown in FIG. 2a corresponds to an end position of the shifting rod 51 in a shifting path of the transmission. In contrast to FIG. 2a, FIG. 2b shows the cam disc 23 and the worm wheel 23 in different angular positions so that the pin 25 abuts the maximum-radius portion 23b and the clutch is disengaged as a result of the thus caused pivoting of the disengaging fork 15. Furthermore, the pin 45 begins to penetrate into the claw 46 of the rocker 47. In FIG. 2b, the positions of the rocker 47 as well as of the shifting shaft 51 are basically unchanged in comparison with those shown in FIG. 2a.

The angular positions of the cam disc 23 and worm wheel 22 shown in FIG. 2c are changed relative to those shown in FIG. 2b. The clutch remains disengaged which can be recognised in that the pin 25 continues to abut the maximum-radius portion 23b of the cam disc 23, i.e., the disengaging fork 15 continues to be held in a position in which the clutch is maintained in the engaged condition. The turning of the cam disc 23 and of its pin 45 has caused a pivoting of the claw 46 and of the rocker 47 so that the shifting rod 51 of the transmission is caused to move axially by the teeth 49, 50 and, therefore, in FIG. 2c the shifting rod 51 assumes its second end position. For example, that position of the shifting rod 51 which is shown in FIGS. 2a and 2b can correspond to a position of the first gear ratio of the transmission, whereas in FIG. 2c the position of the shifting rod 51 can correspond, for example, to that of the second gear ratio.

Starting from the angular position which is shown in FIG. 2c, turning of the cam disc 23 about the axis of the shaft 24 in a counterclockwise direction again entails a closing or engagement of the friction clutch, and no gear shifting movement takes place at such time.

Figure 3:
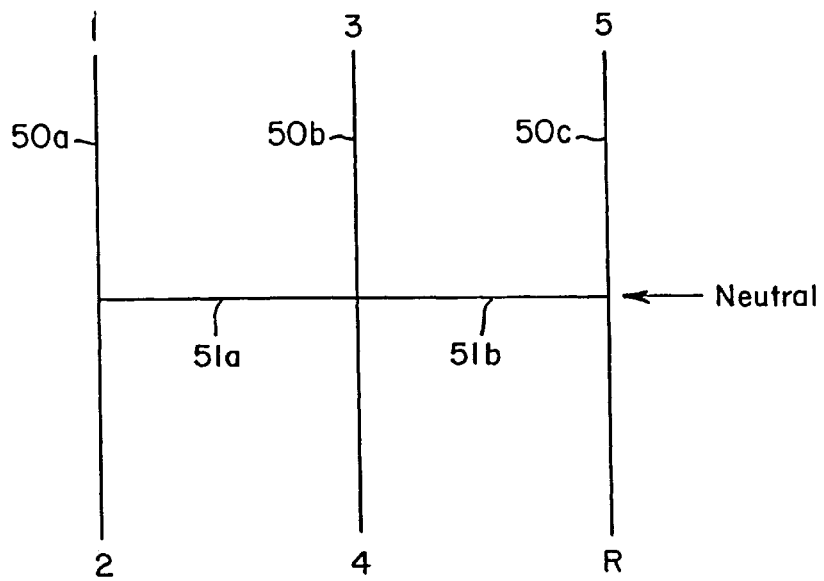
FIG. 3 a gear shifting gate.

FIG. 3 shows a gear shifting gate of a change speed transmission or gear wherein the shifting paths 50a, 50b, 50c are connected with each other by selecting tracks 51a and 51b. The gear ratios 1, 3 and 5 are located at the front ends of the respective shifting paths, and the gear ratios 2, 4 and R (reverse) are located at the rear ends of the respective shifting paths. The neutral position or region is located in the intermediate region, namely at the selecting tracks.

Figure 4:
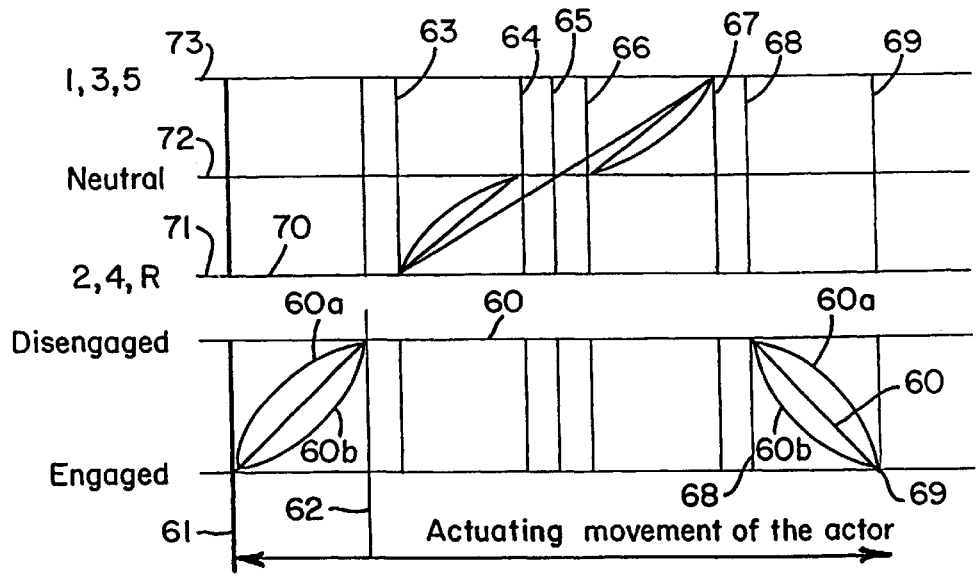
FIG. 4 a schematic illustration of the initiation of operation of the clutch and transmission as a function of the actuating distance, FIGS. 5a–5b a schematic illustration of the initiation of operation of the clutch and transmission as a function of the actuating distance, FIG. 6 a sectional view of a novel arrangement, FIG. 7 a sectional view of a novel arrangement, FIG. 8 a schematic representation of the actuating functions of the clutch and transmission in dependency upon the actuation of the actor, and FIG. 9 a schematic representation of actuating functions of the clutch and transmission in dependency upon the actuation of the actor, FIG. 10 a representation of an actuating arrangement and a transmission as well as of a torque transmitting system, FIG. 10a a detail in the FIG. 10, FIG. 11 an illustration of an actuating arrangement and of a transmission as well as of a torque transmitting system, FIG. 11a a detail in the FIG. 11, FIG. 12a a schematic representation of an actuating arrangement, FIG. 12b a sectional view taken in FIG. 12a, FIG. 13a a schematic representation of an actuating arrangement, FIG. 13b a schematic representation of an actuating arrangement, FIG. 13c schematic representation of an actuating arrangement, FIG. 13d a schematic representation of an actuating arrangement, FIG. 13e a schematic representation of an actuating arrangement, FIG. 13f a schematic representation of an actuating arrangement FIG. 14a an illustration of a transmission with actuating arrangement, FIG. 14b an illustration of a transmission with actuating arrangement

FIG. 4 shows the scheme or progress of operation of an actor and of an arrangement for the actuation of a change speed gear and of a clutch, for example, those shown in FIGS. 1 to 2c. The position or condition of the clutch and the position of the selecting/shifting shaft 51 in the tracks of the gear shifting gate are shown schematically adjacent the path of movement of the actor. The curve 60 denotes the condition of the clutch and it will be seen that, when the actor moves along the actuating path and assumes the position 61, the clutch 5 is closed, i.e., engaged. As the actor moves along its path from the position 61 to the position 62, the clutch 5 is disengaged as indicated by the corresponding portion of the curve 60. It is also possible to achieve variations as indicated by the curves 60a and 60b. It is equally possible to achieve still other disengagement functions in dependency upon the movement of the actor.

When the actor 20 is caused to perform a movement from the position 62 to the position 63, and particularly all the way to the position 68, the condition of the clutch remains unchanged but the clutch is reengaged or can be reengaged during movement of the actor from the position 68 to the position 69; this is indicated by the portions 60, 60a and 60b of the curve denoting the condition of the clutch, but this curve can also have a progress different from those shown in FIG. 4.

The curve 70 indicates, for example, the changes of the position of the shifting rod or shaft 51 in one or more of the gear shifting paths 50a to 50c in the gear shifting gate of the transmission. The value 71 denotes a position corresponding to the second, fourth or reverse gear ratio (2, 4, R), whereas the position 72 corresponds to the neutral zone and the position 73 corresponds to that of one of the gear ratios 1, 3 and 5.

When the actor is operated to assume one of the positions between 61 and 63, the gear shifting mechanism is located in the region of the gear ratios 2, 4, R. When the actor is operated to move in the region between the points 63 and 64, the shifting rod 51 is moved in such a way that it is located in the neutral region. During operation of the actor to move between the point 64 and essentially the point 66, as well as during movement between the points 66 and 67, the shifting rod 51 moves toward the gear ratios 1, 3, 5. During movement of the actor beyond the position 67, the transmission is engaged in one of the gear ratios 1, 3, 5.

When the actor is operated to move between the positions 62 and 63 of FIG. 4, the clutch is already fully disengaged but the gear shifting operation is yet to begin.

Figure 5A:
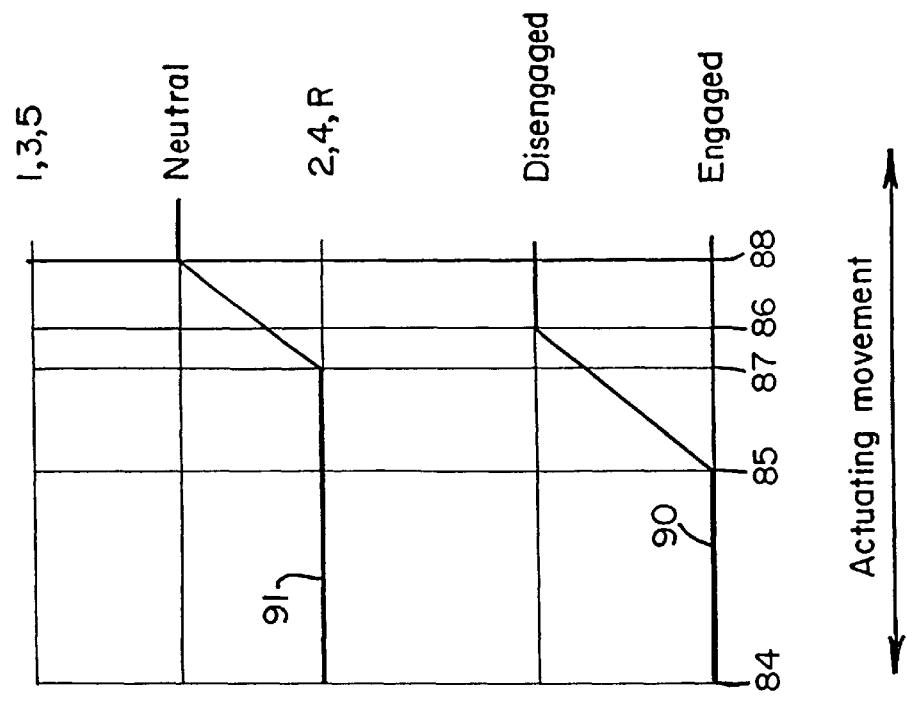

FIG. 5a shows a detail of the diagram of FIG. 4. The lower portion of FIG. 5a shows the changes of the condition of the clutch between the engaged and disengaged conditions, and the upper portion of the diagram of FIG. 5a illustrates the shifting movements in the paths of the gear shifting gate. The clutch is engaged while the actor is operated between the points 80 and 81 as indicated by the unchanging level of the curve 90 which represents the condition of the clutch. The disengagement of the clutch begins at the point 81 and is terminated when the actor reaches the position 82 as indicated by the corresponding portion of the curve 90 the level of which remains unchanged beyond the point 82. The curve 91, which denotes the gear shifting operation or the gear shifting movements shows that, at the point 80, the transmission is shifted into one of the gear ratios 2, 4, R and, when the actor reaches the point 82, this initiates a shifting operation which involves a movement to the neutral position which is reached at the point 83. At the point 82, the disengagement of the clutch is completed and the gear shifting operation is initiated, i.e., started. It will be seen that FIG. 5a indicates actuations which are comparable with those shown in FIG. 4 but the spaced-apart positions or points 62 and 63 of FIG. 4 overlie or overlap each other in FIG. 5a as denoted, for example, by the point 82.

Figure 5B:
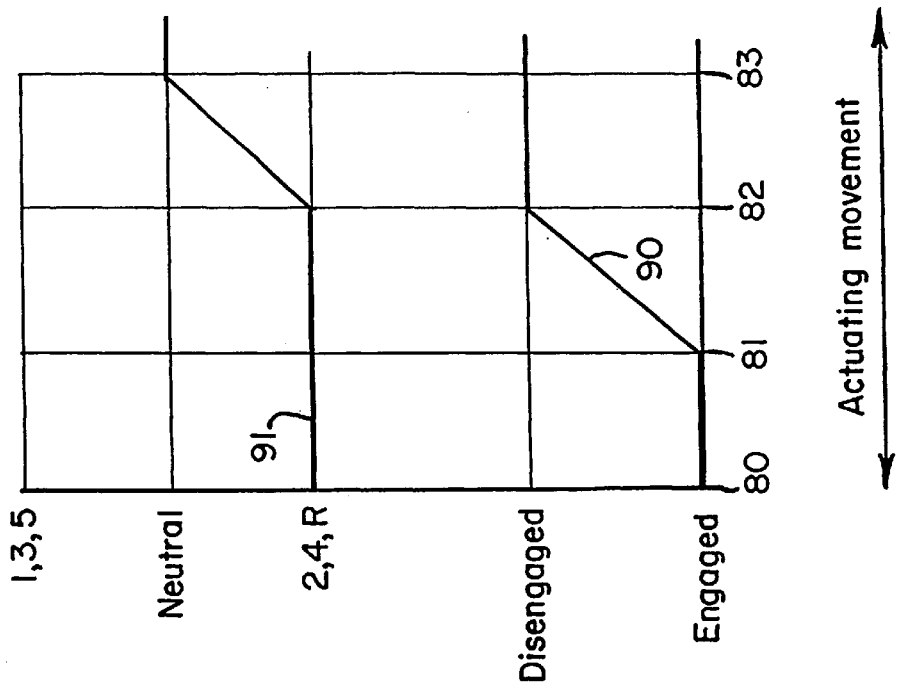

FIG. 5b illustrates the actuating operation according to FIGS. 4 and 5a, with the clutch engaged in the region between the points or positions 84 and 85 and disengaged in the region between the points or positions 85 and 86. The clutch is fully disengaged beyond the point or position 86. The gear shifting operation is initiated at the point or position 87 and is completed at the position 88, at first in the neutral region. FIG. 5b shows clearly that the position 87 is reached ahead of the position 86, i.e., the gear shifting operation is initiated or begins before the clutch is fully disengaged.

FIGS. 5a and 5b merely show portions of the gear shifting and of the clutch actuating operations, i.e., FIGS. 4, 5a and 5b illustrate the starts or initial stages of the behavior during a full-fledged gear shifting operation and a complete clutch actuating operation.

Due to the mutual or relative rotation preventing connection between the worm wheel 22 of the illustrated embodiment and the cam disc 23, starting of the electric motor 21 not only initiates the actuation of the clutch by way of the cam disc but also initiates a gear shifting operation by way of the pin 45 and the rocker 47. The relative positions and the configurations of the pin 45 and the cam disc 23 determine the relationship between the clutch actuating operation, i.e., the relationship between the actuating distance and the extent of engagement of the clutch, as well as the gear shifting operation as a function of the actuating distance. Depending upon the design of the actor, one can realise the initiation of actuation or operation as a function of the actuating distance in accordance with FIGS. 4, 5a or 5b, and the design determines the carrying out of clutch actuation and of gear shifting operation as a function of the actuating distance.

In the embodiment of FIGS. 1 and 2a to 2c, the gear ratio selecting movement within the gear shifting gate can also be carried out or initiated by way of the rocker 47 and pin 45, i.e., for example by way of a geneva movement. Thus, an actuation of the clutch and the gear ratio selecting movement by way of an actor could result, for example, in a rotation or actuation of the shifting rod 51 in a circumferential direction and the actuation in the axial direction, i.e., in a direction to shift into a particular gear ratio, is independent of the initiation of the gear ratio selecting movement.

Figure 6:
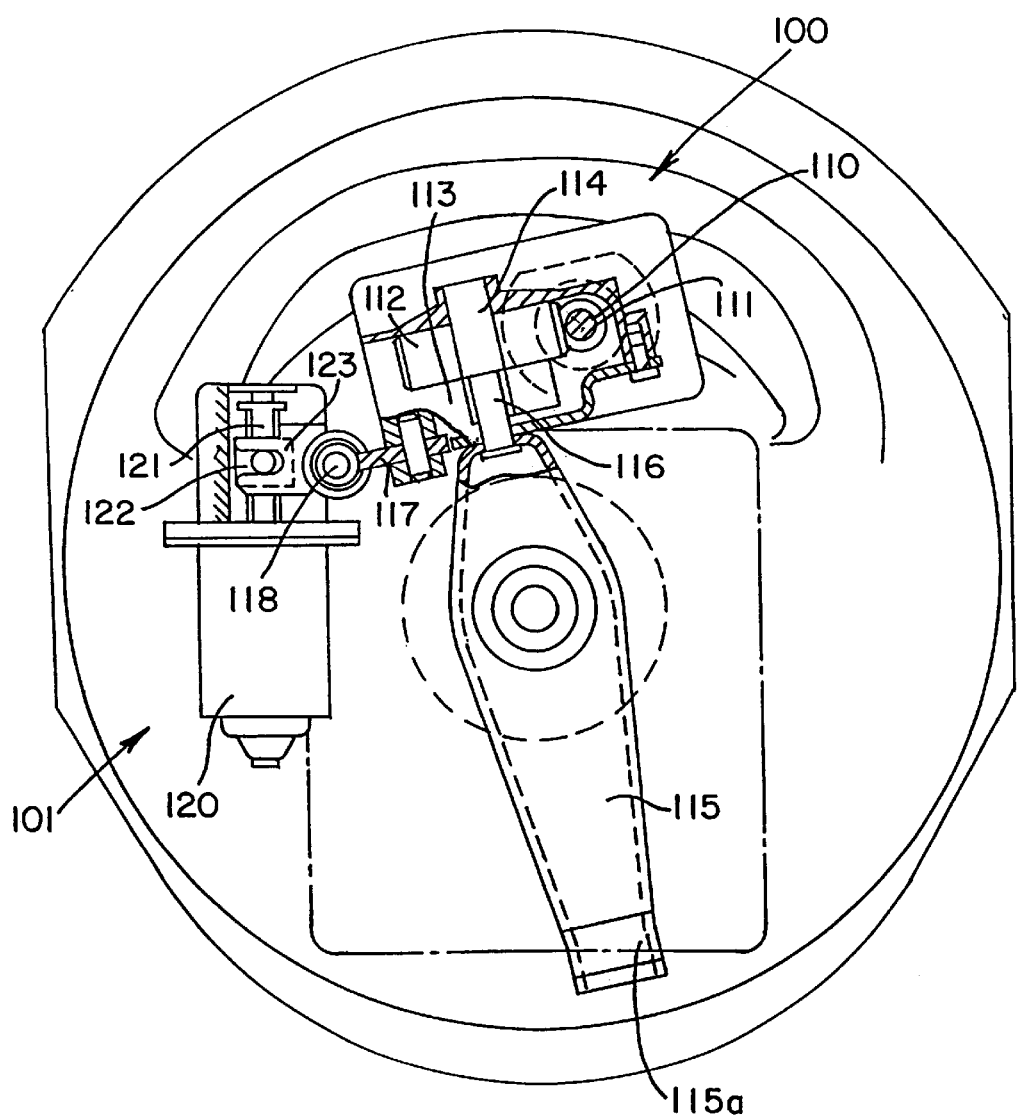

FIG. 6 is an elevational view of an actor 100 for the actuation of the clutch as well as for the initiation of the gear shifting operation, and also of a further actor 101 for the carrying out of the gear ratio selecting operation. The output shaft of the electric motor 110 of the actor 100 drives a worm 111 which, in turn, drives a worm wheel 112. The worm wheel 112 is non-rotatably connected with a cam disc 113 or is of one piece therewith, the worm wheel 112 and the cam disc 113 being rotatably mounted by means of a shaft 114. The disengaging fork 115, which is pivotable at the point 115a and can actuate the disengaging bearing of the clutch, has a pin 116 which bears against the cam disc 113 under the bias of the prestressed diaphragm spring of the clutch.

Rotation of the cam disc 113 causes a pivotal movement of the disengaging fork 115 which engages and/or disengages the clutch.

Furthermore, and as already described with reference to the embodiment of FIGS. 1 and 2a to 2c, a tilting or pivoting of the rocker 117 entails an axial movement of the shifting rod 118 to thus initiate a gear shifting operation within the shifting paths of the gear shifting gate. The additional actor 101 initiates the gear ratio selecting operation, and this actor comprises basically an electric motor 120 with a motor output shaft 121 and an internally threaded sleeve 122 which is caused to move axially in response to rotation of the output shaft 121 to pivot an actuating element 123 which is coaxial with and can turn about the axis of the shifting rod 118. The gear ratio selecting operation involves an angular displacement of the shifting rod 118 in response to pivoting of the actuating element 123.

Thus, the embodiment of FIG. 6 comprises an actor 100 which, when actuated, first disengages the clutch and thereupon initiates a gear shifting operation into the neutral region. Thereafter, the actor 101 can change the gear shifting path in response to a gear ratio selecting operation prior to the carrying out of a further gear shifting operation to shift into the selected gear ratio before the clutch is reengaged.

It will be seen that the system of actors comprises two actors 100, 101 one of which takes over the gear shifting and clutching operations or initiates such operations, and the other actor takes over or carries out the gear ratio selecting operation. Such arrangement results in an automated gear shifting and clutching operation without sequential actuation, i.e., it is possible at all times to switch from a momentarily active gear ratio into any desired other gear ratio.

The system of actors, i.e., the actuating arrangement, of FIG. 6 can be installed inside the transmission bell or externally of the transmission bell. Such an actuating arrangement could be attached to a conventional manually operable transmission which would render it possible to dispense with the gear ratio selection as a result of manually induced gear ratio selecting/gear shifting movement by way of the gear ratio selecting lever.

Figure 7:
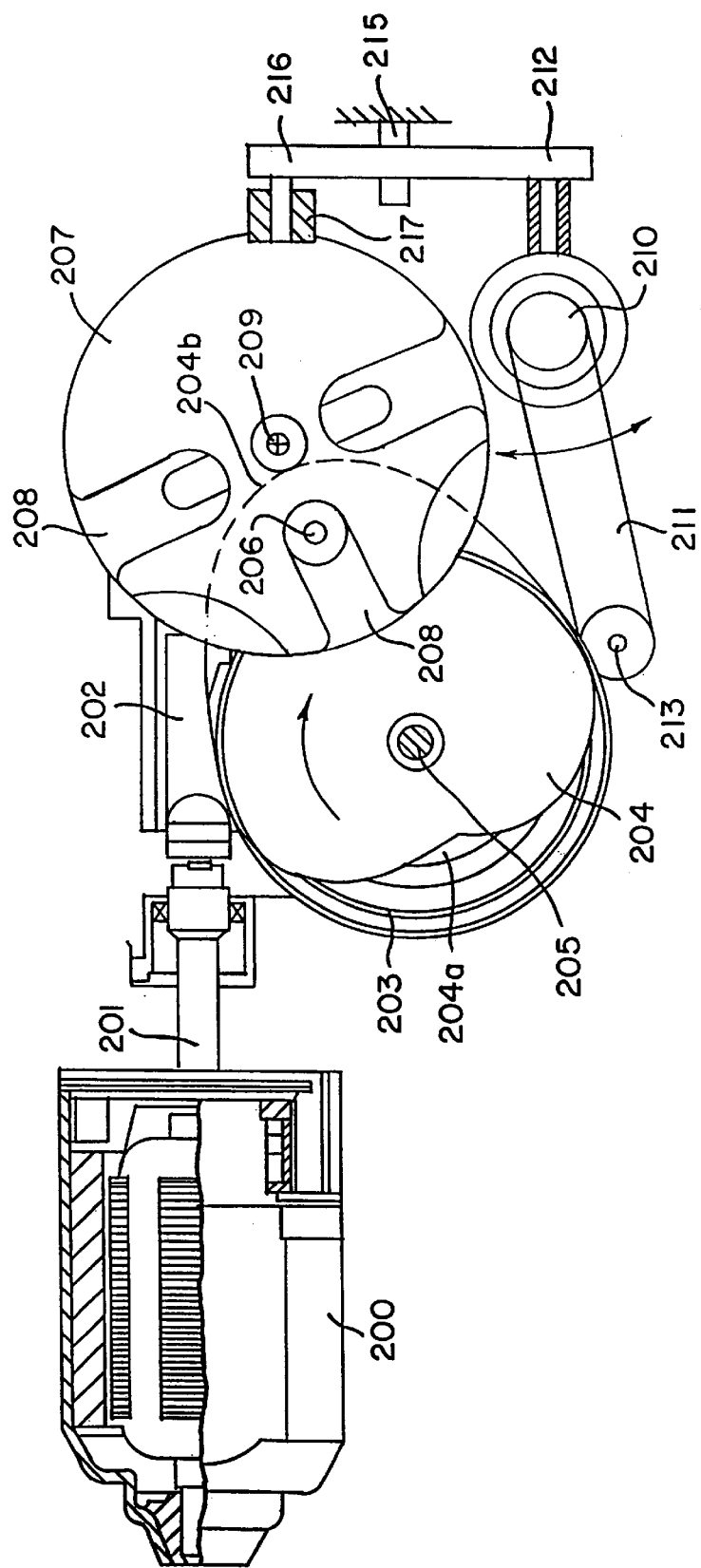

FIG. 7 shows an actuating arrangement for the initiation of the gear ratio selecting and gear shifting movements in a sequential manner. The output shaft 201 of an electric motor 200 drives a worm 202 which meshes with and can thus rotate a worm wheel 203, such worm wheel transmission serving as a step-down gearing for the rotary movement of the output shaft of the motor 200. The worm wheel 203 is coaxial with a cam disc 204, and this worm wheel 203 and cam disc 204 can rotate about the axis of a shaft 205. The cam disc 204 comprises a portion 204a having a smallest radius and a portion 204b having a maximum radius; in this embodiment, the portions 204a and 204b are disposed diametrically opposite each other. The configuration of the cam disc can be different; for example, the cam disc can include two or more portions having smallest radii and two or more portions having maximum radii. Furthermore, the cam disc 204 is non-rotatably connected with a pin 206 which extends in the axial direction. The actuating arrangement of FIG. 7 further comprises a geneva movement 207 constituted by a disc formed with detent position(s) or opening(s) 208, and by the pin 206 which can penetrate into the detent position(s). When the cam disc 204 is turned about the axis of the shaft 205, the disc 207 of the geneva movement is caused to turn about the axis of a shaft 209 when the pin 206 enters the detent position 208.

When the cam disc 205 and its axially parallel pin 206 are set in rotary motion, the disc of the geneva movement 207 continues to rotate until the pin 206 moves out of the detent position 208. If the cam disc 204 continues to rotate, the disc of the geneva movement remains at a standstill until the cam disc 204 completes an angular movement which is necessary to ensure that the pin 206 can penetrate into the next detent position. Due to the aforedescribed design of the cam disc 204 and of the geneva movement 207, the disc of the geneva movement turns, in response to each revolution of the cam disc 204, only through an angle corresponding to that between two successive detent positions or openings 208, i.e., in the illustrated embodiment through angles of 90 degrees. The cam disc 204 and the disc of the geneva movement 207 thus initiate the gear shifting and/or the gear ratio selecting operation in order to render possible a sequential operation of the change speed gear.

Each full revolution of the worm wheel 203 results in a full revolution of the cam disc 204 about the axis of the shaft 205. This means that a lever 211 which tracks the peripheral surface of the cam disc 204 carries out a back-and-forth rocking movement during each revolution of the cam disc 204. At the same time, the disc of the geneva movement 207 is turned through 90°.

The gear shifting/gear ratio selecting shaft 209 of the transmission can be turned in the circumferential direction by the lever 211, and this shaft can be moved axially by a lever 212. The gear shifting/gear ratio selecting shaft 209 is turned by the lever 211 due to engagement of the lever 211, at 213, with the cam disc 204. The portion 213 of the lever 211 is supported by or bears essentially upon the peripheral or marginal portion of the cam disc 204. When the cam disc 204 is caused to rotate, the portion 213 of the lever 211 successively engages different portions at the periphery of the cam disc and, since the effective radius of the cam disc 204 is a function of its orientation or angular position, the lever 211 is caused to pivot in dependency upon the angular position of the cam disc. In the embodiment of FIG. 7, the portion 213, which can be designed to slide or to roll along the cam disc 204, engages once the smallest-radius portion 204a and once the maximum-radius portion 204b during each revolution of the cam disc 204.

The displacement of the shifting/selecting shaft 209 in the axial direction by means of the lever 212 is carried out in such a way that the lever 212 is pivotably mounted at 215 and comprises, at 216, a follower 217 which tracks an axially extending lifting or displacing cam at one side of the disc of the geneva movement 207. The follower 217 can slide or roll along the lifting cam of the geneva movement 207. Thus, a rotary movement of the disc of the geneva movement 207 initiates an axial movement of the shifting/selecting shaft 209.

Figure 8:
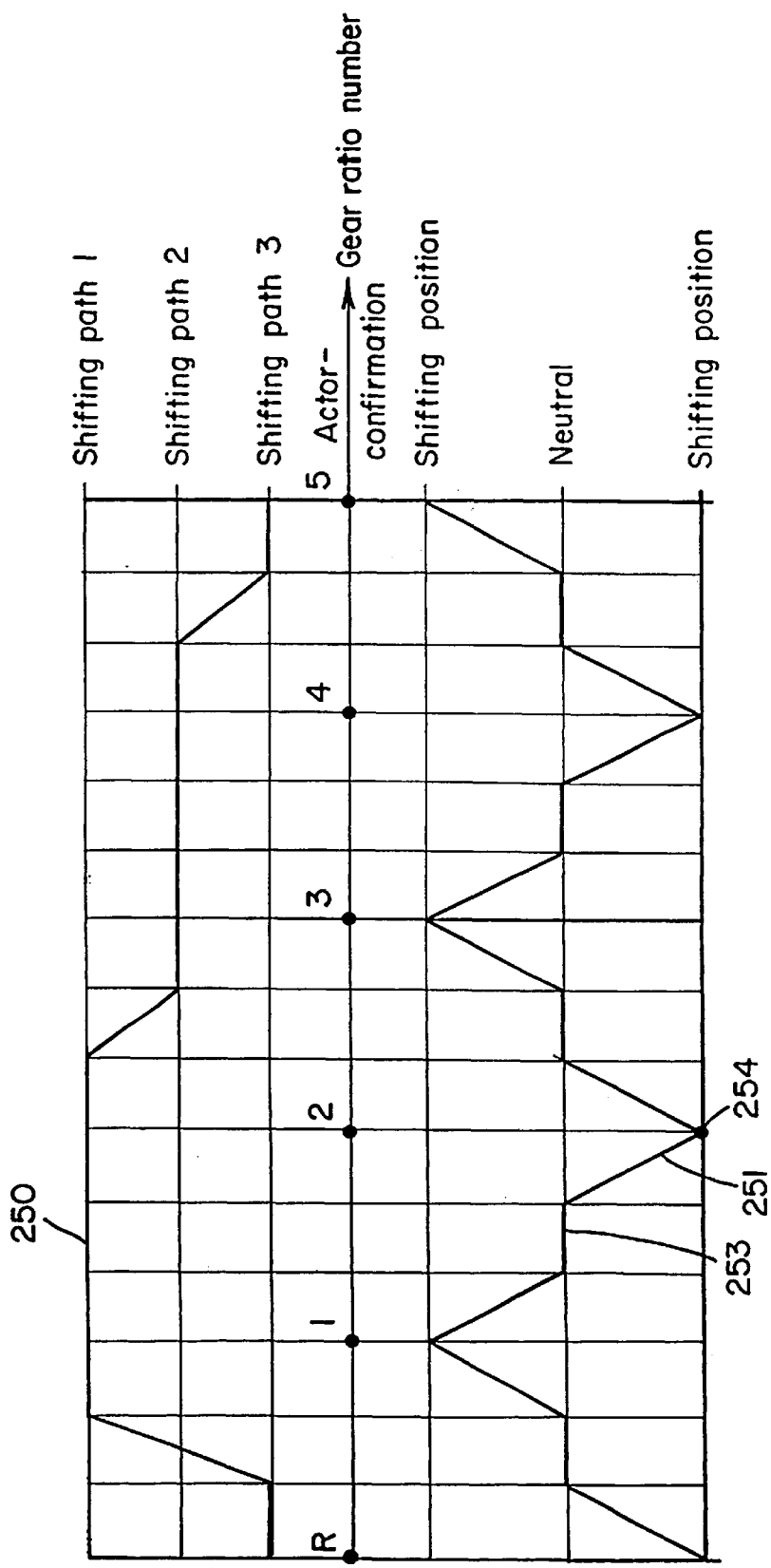

FIG. 8 shows schematically the positions of the shifting/selecting shaft 209 and the initiation of the gear shifting and gear ratio selecting operations in dependency upon the actuation of the actor. The curve 250 denotes the positions or settings of the shifting/selecting shaft in the gear ratio selecting direction, the selection of the gear ratio determining the position of the shifting/selecting shaft relative to the path for the respective gear ratios 1, 2, 3.

The curve 251 is representative of the positions or locations of the selecting/shifting shaft 209 in the shifting direction, i.e., within a selected path forwardly in a direction toward the gear ratios 1, 3, 5 or in the neutral position in the median region of rearwardly in a direction toward the gear ratios 2, 4, R (reference being had again to FIG. 3). The gear shifting position at 1 indicates a shifting in a forward direction and the shifting position at 2 indicates a shifting in a rearward direction.

The progress or configuration of the curve 251 indicates that the gear shifting operation is periodical. The gear shifting operation can be periodical if the alternating position from in front—rearwardly corresponds to the shifting sequence, see FIG. 3. This relates to the position sequence neutral—gear (in front)—neutral—gear (behind) (in the same path)—neutral—path change in neutral.

Starting with the first gear ratio which is shifted into forwardly (see FIG. 3), the cam disc 204 is caused to move in such a way that the lever 211 pivots and the shifting/selecting shaft 209 moves from the position corresponding to the first gear ratio to the position corresponding to neutral (see the path 50a in FIG. 3). The region at neutral (see the region 253 in FIG. 8) remains in existence for the reasons of symmetry even though no change of gear shifting path takes place between the first and second gear ratios, i.e., no gear ratio selection will occur. As the cam disc 204 continues to turn, the portion 213 of the lever 211 reaches the smallest-radius portion 204a of the cam disc. Starting again from the first gear ratio and assuming that a gear ratio changing movement is intended from the first gear ratio into reverse, the cam disc 204 rotates in a direction counter to that for a change from the first to the second gear ratio.

A gear shift from the second gear ratio into the third gear ratio involves a gear selection, i.e., a change of the gear shifting path (from 50a to 50b).

The position of the cam disc 204 at the location 254 (i.e., the second gear ratio 2) is changed as a result of a rotational movement. This involves a withdrawal from the second gear ratio and a shifting into neutral. When the neutral position is reached, the geneva movement 207 is caused to change its angular position and the axially extending cam of the disc of the geneva movement 207, which cam is tracked by the portion 217, causes the lever 212 to move the shifting/selecting shaft 210 axially and to thus change the gear shifting path before the third gear ratio 3 is engaged in response to further rotation of the cam disc 204.

A gear shift from the ratio 3 into the ratio 4 corresponds to the shift from the ratio 1 into the ratio 2. A shift from the gear ratio 4 into the ratio 5 is quasi equivalent to the shift from the ratio 2 to the ratio 3 or the other way around.

Figure 9:
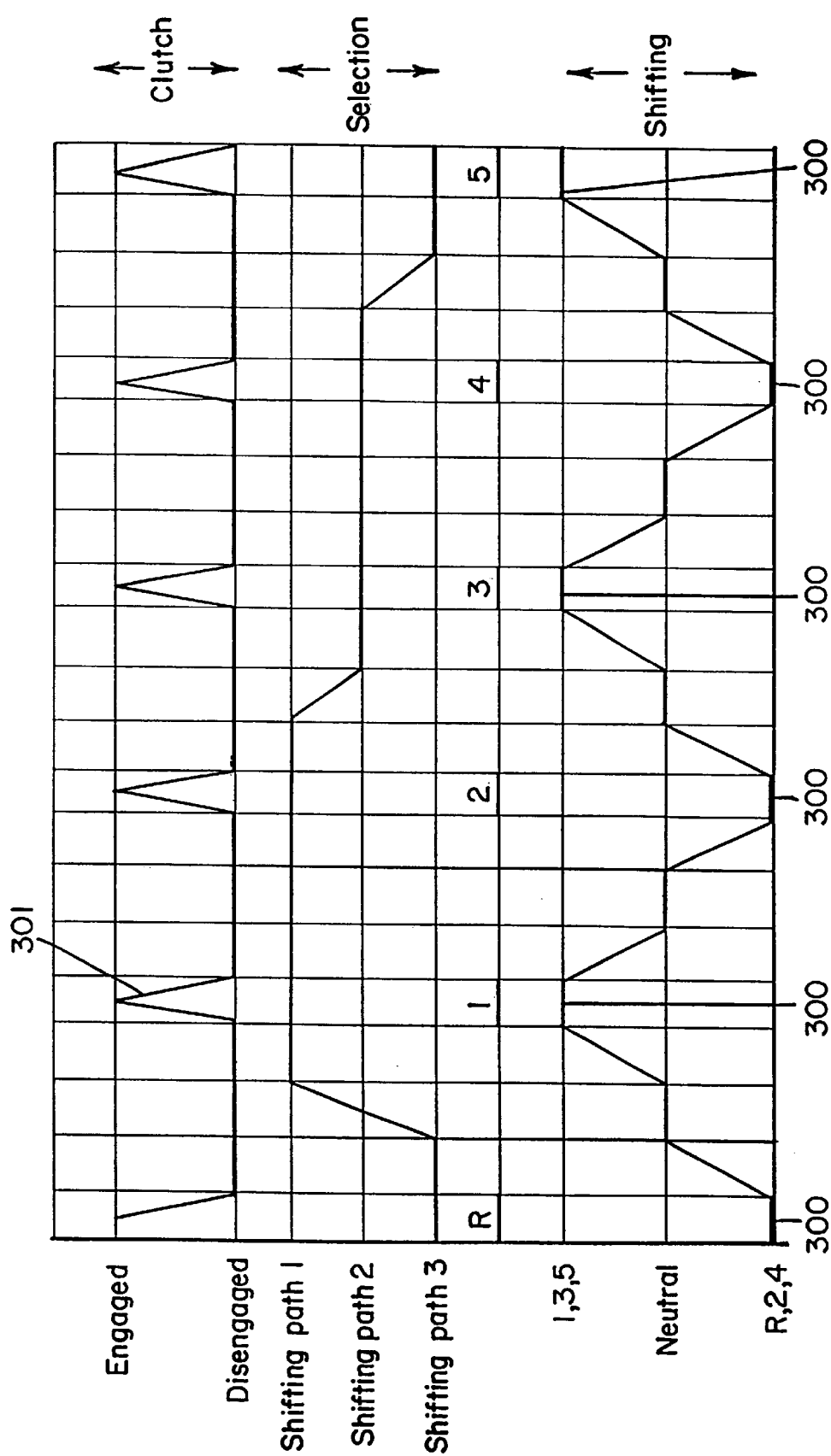

A transmission or a system of actors which, in addition to the gear shifting and gear ratio selecting operation, also initiates the actuation of the clutch must be designed in such a way that the curves 250 and 251 remain basically unchanged and the clutching operation disengagement—engagement must be capable of being carried out in each engaged gear ratio. This necessitates the establishment of waiting times in the regions of the peaks of the curve 251 (see the regions 300 in FIG. 9). In these regions, and as indicated by the curve 301, the clutch is disengaged or engaged. As soon as a gear shift is initiated, the clutch becomes disengaged before the actor can carry out a change in the position of the shifting/selecting shaft.

Figure 10:
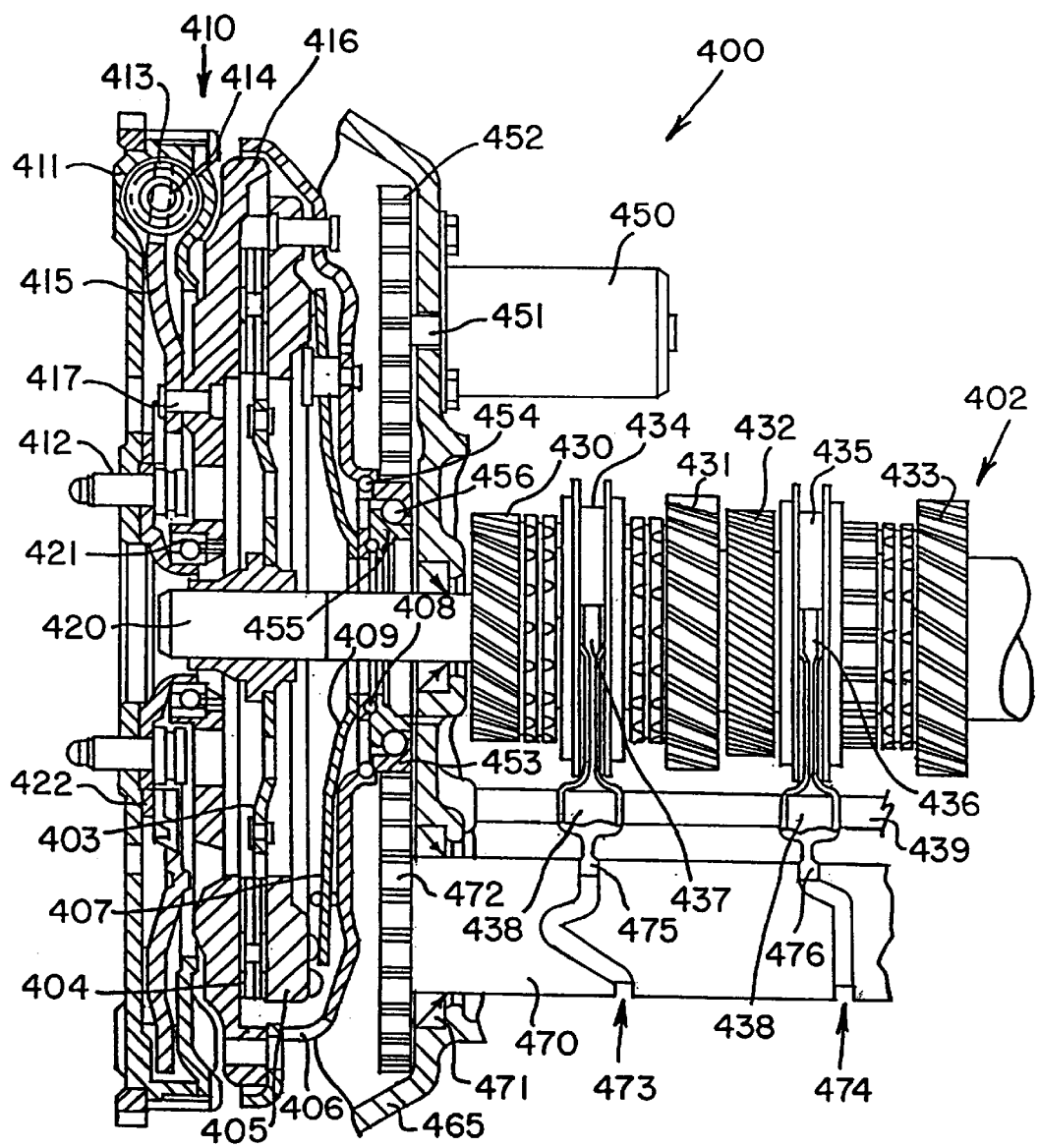

FIG. 10 shows an arrangement for the actuation of a transmission, such as for shifting into and/or for the selection of a transmission ratio and/or of a torque transmitting system in the power train of a non-illustrated vehicle.

FIG. 10 shows an actuating arrangement 400 for initiation of the actuation of a torque transmitting system 401 as well as of a transmission 402. In this embodiment, the torque transmitting system 401 constitutes a friction clutch with a clutch disc 403 having friction linings 404, the clutch further comprising a pressure plate 405, a clutch cover or housing 406 as well as an energy storing means such as a diaphragm spring 407. The tongues 409 of the diaphragm spring are actuatable by an actuating element, such as a disengaging bearing 408, in order to engage and/or disengage the torque transmitting system, namely the clutch 401. The clutch 401 is secured to a flywheel 410 which can be driven by being operatively connected, for example, with a crankshaft of a combustion engine. The flywheel 410 can constitute a one-piece flywheel or, and as actually shown in FIG. 10, a composite flywheel. The clutch can also constitute a magnetic clutch or another clutch.

A composite flywheel comprises a flywheel mass 411 which is located at the primary side and is non-rotatably secured, for example, to the crankshaft of a combustion engine by fastener means 412. The primary flywheel mass 411 comprises a chamber 413 which can receive energy storing elements 414 arranged in a circumferential direction. A flange 415 which extends between the energy storing elements 414 is non-rotatably secured to the secondary flywheel mass 416 by fastener means 417. Starting at the primary flywheel 411, torque is being transmitted by way of the energy storing elements 414 to the flange 415 and thence to the secondary flywheel or flywheel mass 416 whence the torque is being transmitted, by way of the clutch 401, to the transmission input shaft 420. The twin-mass flywheel comprises a bearing 421 which mounts the two flywheel masses in such a way that they can turn relative to each other at least within a predetermined angle but are held against axial movement relative to each other. The energy storing elements 414 are confined in the aforementioned chamber 413 and can dip at least in part into a suitable lubricant. It is further possible to provide torsional vibration damping arrangements 422.

The transmission 402, only a portion of which is shown, comprises the input shaft 420 which can be connected with the gear wheel 430, 431, 432 or 433, and these gear wheels are non-rotatably connected with non-illustrated spur gears on an output shaft of the transmission. FIG. 10 further shows shifting sleeves 434 and 435 which are movable in the axial direction and can establish a synchronisation as well as a non-rotary connection between the gear wheels 430 to 433 and the transmission input shaft.

The slidable sleeves or shifting sleeves 434 and 435 are movable in the axial direction by shifting forks 436, 437 and these forks have followers 438 which are mounted for shiting movement along a guide rod 439.

FIG. 10 shows that the shifting sleeve 435 has been moved from an idle position in a direction to the left and the shifting sleeve 434 dwells in its idle position. Consequently, the shifting sleeve 435 establishes a non-rotary connection between the input shaft 420 of the transmission and the gear wheel 432; at such time, the gear wheels 430, 431 and 433 are not non-rotatably connected with the input shaft of the transmission.

The actuating arrangement 400 comprises a driving unit 450, such as an electric motor, which drives a gear 452 by way of its output shaft 451. The teeth of the gear 452 mesh with the teeth on the outer race 453 of the friction clutch disengaging mechanism. The outer race 453 is held by a ring 454 against axial movement relative to the cover 406 of the clutch 402. The inner race 455 of the clutch disengaging mechanism 408 carries the bearing. This inner race 455 is coupled with the outer race 453 by rolling elements 456. When the outer race 453 is caused to turn relative to the inner race 455, the inner race can move in the axial direction. Axial shifting of the inner race 455 takes place due to the provision of ramp and complementary ramp arrangements between the element 455 and the element 453, the inner race 455 being mounted against appreciable angular movement. Thus, when the outer race 453 is caused to turn, the axial movement of the inner race 455 can be selected and carried out in a planned manner to thus actuate the torque transmitting system in a planned manner.

Figure 10A:
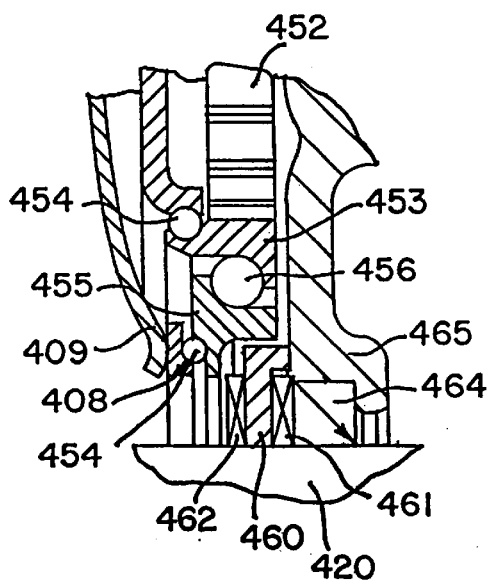

FIG. 10a illustrates this actuation of the disengaging bearing 408 drawn to a larger scale, there being further shown an axially shiftable element 460 which is displaceable, for example, by means of electromagnets or electric motors 461 and 462. In response to planned or predetermined actuation of the electromagnets 461 and 462, the disengaging bearing can be acted upon in such a way that the clutch remains disengaged even though the outer race 453 is caused to turn in a manner such that this angular movement would not entail a disengagement of the clutch. Rolling elements 463 are installed between the element 455 and the disengaging bearing 408.

A bearing 464 is interposed between the input shaft 420 of the transmission and a casing or housing 465.

FIG. 10 further shows a roller or cylinder cam 470 which is rotatably mounted in the housing 465 by means of bearings 471. The roller or cylinder cam 470 is driven by a gear 472 and the teeth of this gear mesh with the teeth of the element or outer race 453. Thus, the roller 470 is driven by the electric motor 450 and the gear 452 by way of the gear or outer race 453. The roller 470 has cam grooves 473 and 474 into which extend the projections 475 and 476 of the shifting forks 437 and 436. Due to the configuration of the cam grooves as seen in the axial direction of the roller 470, rotary movements of the roller can effect an axial displacement of the shifting forks 436 and 437.

Thus, when the electric motor 450 is started, it initiates an actuation of the torque transmitting system and of the transmission in a predetermined sequence in such a way that the torque transmitting system 401 is always disengaged in a first step and this is followed by a withdrawal from a transmission gear, the transmission is set in neutral before a new gear can be engaged and the torque transmitting system can be reengaged in a following step. Furthermore, the clutch can be again engaged and again disengaged between the steps of shifting the transmission out of and into a gear. The gear ratios of the transmission can be shifted in the sequence 1-2-3-4-5-R or R-1-2-3-4-5.

The auxiliary actor 460 to 462 which, for example, can employ electromagnets, can prevent an intermediate engagement and disengagement of the clutch in the course of a shifting operation through several gear ratios. For example, during shifting from the fifth into the first gear ratio, the clutch can be initially disengaged, followed by a shifting of the transmission from the fifth into the first gear by way of the fourth, third and second gears and, if necessary, the clutch is thereupon reengaged. The auxiliary actor for intermediate disengagement of the clutch during a sequential (multiple-step) gear shifting operation can constitute an electromagnetically or an electromotorically operated actor.

The configuration of the cam grooves 473 and 474 in the shifting roller or cylinder cam 470 is such that the shifting forks can shift from a first gear into a second gear or into neutral. This means that there is provided a cam groove for each of the shifting forks and each such groove permits an engagement of two of the four gears 430 to 434. If the transmission has five or six gear ratios, it is necessary to provide three or four shifting forks.

Figure 11:
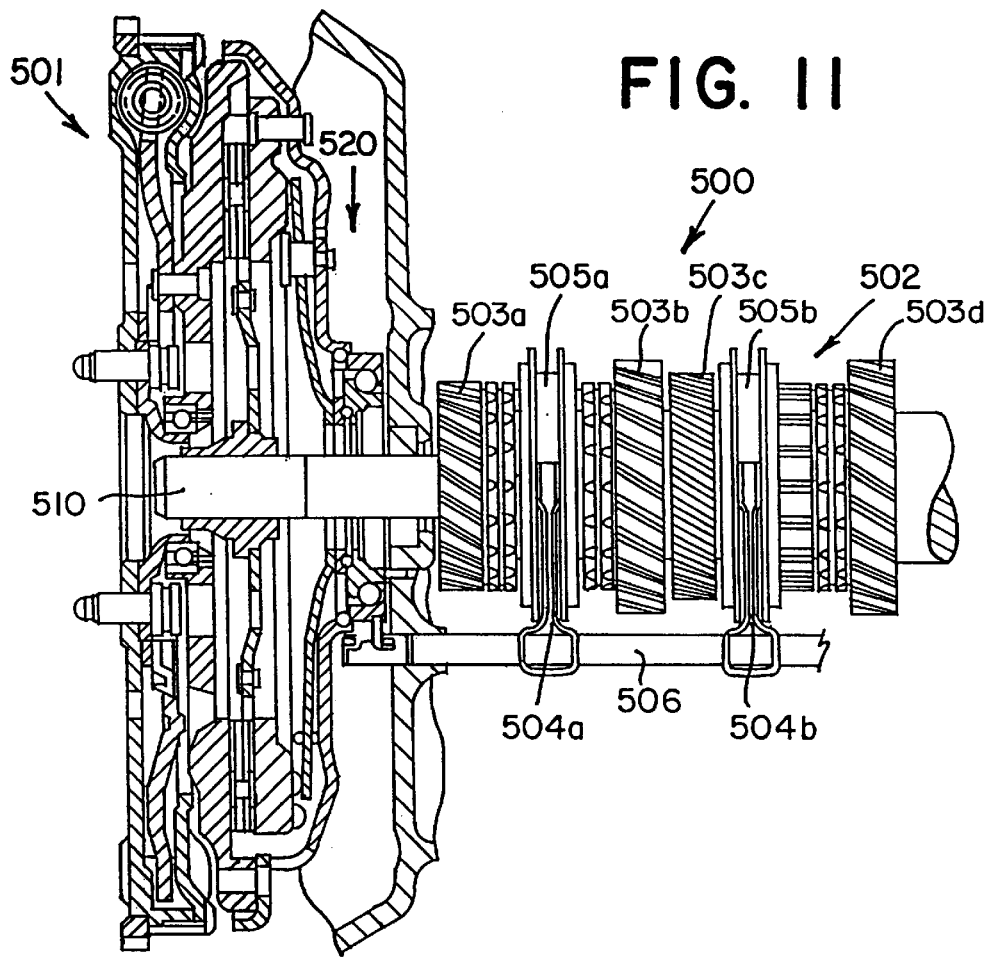

FIG. 11 illustrates an arrangement 500 for the actuation of a torque transmitting system 501 and/or a transmission 502. The transmission 502 comprises gear wheels 503a, 503b, 503c and 503d, and these gear wheels can be operatively connected with the input shaft 510 of the transmission by shifting sleeves 505a and 505b. These shifting sleeves 505a and 505b are movable axially by shifting forks 504a and 504b. Such movement is carried out by way of shifting rods 506 which can be moved, for example, by an actor 507 which, in turn, is controlled by a control or regulating unit 508. The actor 507 can comprise a driving unit, such as for example an electric motor or a plurality of such driving units, and gearings can be provided in the interior of the actor. The actuation of the torque transmitting system is effected by a mechanism which includes a disengaging bearing 520 of the type already described with reference to FIG. 10.

Figure 11A:
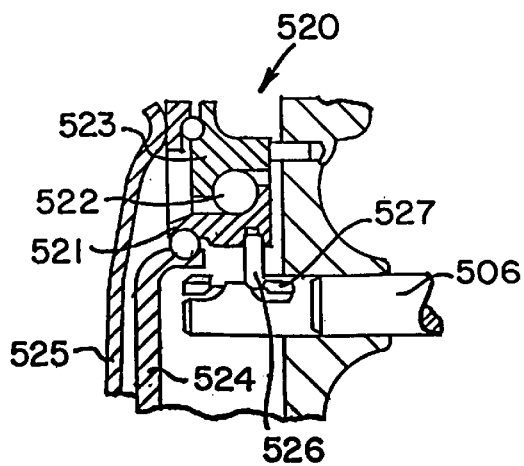

FIG. 11a illustrates the mechanism 520 again but drawn to a larger scale. The outer race 521 of the bearing of the mechanism 520 is operatively connected with an inner race 523 by way of rolling elements 522 and ramp and complementary ramp arrangements. The outer race 521 is mounted on the cover 524 of the torque transmitting system 502 in such a way that it is held against axial movement but can turn relative to the cover. The inner race 523 is associated with a disengaging bearing in such a way that it stresses the diaphragm spring tongues 525 of the energy storing element of the torque transmitting system. The outer race 521 comprises a pin 526 extending into a recess 527 of a linkage, such as the shifting rod 506.

The modulation or configuration of the groove or recess 527 for the pin 526 is such that a rotary movement of the race 521 in response to actuation of a shifting rod 506 in the axial direction can entail a planned or predetermined engagement and/or disengagement of the torque transmitting system ahead of or subsequent to a gear shifting step. The groove 527 has an axial component and a circumferential component.

Figure 12B:
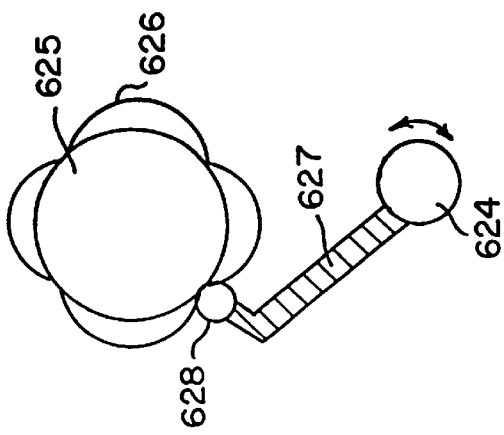
Figure 12A:
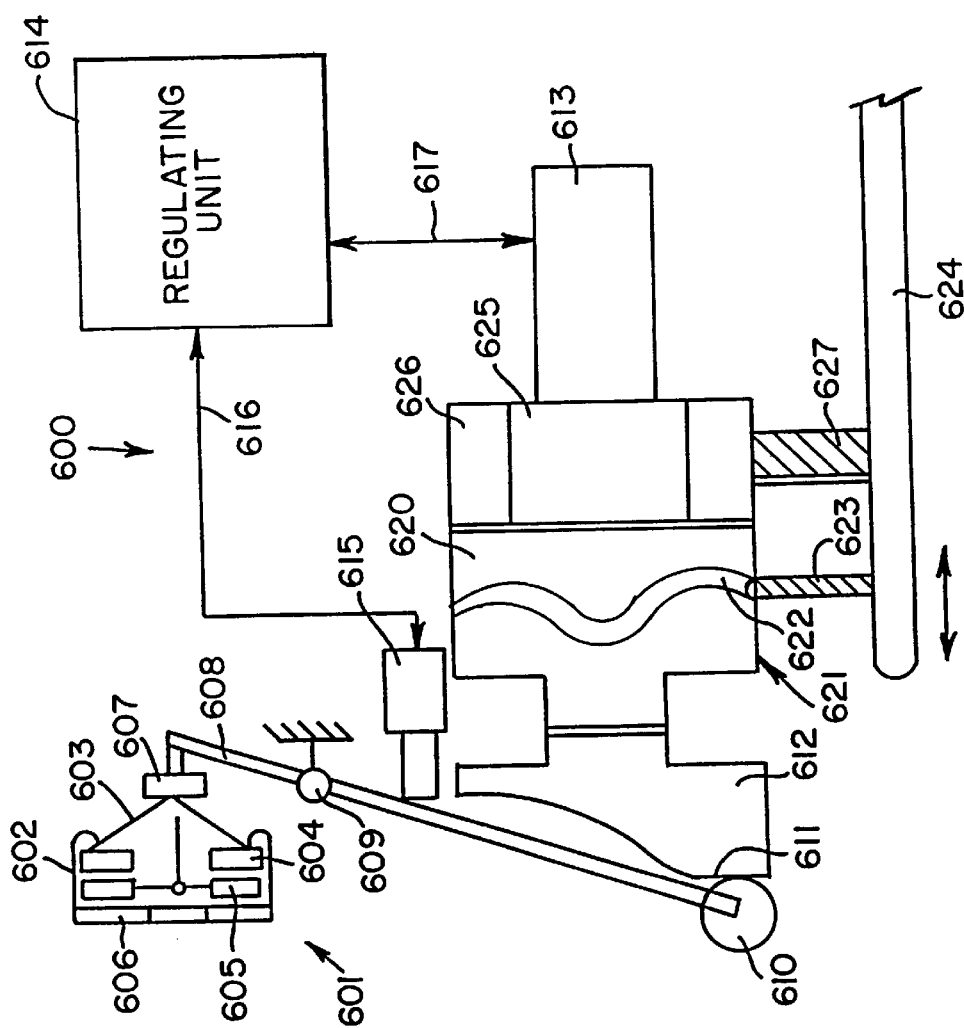

FIG. 12a illustrates an arrangement 600 for the actuation of a torque transmitting system 601 and a transmission. The torque transmitting system comprises a clutch cover or housing 602, an energy storing element 603, a pressure plate 604 as well as a clutch disc 605. The clutch 601 is non-rotatably connected with a flywheel 606, and this flywheel is connected with a driving element such as the crankshaft of a combustion engine. The clutch is actuated by a disengaging bearing 607, and the latter stresses the energy storing element or diaphragm spring 603 for the purposes of engagement and/or disengagement of the clutch. The disengaging bearing 607 is actuated by a disengaging lever 608 which engages a radially inner portion of the bearing. The disengaging lever 608 is pivotably mounted in the region 609. That end portion 610 of the disengaging lever 608 which is remote from the clutch tracks the profile of a cam 611 which is provided on a rotary cam 612. The profile of the cam 611 is modulated in the axial direction of the rotary cam 612 as a function of the circumferential direction so that, when the cam 612 is rotated, the end portion 610 is displaced in the axial direction of the cam 612. This causes a pivoting of the lever 608 in the region 609 of the pivot bearing to thus effect an actuation of the clutch, such as for the purpose of engagement and/or disengagement.

Rotation of the element 612 with the cam 611 is effected by a driving unit 613, such as an electric motor.

The electric motor 613 is actuated by a control or regulating unit 614. There is further provided a second actor or auxiliary actor 615 which can act upon, fix or block the disengaged clutch 601 in such a way that the clutch remains disengaged irrespective of an interruption of operation of the actor 600, namely regardless of the angular position of the cam 611. The actor 600 actuates the clutch for the purpose of engagement, and the actor 615 blocks the disengaged clutch at operating points which are selected in a planned manner.

The actor 615 is in signal transmitting communication with the control or regulating unit 614 by way of a signal transmitting conductor 616, and the control or regulating unit 614 is in signal transmitting communication with the electric motor 613 by way of a signal transmitting conductor 617.

The auxiliary actor 615 for the planned retention of the clutch in the disengaged condition can comprise, for example, an electromagnet and a locking device (for the lever 608) which is controlled thereby, or an electric motor and a suitable locking device.

Still further, the actor 600 comprises a roller-like element or cylinder cam 620 the peripheral surface 621 of which is provided with a cam groove 622 whose configuration varies in the axial direction as a function of angular displacement of the element 620. The cam groove 622 receives a pin or follower 623 which is operatively connected with an actuating element 624 of a transmission. The actuating element 624 is movable in the axial direction owing to the modulation of the cam groove 622 and due to the fact that the pin 623 extends into such cam groove. The element 624 serves to actuate, e.g., shift into and select the gear ratio or a particular gear in, the transmission.

If the transmission exhibits a typical enlarged H-scheme with gear shifting paths and a selecting track between such paths, axial movement of the element 624 can be utilised for the shifting within a path. For example, a movement within a path can be used to shift from a particular gear into neutral or into another gear, and it is also possible to shift from neutral into a particular gear.

The prime mover 613 also transmits torque to a roller 625 having a peripheral surface 626 constituting a cam profile which is modulated in the radial direction of the roller 625 and is tracked by a follower element 628 which is displaceable radially in response to rotation of the roller 625. The element 627 is essentially non-rotatably connected with the actuating element 624. For example, the element 627 can slidably engage the cam face 626 of the roller 625 or it can comprise a roller which contacts the cam face 626. The fact that the element 627 engages the modulated cam face 626 renders it possible to turn the element 626, i.e., the actuating element for the transmission. For example, this can be utilised to effect a selection between the gear shifting paths in the gear shifting gate of the transmission.

FIG. 12b is an end elevational view of the roller 625 with the cam profile 626 as well as of the lever 627 with the follower 628.

FIGS. 13a to 13f illustrate modifications for the automated actuation of a transmission and of a torque transmitting system. It can be of advantage if an actor is utilised for automated carrying out of the clutch actuating, gear shifting and gear ratio selecting operations. Furthermore, it can be of advantage if a first actor serves to effect an automated carrying out of the clutch actuating and gear shifting operations and a second actor is employed to effect an automated carrying out of the gear ratio selecting operation. Still further, it can be of advantage if one actor effects automated clutch actuating and gear ratio selecting operations, and another actor serves to effect an automated carrying out of the gear shifting operation. Moreover, it can be of advantage if one of the actors is utilised for the automated carrying out of the gear shifting and gear ratio selecting operations and a further actor is resorted to for automated carrying out of the clutch actuating operation. In accordance with a further advantageous embodiment of the invention, it can be desirable if a discrete actor serves to initiate, in a planned manner, each of the clutch actuating, gear shifting and gear ratio selecting operations. Still further, it can be of advantage if one actor is utilized for the actuation of the clutch and for the selection of the gear ratio, and another actor is resorted to for the carrying out of the clutch actuating and gear shifting operations. In accordance with a further modification, it can also be of advantage if a first actor is resorted to for the carrying out of the clutch actuating and gear ratio selecting operations, and a second actor is employed for the carrying out of the gear shifting and gear ratio selecting operations. Still further, it can be of advantage if a first actor serves to actuate the clutch and to carry out the gear shifting operation and a further actor serves to carry out the gear shifting and gear ratio selecting operations.

If three actors are utilised, the one or the other actor can carry out more than a single one of the functions of clutch actuation, gear shifting and gear ratio selection.

Figure 13A:
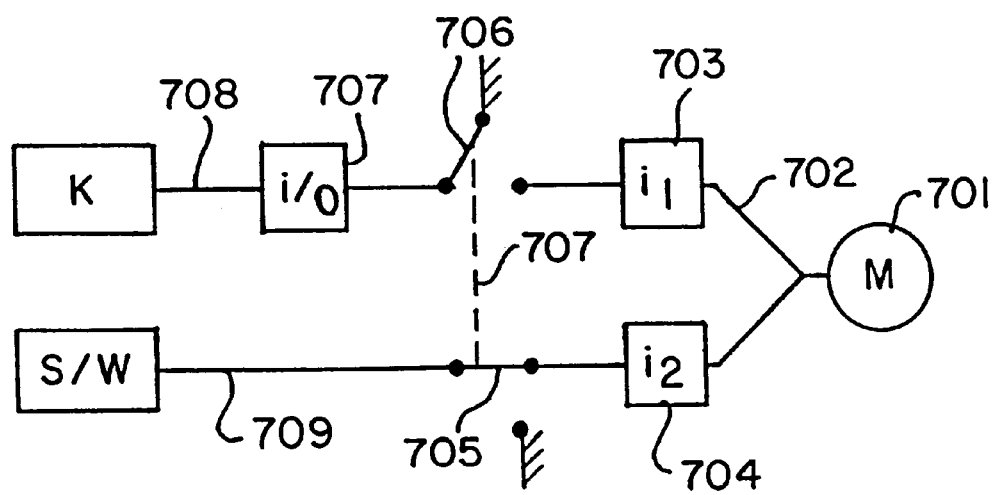

FIG. 13a illustrates a block diagram constituting a schematic representation of possible novel actuations of a change speed gear and an automated torque transmitting system. Starting with an actuating actor 701, such as a driving unit or an electric motor, this actor drives a transmission 702 with a divided output including discrete output paths 703, 704 each of which can have a different transmission ratio $i_1$, $i_2$, respectively. For example, the transmission 702 can constitute a superimposition transmission such as for example a planetary. If desired, there can be provided switches 705, 706 ahead of or behind the transmission, and each such switch can be assigned to one of the output paths. For example, these switches 705, 706 can constitute clutches or brakes or other types of mechanical switches. The two switches can be coupled with each other in such a way that the actuation of the clutch is blocked if the arrangement shifts to the gear shifting and/or to the gear ratio selecting operation. It is also possible to block the gear shifting and/or the gear ratio selecting operation when the arrangement shifts to actuation of the clutch. The actuating path to the operation of the clutch further contains a gearing which, for example, can carry out a conversion of a rotary movement into a translatory, such as pushing, movement. For example, such conversion can be carried out by resorting to a cam drive and/or to a crank drive and/or a feed screw drive.

The actuating path 708 is set up for the initiation of actuation of the clutch. The actuating path 709 is utilized to initiate the gear shifting and/or gear ratio selecting operation, and a combination of the gear shifting and gear ratio selecting operations can be effected in a sequential or in a non-sequential manner. For example, a coupling of the gear shifting and gear ratio selecting operations can be effected by resorting to a gearing.

Figure 13B:
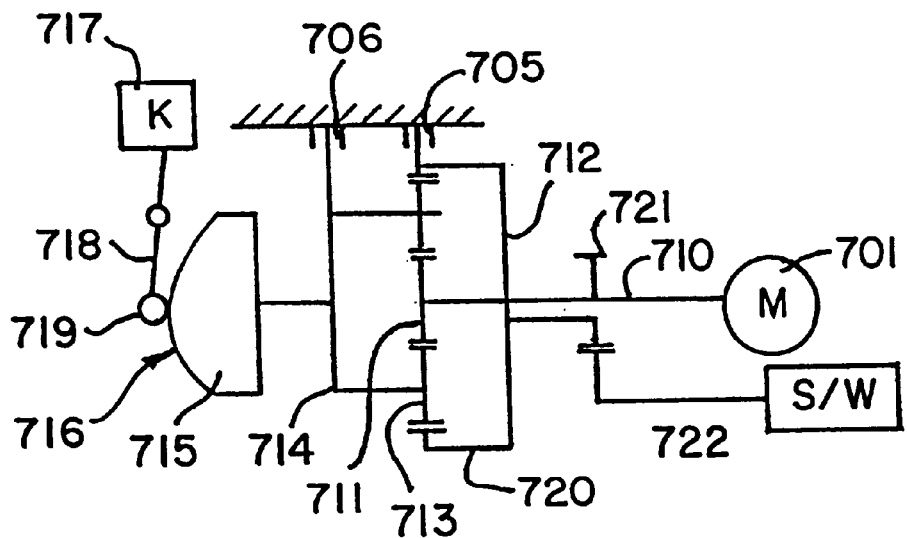

FIG. 13b illustrates a structure which can operate in a manner as described with reference to FIG. 13a. For example, the driving unit 701 can constitute an electric motor. The output shaft 710 of the driving unit 701 transmits torque to a sun gear 711 of a planetary 712. The planet pinions 713 are drivingly connected to an element 715 by way of a planet carrier 714, and the element 715 has a cam profile 716.

An actuation of the clutch 717 is effected by way of a lever 718 having at one of its ends a follower 719 which tracks the profile 716 of the cam 715. Due to modulation of the cam 715 as a function of the angular position thereof, one can achieve a planned actuation, such as a planned engagement or disengagement, of the clutch 717. The clutch 717 or the switch or brake 706 can be set to interrupt the actuation of the clutch.

The internal gear 720 of the planetary 712 is connected by a gear train 721 with an output shaft 722 which effects the gear shifting and/or the gear ratio selection in the transmission. The switch or brake 705 can be utilised to block or interrupt the gear shifting and/or the gear ratio selecting operation.

Figure 13C:
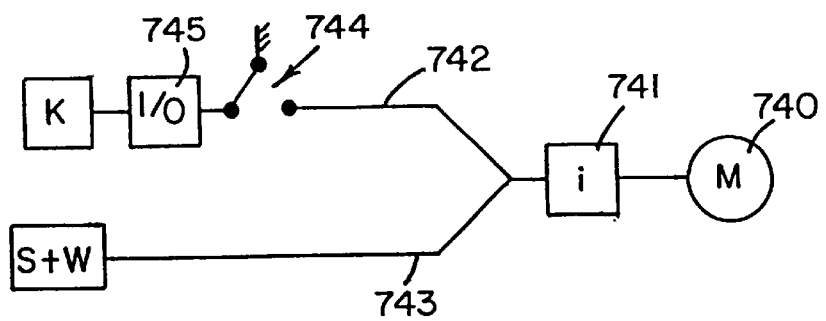

FIG. 13c is a diagrammatic view of an actuating arrangement with a driving unit 740, such as an electric motor, and a transmission 741. The transmission effects a division of the actuating path into actuating branches 742 and 743, namely a clutch actuation branch 742 and a transmission gear shifting and/or gear ratio selecting branch 743. The clutch actuating branch 742 contains a switch 744, such as a brake or a clutch, and this switch 744 can be followed by a gearing 745. The gearing 745 can serve to convert a rotary movement into an axial movement.

Figure 13D:
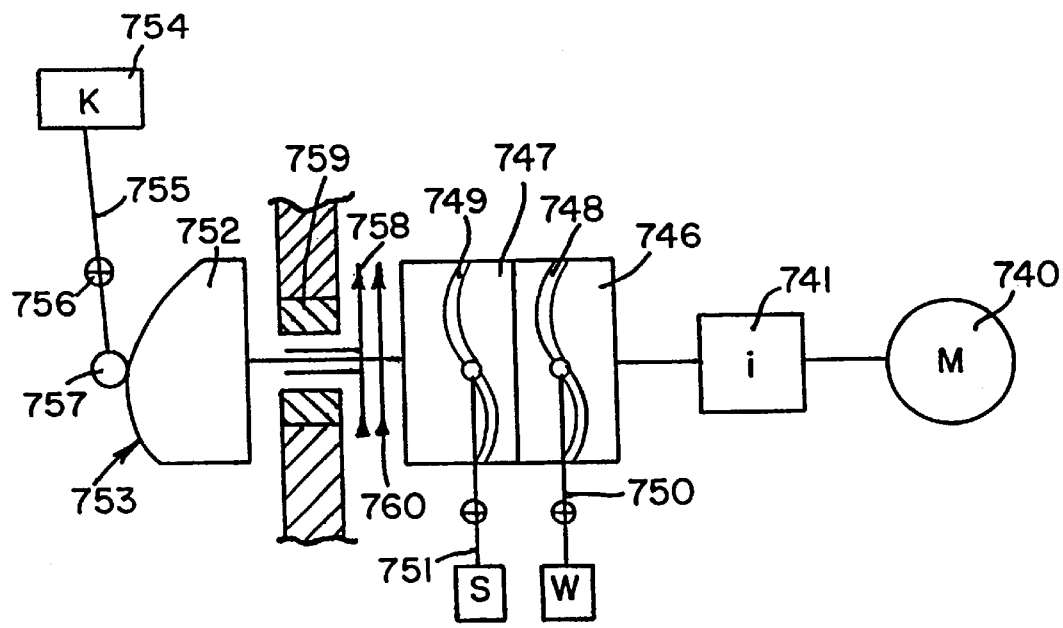

FIG. 13d shows schematically an embodiment according to FIG. 13c. For example, the illustrated driving unit 740 can include or constitute an electric motor. This driving unit is followed by a gearing 741 having a transmission ratio i. The gearing 741 is followed by two roller-shaped elements or cylinder cams 746 and 747 which are disposed in the torque transmitting path, and each of these roller-shaped elements has a circumferentially extending cam groove 748, 749 which is modulated in the axial direction. These cam grooves 748, 749 receive end portions of lever-shaped elements 750 and 751 which can effect a gear shifting and a gear ratio selecting operation of the transmission. The output shaft carries so-called rollers or shifting rollers and/or coupled together cam discs. All gear ratios of the transmission can be selected in response to each full revolution of the output shaft of the transmission, and idling zones for actuation of the clutch can be provided between successive shiftings into different gears. These rollers or shifting rollers are followed by a cam gearing 752 with the cam profile 753. In order to actuate the torque transmitting system, such as a clutch 754, a lever 755 tracks the cam profile 753 and is pivotably mounted in a bearing 756. The end portion 757 of the lever 755 can be in sliding or rolling contact with the cam profile 753. In order to activate or deactivate the cam drive, there is provided an axially movable hub 758 which can be provided, for example, with claws to serve as a switch. An electromagnet 759 is provided to move the shiftable hub 758 axially between a position in which it is secured to the housing and a second position in which it is non-rotatably connected with an entraining element 760 which is driven by the driving unit 740 and can rotate the cam 752.

Figure 13E:
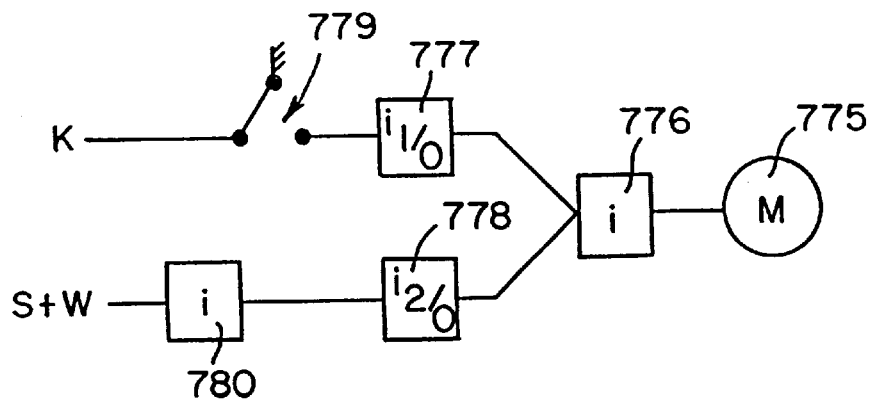

FIG. 13e illustrates a further embodiment which comprises a driving unit 775 followed by a transmission 776 with a ratio i. The transmission 776 splits the actuating path for actuation of the clutch from the path for the carrying out of the gear shifting and gear ratio selecting operations. Each of these paths contains a gearing 777, 778 in order to achieve a corresponding conformance of rotational speed and actuation. There is further provided a switch 779 which serves to turn on or off the actuation of the clutch. Furthermore, a transmission 780 is provided in the path for the carrying out of the gear shifting and/or of the gear ratio selecting operation.

Figure 13F:
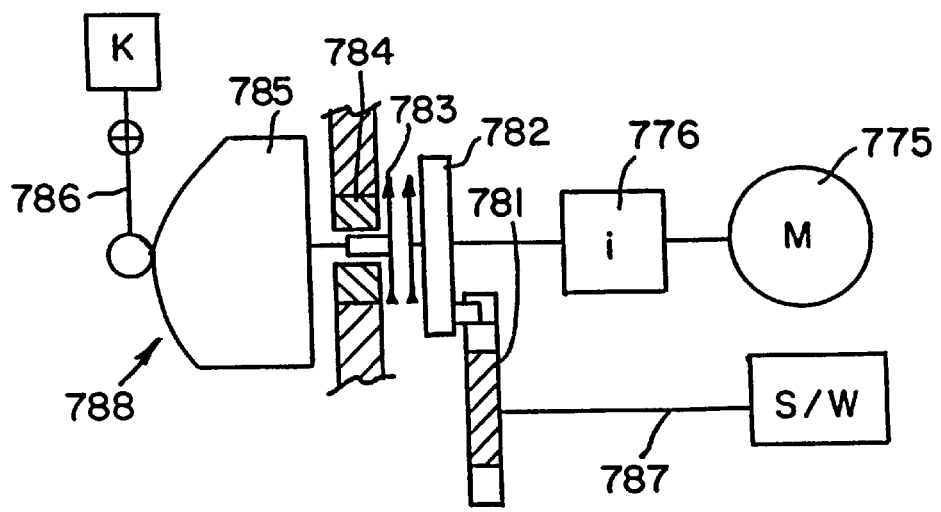

FIG. 13f illustrates an embodiment according to FIG. 13e. The driving unit 775 is followed by a transmission 776. A geneva movement 781, 782 drives the shaft for gear shifting and gear ratio selection. The actuation of the clutch is initiated by way of a reciprocable sleeve or hub 783 in conjunction with the energization of an electromagnet 784 to drive a cam element 785 having a cam profile 788. Modulation of the cam profile 788 renders it possible to achieve a controlled actuation of the clutch through the medium of a lever 786.

In order to actuate the torque transmitting system, such as a clutch, and/or to effect the gear shifting and/or gear ratio selecting operation, the necessary actuating movements can be transmitted through the medium of levers, Bowden wires or hydrostatic or pneumatic devices. For example, a gearing can actuate a Bowden wire or a hydraulic device which initiates the transmission of an actuating movement from the transmission to the unit to be actuated.

As illustrated and described in connection with the preceding examples, one can realize an automated change speed gear with an actor wherein the clutch actuation can be interrupted by resorting to planned operation of, for example, a brake or a switch or a clutch, so that only the carrying out of the gear shifting and gear ratio selecting operations can be effected within a portion of the overall operating range. It can also be of advantage if an actor is designed in such a way that one can elect between the actuating operation "clutching" and the actuating operation "switching". Still further, it can be found to be of advantage that, if necessary, there is initiated a self-locking of component parts of the transmission or clutches or brakes, for example, by rendering such self-locking dependent on the distance covered by the actor(s). An advantageous embodiment employs a shiftable hub or sleeve to restore or to interrupt the ability to actuate the clutch, and it is advisable that a self-locking take place when the clutch cannot be actuated in order to ensure that the clutch can be maintained in disengaged condition against an initial stress, such as the bias of a diaphragm spring in the clutch.

It is further desirable if an actor for an automated change speed gear is characterised by a roller with inegrated planet gears and if there is further provided a driving unit, such as an electric motor, in order to drive the at least one roller. It can be of advantage in this connection if the driving unit can be utilised independently or separately for clutching, gear shifting or gear ratio selection as well as for any combination of these three types of actuation.

Figure 14A:
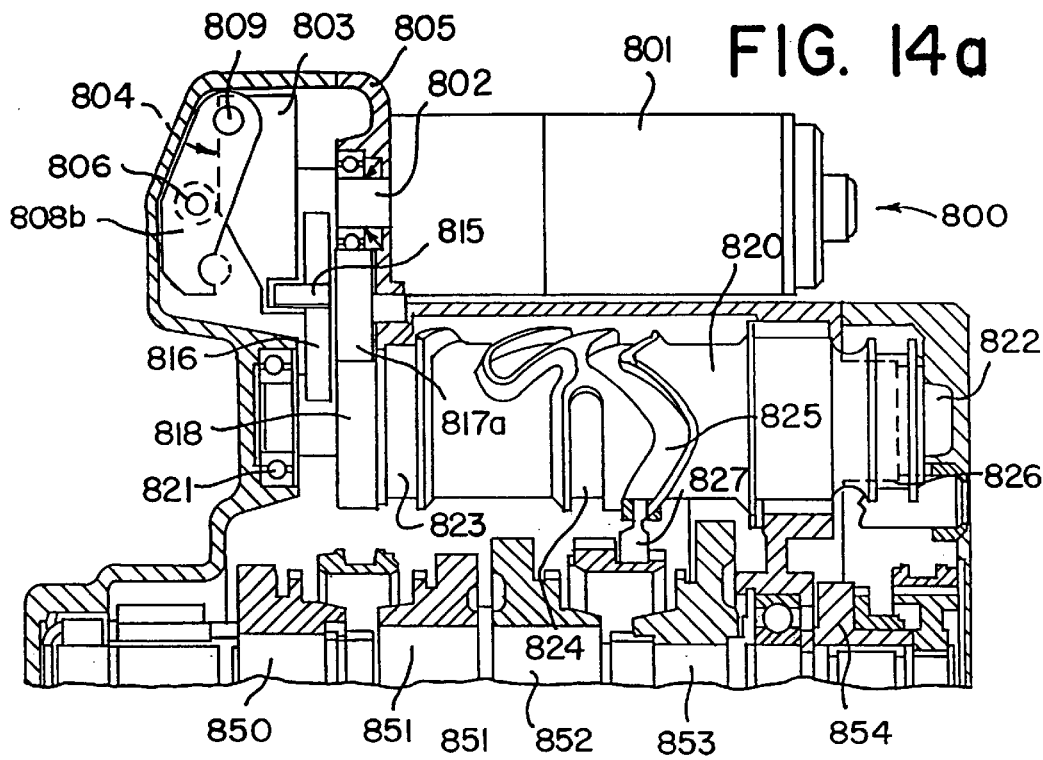
Figure 14B:
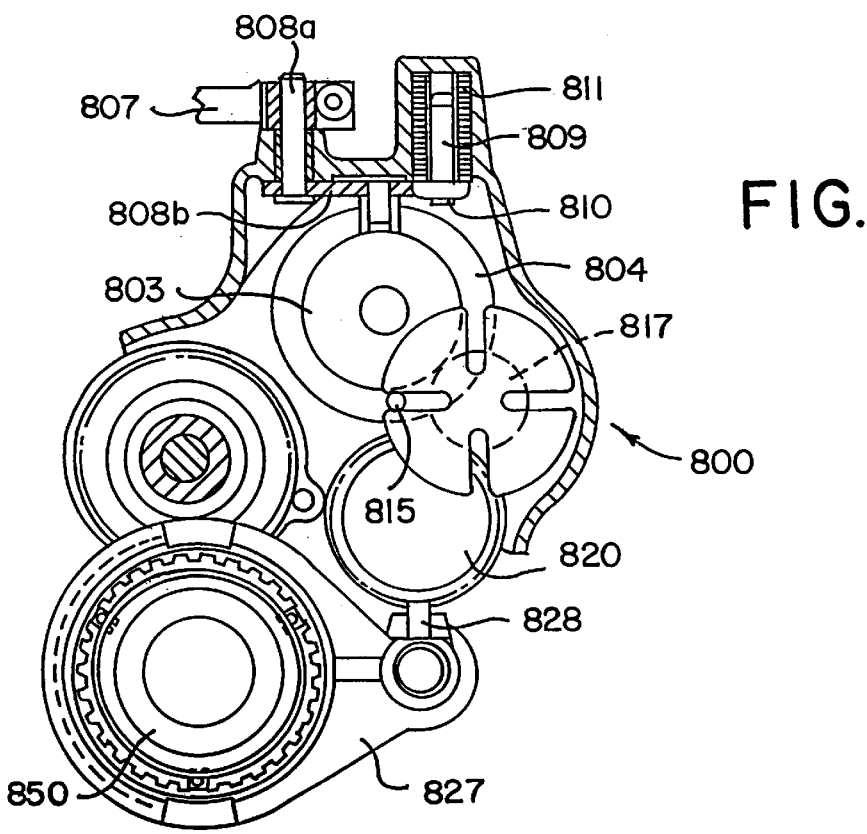

FIGS. 14a and 14b illustrate an automated change speed gear and a mode of automated operation of a torque transmitting system in the power train between a driving unit, such as a combustion engine, and the transmission. The selection of the ratio of the transmission is also effected in an automated way.

The transmission 800, which is operated in an automated manner, comprises a driving unit 801, such as for example an electric motor, which is provided on or secured to a housing 805. The output shaft 802 of the motor drives a rotary element 803 having a cam profile 804 which serves to actuate the torque transmitting system. The cam profile 804 of the rotary element 803 is configurated in such a way that it is modulated in the axial direction when the element 803 is caused to rotate. The clutch is actuated by a follower pin 806 which engages the cam profile 804, and such pin can carry or can constitute a roller follower which engages or contacts the cam profile 804 of the rotary element or cam 803. The modulation of the cam profile 804 entails the pivoting of a lever 807 which is operatively connected with the pin 806 by way of connecting members 808a and 808b.

f the clutch is fully disengaged or fully engaged, it can be fixed in such position by a bolt or stud 809 adapted to enter an opening or recess 810 of the connecting member 808b to thus fix or arrest the lever 807 in the momentary position. For example, the bolt or stud 809 can be moved in the axial direction by an actor, such as an electromagnet 811 or an electric motor, to move axially and to penetrate into the opening 810 or to be withdrawn from such opening.

The rotary element 803 comprises a stud or pin 815 which extends in the axial direction. The substantially circular element 803, the stud or pin 815 and a substantially disc-shaped element 816 together constitute an indexing mechanism, such as for example, a geneva movement. To this end, the stud or pin 815 can extend into slot-shaped portions 817 of the disc 816. The slot-shaped portions 817 extend, for example, in a radial direction and are preferably at least substantially equidistant from each other in the circumferential direction of the disc 816. In the embodiment of FIGS. 14a and 14b, the disc 816 is provided with four radially extending slot-shaped portions 817 which are angularly offset from each other by 90°.

The slotted disc 816 is non-rotatably conneceted with a spur gear 817a which drives a gear 818. The latter transmits torque to a roller or cylinder cam 820 which is journalled in bearings 821 and 822. The roller 820 has cam grooves 823, 824, 825 and 826 serving to receive followers of shifting forks. The cam grooves are modulated in such a way that the shifting forks (one shown at 827) are moved axially when the roller 820 is rotated; this serves to shift the transmission into a selected gear ratio. The cam grooves 823 to 826 are designed to meet the requirements for a sequential shifting of a transmission with five forward gears and a reverse gear. The shifting forks 827 are pivotable at 828 and can be provided, for example, with roller followers which extend into the respective cam grooves 823 to 826. The transmission is shifted sequentially or seriatim into all of the gear ratios substantially during each revolution of the roller 820.

There are further shown transmission gear wheels 850 to 854 which serve to permit the realization of a driving connection with an appropriate transmission ratio.

It can be of advantage in the aforedescribed embodiments if an actor is employed to act as a switch for the shifting between the initiation of a clutch actuating operation and a gear shifting procedure. Moreover, it can be of particular advantage if the clutch can be fixed or arrested in the disengaged or engaged condition, for example, in a manner as can be carried out by the mechanism shown in FIGS. 14a and 14b. In this manner, one can ensure that, if the transmission is set for sequential shifting, the clutch can be arrested or blocked in the disengaged condition which renders it possible to shift the transmission through several gear ratios without it being necessary to engage and again disengage the clutch in the course of such actuation of the transmission.

It can also be of advantage if a roller, such as the cylinder cam 820, is caused to receive motion by way of an indexing mechanism, such as for example the geneva movement 815, 816, 817. This exhibits the advantage that it is possible to index the roller 820 in a planned or predetermined manner through predetermined angles.

The auxiliary actor in the actuating arrangement of FIGS. 14a and 14b serves to arrest or fix the clutch in the engaged or disengaged condition and can be realized by a pin or stud that is movable by an electromagnet between axially spaced-apart positions in one of which it extends into an opening and in another of which it is extracted or withdrawn from such opening. It is of advantage if the actuation of the clutch is prevented, i.e., if the clutch is blocked, when the pin or stud extends into the opening. Furthermore, it is of advantage if the transmission stage which is put to use, for example, to carry out the gear shifting operation and/or the gear ratio selecting operation is realised to conform the number of phases of movement of the change speed gear.

Figure 15:
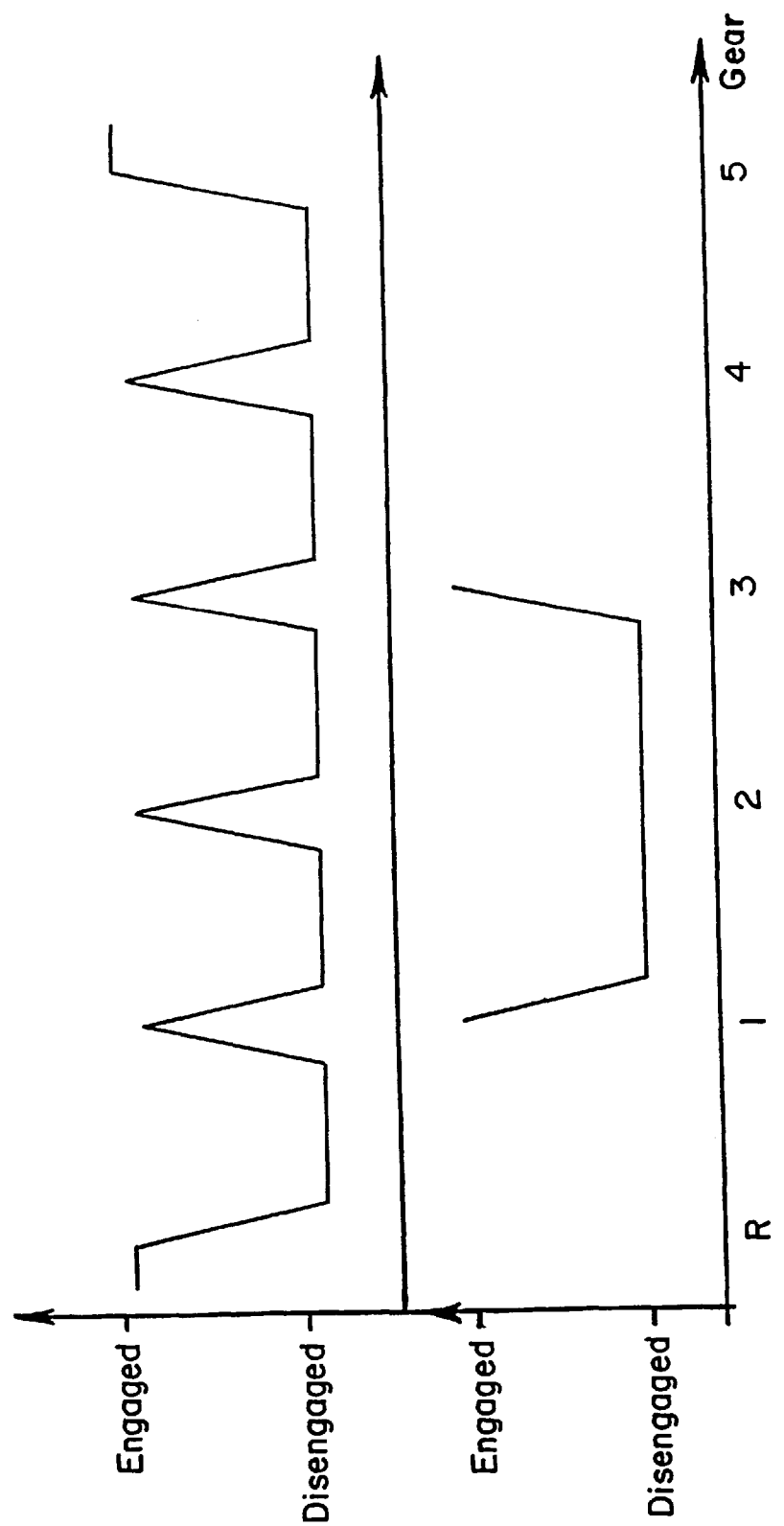
FIG. 15 a diagram.

FIG. 15 depicts a progress diagram wherein the actuation of the clutch is represented as a function of the gear shifting operation of the transmission. The torque transmitting system, such as a clutch, is set or actuated in a planned manner within an operating stage between the disengaged and engaged conditions. The upper half of FIG. 15 illustrates a clutch actuating and gear shifting procedure, for example, a procedure involving a shifting from reverse through the individual gears 1 to 5. In this example, the shifting operation is carried out sequentially, and the clutch is disengaged between successive shifting operations to be engaged and again disengaged at least for a short interval of time on reaching of each of the gears.

The lower half of FIG. 15 illustrates an example wherein, starting from the first gear, the shifting takes place into the third gear and the clutch is fixed or blocked in the disengaged condition, in the region of the second gear, in such a way that, in this region, the clutch is not engaged and is again disengaged.

Such fixing or blocking of the clutch in the disengaged condition, for example beyond the second gear, can entail a more rapid gear shifting operation because one can save the times for engagement and disengagement of the clutch in the region of the second gear.

Figure 16A:
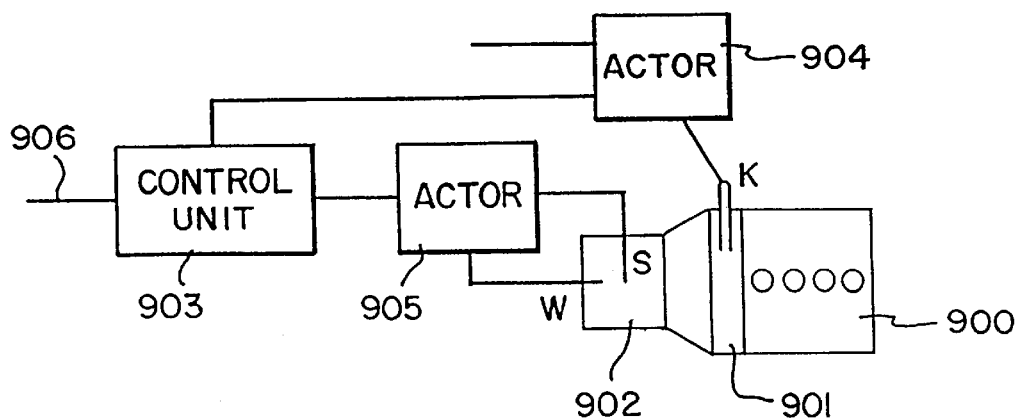
FIGS. 16a to 16c block diagrams.
Figure 16B:
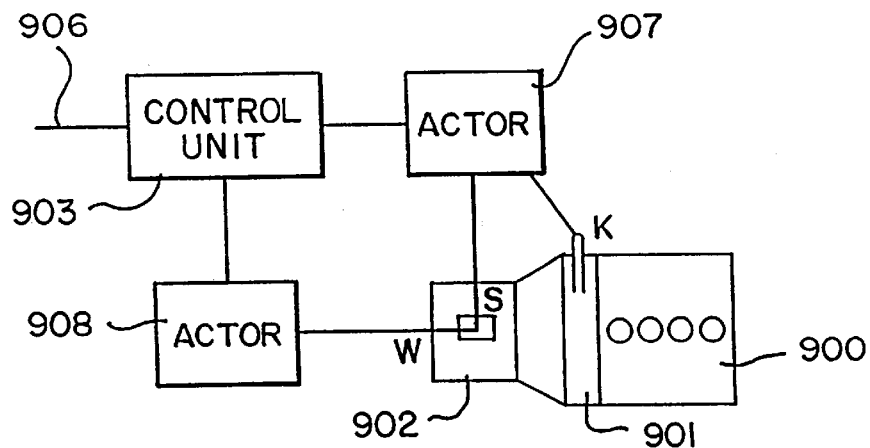
Figure 16C:
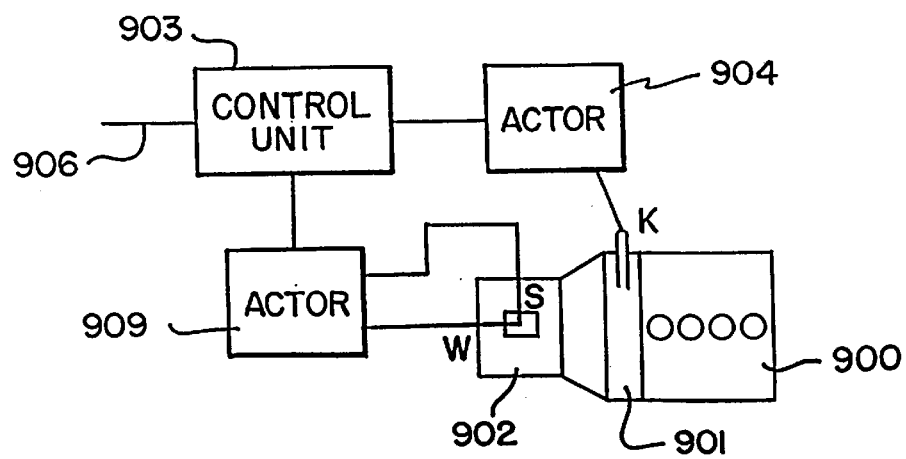

FIGS. 16a to 16c are schematic representations of an arrangement for automated actuation of a torque transmitting system and of a transmission. Referring first to FIG. 16a, there are shown a prime mover 900, a torque transmitting system 901, and a transmission 902. Furthermore, there is shown a regulating or control unit or apparatus 903 which actuates at least the actors 904 and 905, but the control unit 903 is further in signal transmitting communication with other electronic units and, for example, also sensors by way of a signal transmitting conductor 906. For example, the other electronic units can constitute the engine electronics or electronic units of antiblocking systems (ABS) or antislip regulators (ASR).

The control or regulating unit 903 can be an integrated regulating or control unit for the regulation of the transmission and the clutch; however, it is also possible to utilize discrete control or regulating units for the regulation of operation of the transmission and the clutch.

FIG. 16a further shows the actor 904 which initiates the actuation of the torque transmitting system 901, such as a clutch. The actor 905 can be controlled by the control or regulating unit 903 to initiate the gear shifting and gear ratio selection for the determination of the ratio of the transmission 902. For example, the actor 905 can be equipped with a shifting roller, such as a cylinder cam, which permits a sequential shifting into the ratios of the transmission.

FIG. 16b illustrates a modification of the actuating arrangement which is shown in FIG. 16a. An actor 907 is resorted to to initiate the operation of the torque transmitting system 901 and to initiate the gear shifting operation of the transmission 902, and an actor 908 is employed for the carrying out of the gear ratio selecting operation.

FIG. 16c depicts a modification of the structure of FIG. 16a. The actor 904 regulates or controls the actuation of the torque transmitting system 901. An actor 909 serves, for example, to actuate the central shifting shaft of the transmission 902 to carry out the gear shifting and gear ratio selecting operations, and it is possible to carry out a sequential or a non-sequential shifting into the gears of the transmission. The actor 909 can be designed as an add-on actor, namely a component part which is installed on a conventional or basically unchanged manual change speed gear by being installed on the central shifting shaft of the transmission so that the actor 909 is used in lieu of a mechanism for manual shifting of the transmission. The actor 909 can be an arrangement comprising at least one actor which actuates the central shaft of the transmission 902 for gear shifting and gear ratio selection by way of an available mechanism.

Figures 17A, 17B, 17C, 17D:
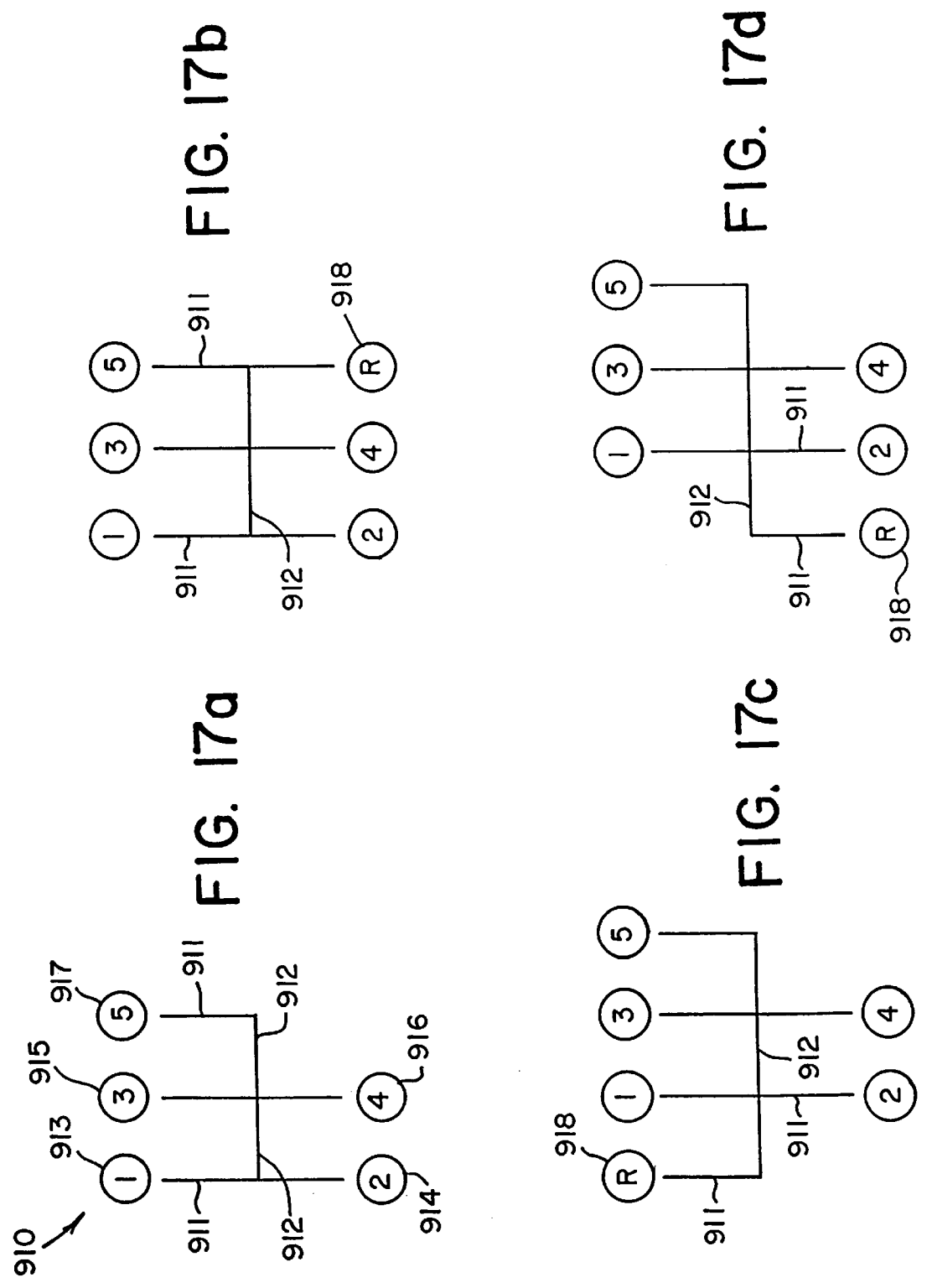

FIG. 17a is a diagrammatic view of a typical five-ratio transmission but with the position of the reverse gear omitted. The layout of this transmission will be described on the basis of an enlarged H-shifting scheme, there being shown gear shifting paths 911 and gear selecting tracks 912. There are further shown the positions 913 to 917 of the gears 1 to 5. The position of the reverse gear R can be selected in accordance with one of the following presently preferred three embodiments.

FIG. 17b illustrates the position of the reverse gear in the gear shifting path 911 of the fifth forward gear. FIG. 17c shows the position of the reverse gear R in a gear shifting path 911 adjacent the 1-2 gear shifting path, the shifting into reverse gear R taking place in the same direction as that into the forward gears 1, 3 and 5. FIG. 17d illustrates a modification of the scheme of FIG. 17c in that the reverse gear R is located in the path 911 adjacent the 1-2 path and the direction of shifting into reverse gear is the same as that of shifting into the gears 2 and 4. This scheme corresponds, for example, to that for external actuation of a central shifting shaft, the arrangement of sets of gears and for example shifting forks being such that one arrives at the scheme of FIG. 17d. A transformation, for example from the scheme of FIG. 17c into that of FIG. 17d or vice versa can be carried out, for example, by a rerouting or coupling of the reverse gear so that the external movement in the same direction as toward the first gear, as shown in FIG. 17c, can be replaced by an external movement in the same direction as toward the second gear, as shown in FIG. 17d, for example, by carrying out an appropriate rerouting of the gear shift lever.

A change of the shifting scheme, for example, for actuation of the central shifting shaft, can be desirable or advisable in a slightly modified transmission for the planned utilization of the periodicities or symmetries in the actuating movement.

Figure 18:
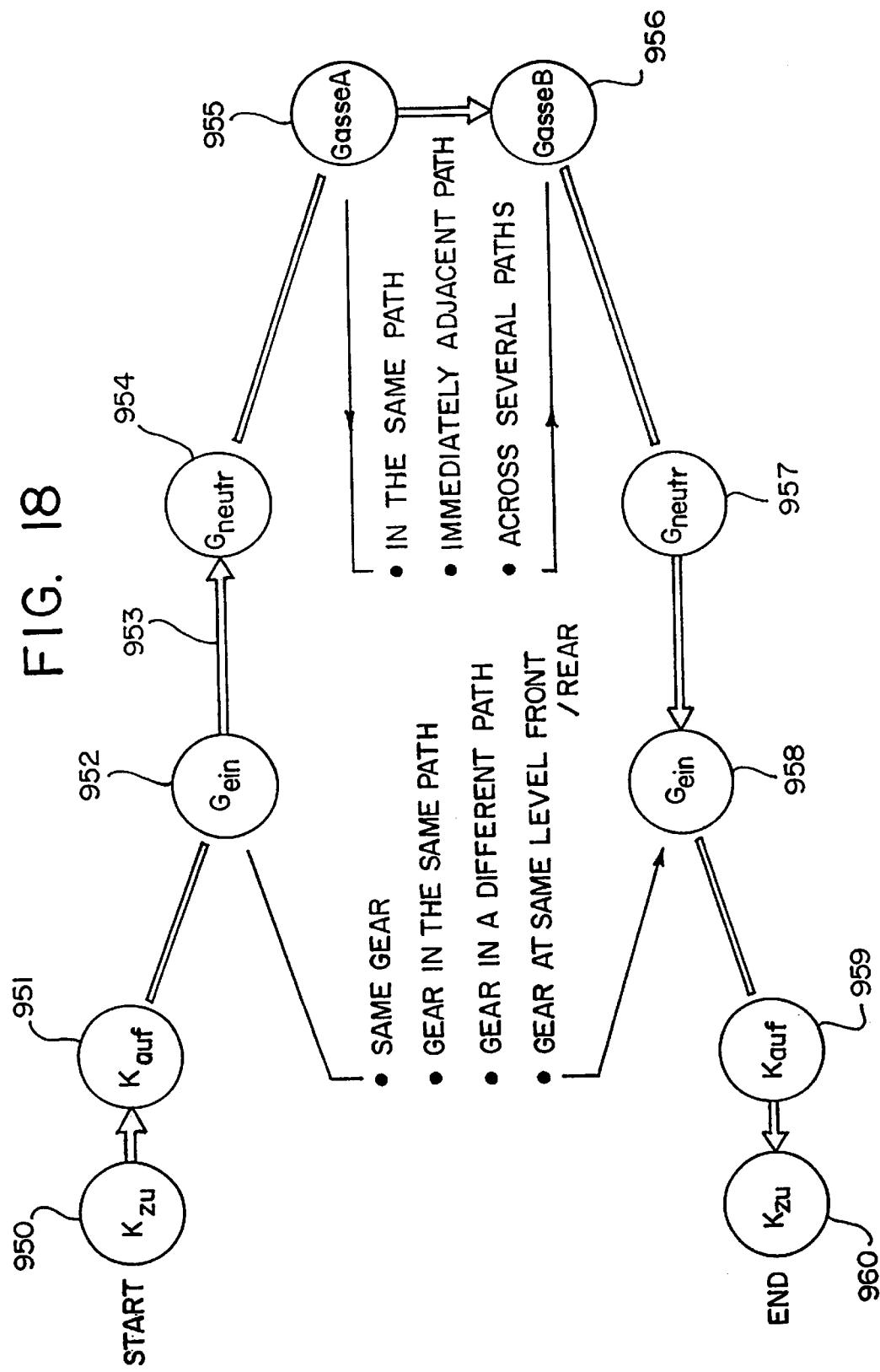
FIG. 18 a diagram.

FIG. 18 illustrates the progress of a shifting operation starting with the transmission set in a gear and with the clutch engaged. The block 950 denotes that the transmission is in gear and that the clutch is engaged ($K_{zu}$). If a shifting operation is initiated, for example, in response to a signal from the operator of the vehicle, such as a signal transmitted by a switch, or a shifting signal transmitted, for example, by a control or regulating unit in accordance with characteristic shifting curves, the clutch is disengaged ($K_{auf}$) as denoted by the block 951. The gear which was initially shifted into ($G_{ein}$) is denoted by the block 952 and is still unchanged. An actuation in a sense as indicated by the arrow 953 entails a withdrawal from the gear denoted by the block 952 and a shifting into neutral ($G_{neutr}$) as indicated by the block 954. In the next step, starting from the actually available path (GasseA) as denoted by the block 955, one can select a further path (GasseB) as denoted by the block 956 which can be the same as the original path or a path immediately adjacent thereto or a path which can be reached subsequent to traversing one or more paths. Once the path (GasseB) has been selected as indicated by the block 956, a neutral position ($G_{neutr}$) of the transmission, as indicated by the block 957, can be followed in a direction toward a gear ($G_{ein}$) as denoted by the block 958 so that the state of the clutch can be changed from disengaged ($K_{auf}$) as denoted by the block 959 to engaged ($K_{zu}$) as denoted by the block 960. Alternatively, and if one is to exceed from the position denoted by the block 952, one can select the position denoted by the block 958 in such a way that the position at 958 is the same as that at 952 or that one selects a gear in the same path, or that one selects a gear in a different path and/or that one selects a gear corresponding to a gear in front or in the back.

Figure 19:
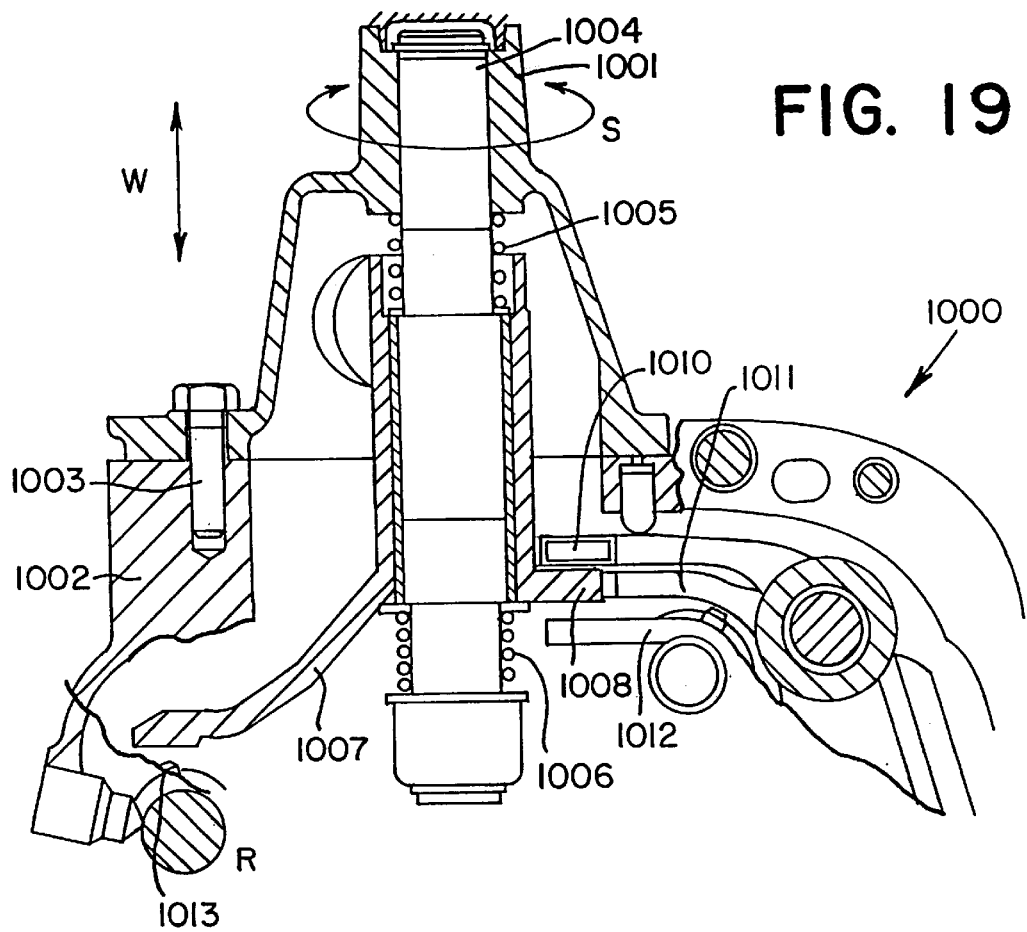
FIG. 19 a partial view of a transmission.

FIG. 19 shows in a sectional view a detail of a transmission 1000 with an actuation dome 1001 for the actuation or for the shifting in different ratios of the transmission. For example, the actuating dome 1001 can be secured to the transmission housing or case 1002 by fastener means 1003 in the form of screws and can shift into and/or select gear ratios by way of the central shifting shaft 1004. For example, the central shifting shaft 1004 can be biased by energy storing elements 1005 and/or 1006 in an axial direction or in a circumferential direction so that the central shifting shaft 1004 can assume a predeterminable position which is the most satisfactory position as far as the energy transfer is concerned when the transmission is not actuated. The central shifting shaft 1004 is provided or cooperates with arms 1007 or cams 1008 or is non-rotatably connected therewith. These arms and/or cams cooperate with shifting elements in the interior of the transmission in order to shift into or to withdraw from selected gears. For example, there can be provided motion receiving means 1010, 1011 and 1012 for shifting into a first, second, third, fourth and fifth gear and/or shifting elements 1013 which are located in the interior of the transmission to shift the transmission into reverse R. In order to shift into one of the forward gears one to five, the cam 1008 enters an opening or recess 1020 (FIG. 20c) of a shifting rod (FIG. 20c) or into an opening which provided therefor in a motion receiving portion of one of the shifting forks 1010 to 1012. When the central shifting shaft 1004 is caused to turn while the cam 1008 extends into the receiving portion of one of the shifting forks 1010 to 1012, this can entail a pivoting or a shifting of a displacing element in the interior of the transmission, such as for example one of the forks 1010 to 1012, so that the shifting sleeve or muff of the transmission carries out a shifting movement relative to the gears of the transmission. Thus, gear shifting is caused by a turning of the central shifting shaft 1004 in a given axial position of such shaft. On the other hand, a gear ratio selection necessitates an axial movement of the central shifting shaft 1004 in order to select the cam receiving portion of that one of the central shifting elements 1010 to 1012 or of the element 1013 which is to be engaged by the cam 1008 of the shaft 1004. The selection of the reverse gear is carried out by the projection 1007.

Figure 20A:
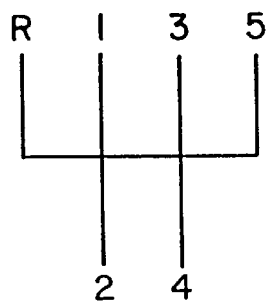
FIG. 20a a gear shifting gate.
Figure 20B:
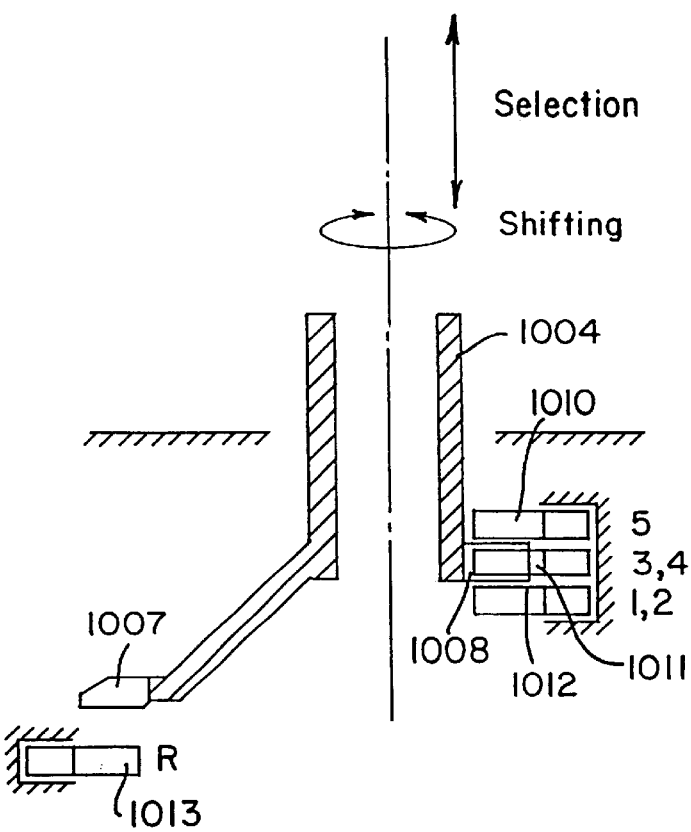
FIG. 20b a schematic representation of an element of a transmission.
Figure 20C:
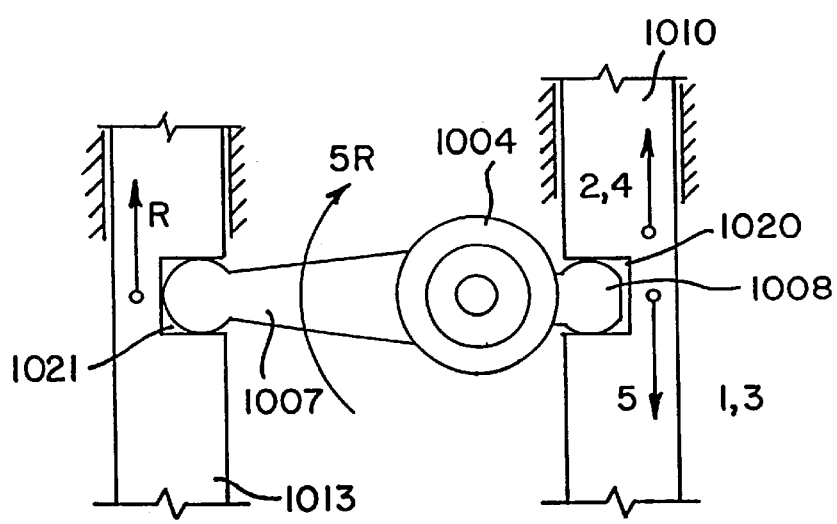
FIG. 20c a schematic representation of an element of a transmission.

The actor (not shown in FIG. 19) actuates the central shifting shaft 1004 not only in the circumferential direction, i.e., in a direction to carry out a shifting operation, but also in the axial direction, namely in the direction to effect a selection of a gear ratio. Such mode of operation will be explained once more with reference to the very diagrammatic (schematic) representations of FIGS. 20a to 20c. FIG. 20a illustrates a gear shifting scheme upon which the embodiment of FIGS. 19, 20b, 20c is based. The movable central shifting shaft 1004 can be displaced in the axial direction to select a gear ratio as well as in the circumferential direction to carry out a gear shifting operation. The cam 1008 and the actuating arm 1007 can respectively cooperate with the shifting elements 1010, 1011, 1012 and 1013 all of which are disposed in the interior of the transmission, the cam 1008 being adapted to enter an opening or recess in a selected one of the elements 1010, 1011 and 1012. On the other hand, the arm 1007 can enter the opening 1021 of the element 1013 in an appropriate axial position of the shifting shaft 1004. In the embodiment of FIGS. 19, 20b, 20c, the central shifting shaft 1004 must be moved in a first direction in order to shift into fifth gear and into reverse even though the element 1013 must be moved in a direction counter to that required for the element 1010. The reason is that the actuating elements 1010 and 1013 are located opposite each other with reference to the axis of rotation of the central shifting shaft 1004.

Figure 21A:
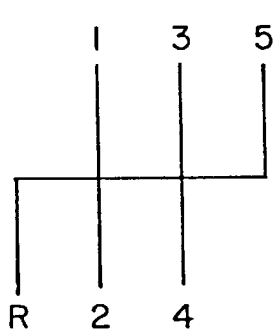
FIG. 21a a gear shifting gate.
Figure 21B:
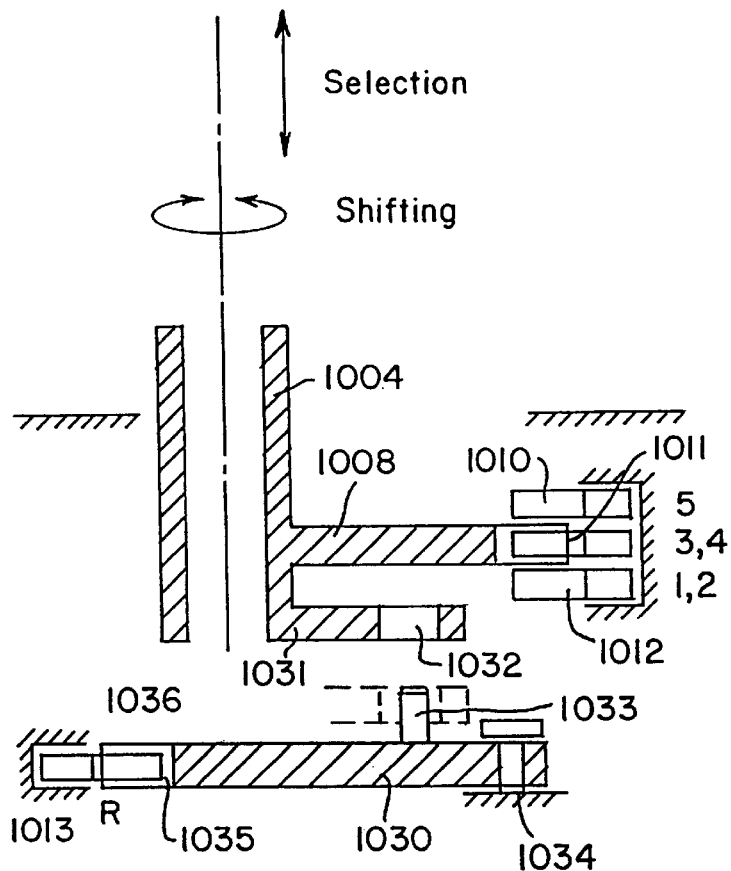
FIG. 21b a schematic representation of an element of a transmission.
Figure 21C:
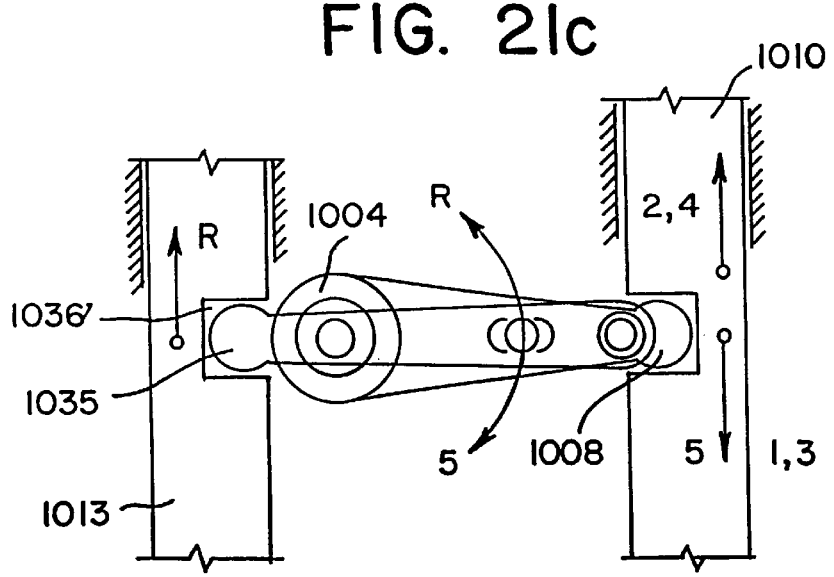
FIG. 21c a schematic representation of an element of a transmission.

FIGS. 21a to 21c illustrate an embodiment which is preferred when the central shifting shaft 1004 has undergone a certain modification. The scheme of FIG. 20a can be converted into that of FIG. 21a by changing the position of the reverse gear R in that the operative connection between the central shifting shaft 1004 and the internal shifting or switching element 1013 includes a lever 1030. The central shifting shaft 1004 is provided with an arm 1031 having a receiving portion 1032 adapted to receive a pin or stud 1033 of the lever 1030. The lever 1030 is pivotably mounted in a bearing 1034 and its portion or follower 1035 extends into a recess or opening 1036 of the element 1013. As in the previously described embodiment, a shifting into the gears one to five is effected by way of an element 1008, such as a pin or stud, which can enter the opening of a selected one of the internal shifting elements 1010 to 1012. A shifting into reverse is carried out in response to turning of the central shifting shaft 1004 in a direction counter to that required to shift into the fifth gear because the lever 1030 ensures that the internal element 1013 is caused to move in a direction which is necessary to shift into reverse.

Depending upon the particulars of the transmission, the central shifting shaft can be associated with a lever, such as the lever 1030, in order to bring about a change of the shifting scheme for external operation of the transmission without necessitating pronounced changes in the design of the transmission (compare FIGS. 20a to 20c with the FIGS. 21a to 21c).

Such relatively small change of the central shifting shaft and more particularly of the connections between this shaft and the internal elements of the transmission renders it possible to resort to or to take advantage of periodicities which is preferred because it renders it possible to simplify the actor of the actuating arrangement.

Figure 22A:
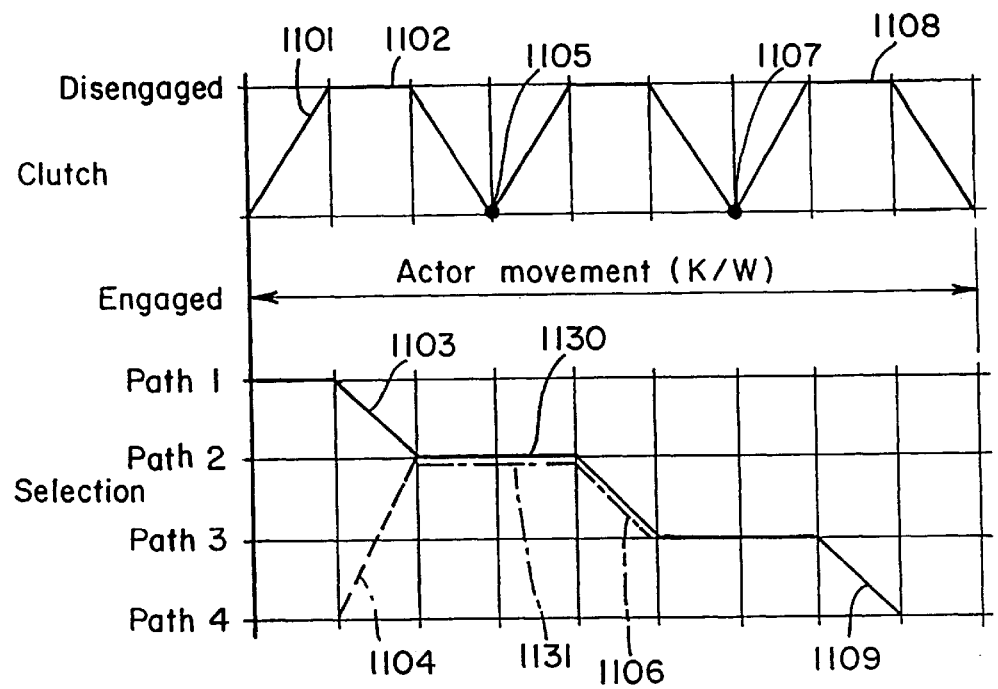
FIGS. 22a to 25b diagrams

FIG. 22a illustrates an embodiment which employs an actor for the initiation of movements of the clutch and the gear ratio selecting operation of the transmission, as well as another actor serving to initiate the gear shifting operations of the transmission. The initiation of actuation of the clutch and the initiation of the gear ratio selecting operation are combined in such a way that, in a particular condition of the transmission with the gear shifting means in a previously selected path, the clutch is first disengaged as indicated by the curve 1101 before a change of paths can take place (while the clutch is disengaged as illustrated at 1102) as shown, for example, at 1103, namely from the path one to the path two. It is also possible to carry out in this region a change of paths as indicated by the broken line 1104, depending upon the selected basic scheme. An actuation or a shift of paths as indicated by the curve 1103 from the path one into the path two can correspond, for example, to the schemes shown in FIGS. 17c and 17d, whereas a shift from the path four to the path two can correspond, for example, to that shown in FIG. 17b, e.g., to carry out a shifting operation from reverse into the gear one. The next stage can involve, for example, the carrying out of a shifting operation before the clutch is engaged while the transmission has selected the path two. The clutch is engaged at 1105 and can be disengaged thereafter for the carrying out of a shift of paths as indicated by the curve 1106 prior to renewed engagement of the clutch, as at 1107. Thereafter, the procedure can be repeated in such a way that, starting at the point 1107, the clutch is again disengaged and remains disengaged as indicated at 1108 where a change of paths takes place as indicated by the curve 1109. If a change involves a movement across one or more paths, it is possible to fix or block the clutch, for example, in the disengaged condition so that when a desired path is reached, it is not absolutely necessary to again engage and thereupon disengage the clutch before the transmission can shift into the next path. If the clutch is disengaged and a particular path has been selected, the second actor can be operated to initiate a gear shifting operation within the selected path starting from the neutral position 1120 and into a path corresponding to a front or forward position in the scheme 1121 or to a rear or rearward position as indicated at 1122.

Figure 22B:
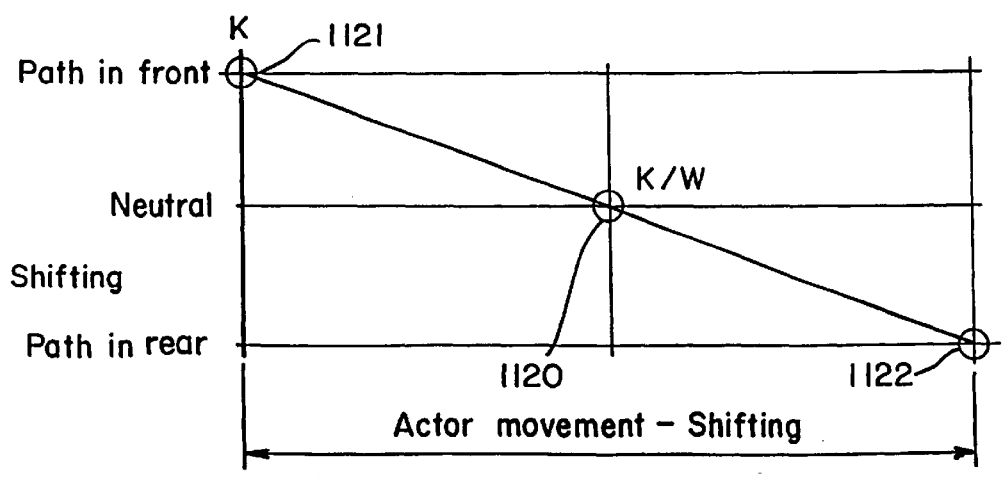

The diagrams of FIGS. 22a and 22b illustrate that, basically, the initiation of a shifting or gear ratio selecting operation is preceded by an at least partial disengagement of the clutch and a shifting out of a gear can take place already while the clutch is only partially disengaged. When the clutch is disengaged, one can carry out a shifting operation from a previously selected gear into neutral, as indicated at 1121, and thereupon to 1120 prior to carrying out a change of paths in accordance with the desired newly selected transmission ratio. From the point 1120, one can shift to 1121 or to 1122 before the clutch is reengaged. A division or combination of clutching and gear ratio selecting operations by means of a first actor and a shifting by means of a second actor render it possible to avoid sequential shifting and any particular gears can be selected directly in any desired sequence without it being necessary to shift into intermediate gears, i.e., not into that gear which is intended to be selected in order to achieve a desired transmission ratio.

Starting from the path one in FIG. 22a, and as indicated by the progress of the solid-line curve 1130, the selection presents a symmetrical image or a partially symmetrical image, there being a half plateau at the start followed by a shifting of paths which, in turn, is followed by a plateau and thereafter a shifting of paths, a further plateau, a shifting of paths and a half plateau (beyond 1109). Such quasi periodical progress can be memorised in an actor, by resorting to suitable gearings, by way of example a cam gearing, in such a way that it is necessary to cover only a portion of the distance, such as that indicated by the dot-dash line 1131, but such distance (as indicated at 1131) must be covered several times in order to cover the entire scheme for the selection of the paths. In accordance with a pattern as denoted by the curve 1104 to shift from the path 4 into the path 2, for example in a manner as shown in FIG. 17b, such advantageous periodicity can be utilised only to a limited extent if the actuating arrangement is to operate with an actor of relatively simple design. Nevertheless, one can recognise the periodicities and it can be seen that the two shifts, from the path 2 into the path 3 and from the path 3 into the path 4., are basically identical or similar or analogous.

Figure 23:
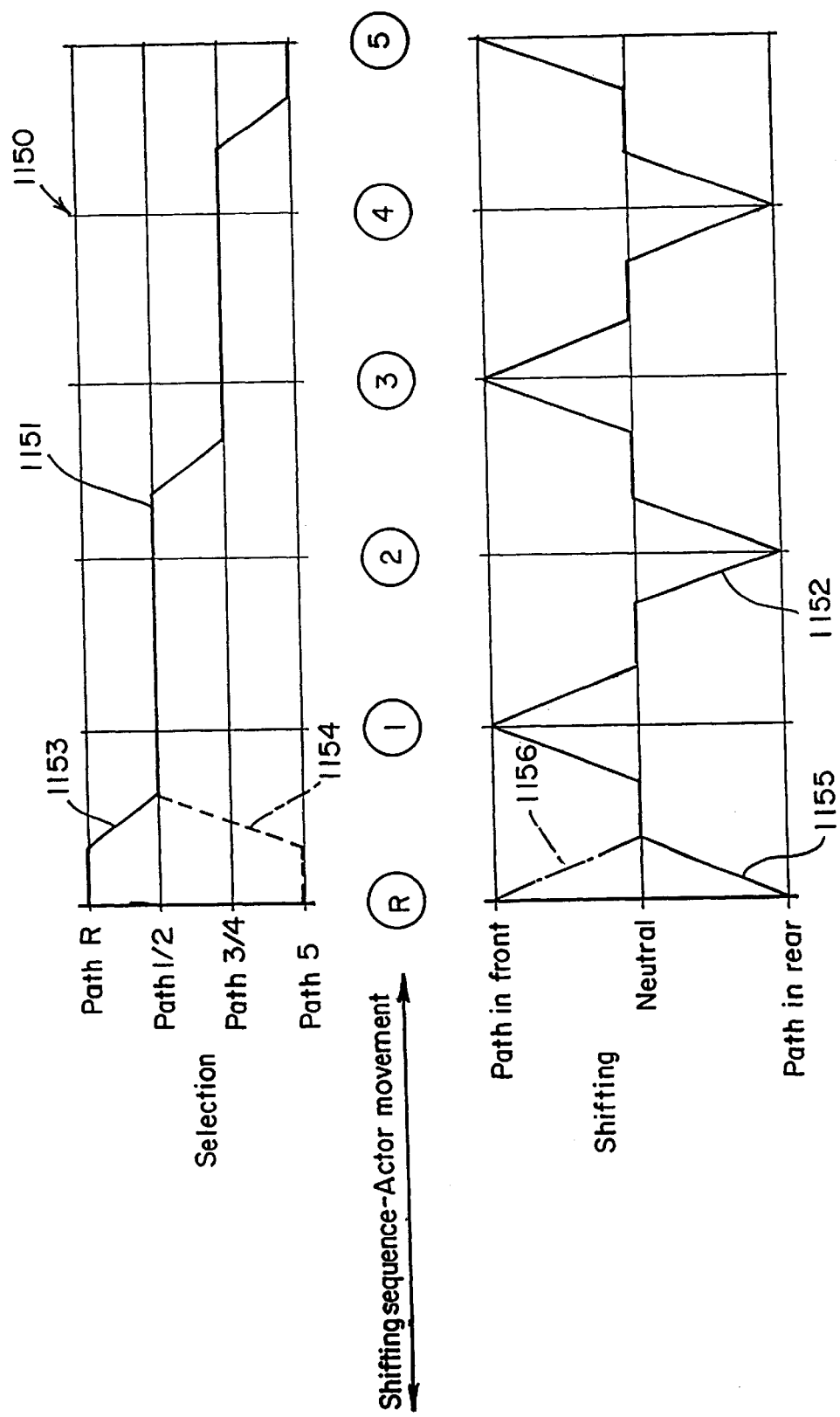

The diagrams of FIG. 23 illustrate the progress of the selection of and shifting into various gears. The upper diagram 1150 contains two curves 1151 and 1152. The curve 1151 represents the gear ratio selecting operation as a function of the position of the gear, and the curve 1152 denotes the gear shifting operation, again as a function of the position of the gear. The curve 1151 is shown in the lower diagram of FIG. 23. Starting at that portion 1153 of the curve 1151 which extends from the path R to the path for the gears 1 and 2 (see also FIGS. 17c and 17d), one can proceed with the selection into the path for the gears 3 and 4 or into the path for the gear 5. If the gate is designed in a manner as shown in FIG. 17d, the selection takes place in a manner as indicated by the broken line 1154, and the path for the gear 5 is then also the path for R in contrast to the gate which is shown in FIG. 17d, i.e., there is no separate path for R because the gear 5 and R are located in one and the same path. The curve 1152 is representative of the shifting operation between a position in a front portion of a path, a neutral position in the middle and a position in the rear portion of the gate. The curve 1155 is indicative of a modification of the gate shich is shown in FIGS. 17b and 17d, namely a gate wherein the reverse gear is located in a rear portion of a path. The gears one, three and five are disposed in the front portions and the gears two and four are located in the rear portions of the respective paths. The curve 1156 of FIG. 23 (shown by broken lines) is indicative of the gate which is shown in FIG. 17c, i.e., of a gate wherein the reverse gear R is located at the front end of the respective path. It will be seen that the curves 1151 and 1152 include clear-cut periodical portions, i.e., recurrent portions which can be followed repeatedly by resorting to periodically operated gearings in order to initiate the gear shifting and/or the gear ratio selecting operations. If the operation is carried out in a manner as indicated by the broken-line or dot-dash line curves of FIG. 23, it is also possible to achieve in such regions periodicities for example in that provision is made for planned (intentional) deflections in order to convert a scheme which is devoid of ideal periodicities into a scheme which actually exhibits such ideal periodicities. Such deflection or the utilization of deflection can be readily ascertained, for example, by comparing the FIGS. 20a to 20c with the FIGS. 21a to 21c.

Figure 24:
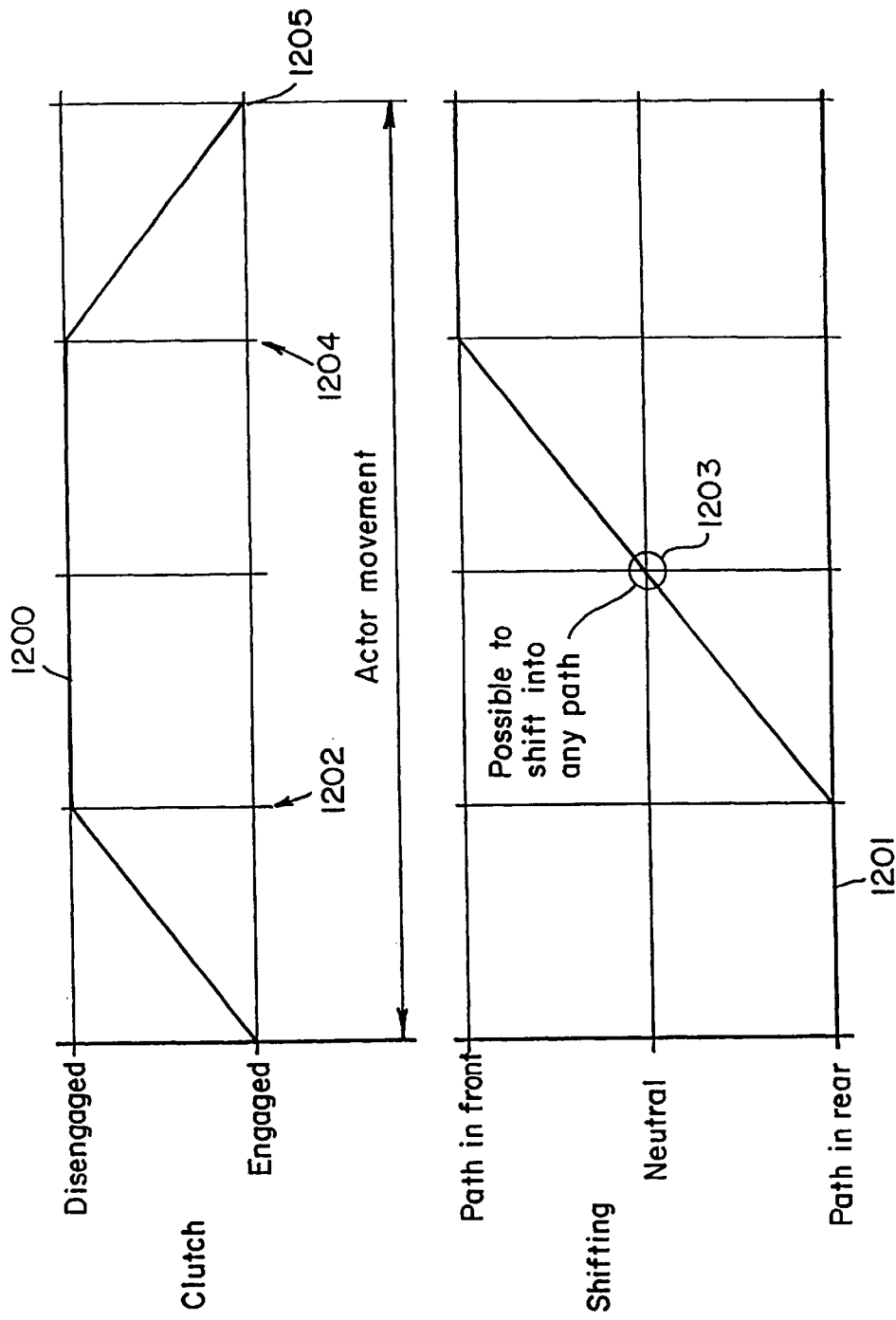

FIG. 24 illustrates the progress of the actuation of a clutch and of a gear shifting operation as a function of movements of the actor. The clutch can be actuated from an open or disengaged condition to a closed or engaged condition, and the gear shifting operation can proceed from a neutral position or point for example into a gear shifting path in a forward direction or into a gear shifting path in a rearward direction. The starting point of the curve 1200 is indicative of an engaged or closed condition of the clutch, and the clutch is thereupon disengaged or opened while the curve 1201 denoting the shifting into different gears remains unchanged (horizontal) or at least substantially unchanged. Once the clutch is disengaged, for example when the actor has completed a movement to the point 1202, the gear shifting operation begins, for example, by shifting into neutral gear at 1203. At this point, the gear shifting operation can be interrupted, at least for a short interval of time, in order to carry out a gear selecting operation. Thereafter, and proceeding from the point 1203, one can shift into a path in a forward direction or in a rearward direction to complete such operation when the movement of the actor has progressed to the point 1204. From this point on, the actor proceeds to effect a closing or engagement of the clutch, and such procedure is completed when the actor reaches the point 1205. FIG. 24 illustrates a presently preferred mode of relating or coupling the clutch actuating operation with the shifting into selected gears. A second actor can be utilised to effect the gear ratio selecting operation.

It can also be of advantage to employ plural actors including a first actor which initiates the actuation of the clutch and the gear ratio selecting operation, and a second actor which initiates the clutch actuating and the gear shifting operations. The clutch is disengaged prior to carrying out of a gear shifting or gear ratio selecting operation, and such actuation of the clutch is followed by the shifting or selecting step carried out by one of the actors; such step is followed by renewed engagement of the clutch. For example, if the transmission happens to be in the first gear, an actor can disengage the clutch, one of the two actors thereupon shifts from the first gear into neutral, the other actor (which has completed the clutch disengaging operation) thereupon selects a desired gear ratio, one of the actors thereupon effects a shifting into a desired gear (e.g., into second), and one of the actors thereafter reengages the clutch. If the shifting is to take place, for example, from the first gear into the third gear or into the fourth gear, i.e., into a gear which necessitates bypassing one or more gears, it might be advisable if the second actor, which is also designed to initiate the actuation of the clutch, prevents an unintentional or accidental engagement and renewed disengagement of the clutch in that the two actors actuate the clutch in parallel, i.e., that they simultaneously engage or simultaneously disengage the clutch. Furthermore, it might be of advantage if a mechanism or a gearing or an or-gate is employed to relate the actuations of the clutch by the two actors in such a way that the actor which initiates the operation of the clutch and the gear ratio selection is designed to permit a selection only when the transmission is in neutral and at the same time permits or effects an actuation of the clutch during shifting into neutral, and the actor which initiates the operation of the clutch and the gear selection permits the clutch to remain disengaged even though the other actor (which controls the clutch and the selection of gear ratios) would tend to engage the clutch.

Figure 25B:
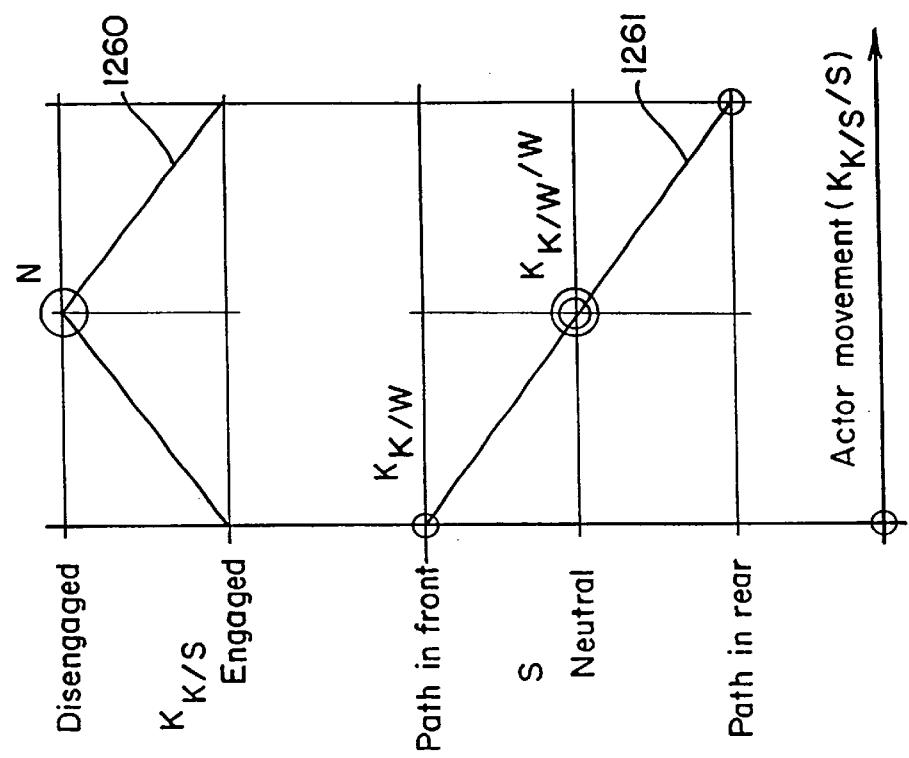
Figure 25A:
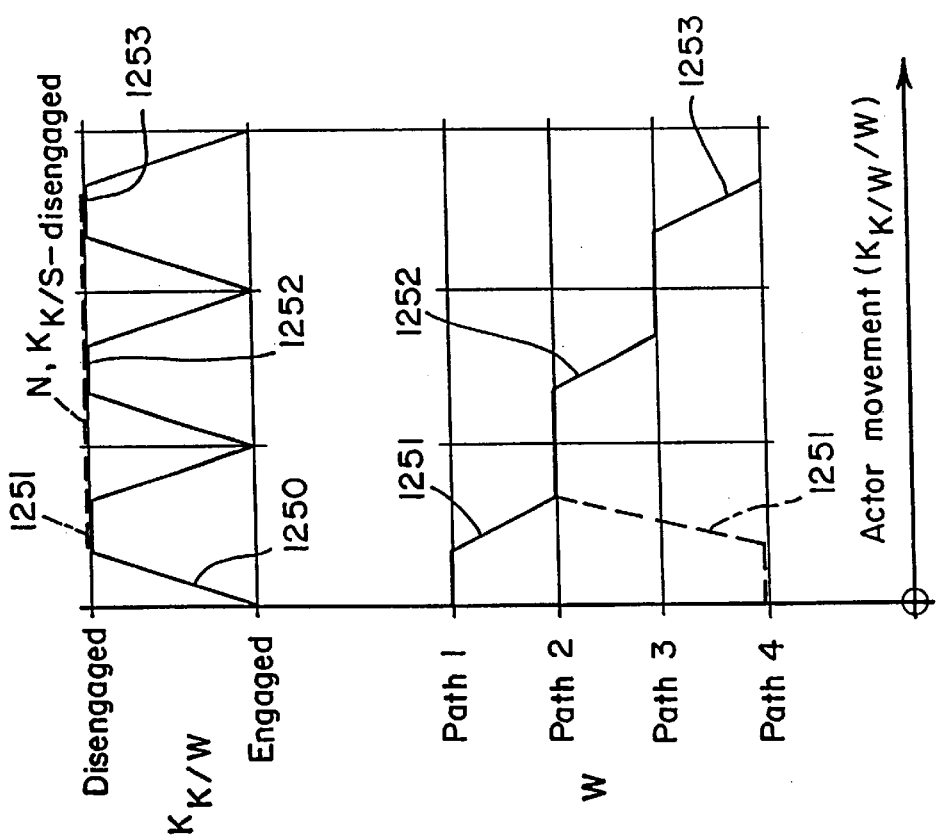

The above outlined procedure renders it possible to achieve, in a simple manner, an entirely free sequence of gear selections and the clutch actuation can overlap with the gear ratio selecting operation. Thus, by the simple expedient of actuating the clutch by both actors, one can achieve that the clutch actuating operation overlaps with the gear shifting operation in such a way that the operation to shift from a previously selected gear can be initiated even though the clutch is fully disengaged. It can also be of advantage if the clutch is already partially engaged before the shifting into a gear is completed but the gears of the transmission and the corresponding toothed sleeves of the transmission are in mesh with one another. This renders it possible to complete a shifting operation within a short interval of time due to savings in time resulting from the overlap between the actuation of the clutch and the actuation of the transmission. All this is achieved by the simple expedient of employing a first actor for the actuation of the clutch and the carrying out of the gear ratio selecting operation, and a second actor for the actuation of the clutch and the carrying out of the gear shifting operation. The exact mode of such operation will be explained with reference to FIGS. 25a and 25b. FIG. 25a illustrates the actuation of the clutch and of the transmission by the actor which controls the torque transmitting system and the selection of transmission gear ratios. The curve 1250 is indicative of various stages of engagement and disengagement of the clutch as a function of the extent of movement of the respective actor. The initial step involves a disengagement of the clutch which is fully disengaged at 1251. The clutch can be engaged again subsequent to shifting of the transmission (as shown by the solid line 1251') from the path 1 to the path 2 or (as shown at 1251" by broken lines) from the path 4 into the path 2, depending upon the existing or selected shifting scheme or program. Another change of paths can take place at 1252' while the clutch is again disengaged (as shown at 1252), namely from the path 2 into the path 3. A further change of paths (such as from the path 3 into the path 4, as indicated at 1253') can take place while the clutch is again disengaged (which is shown at 1253). The curve 1260 of FIG. 25b is indicative of the actuation of the clutch and the curve 1261 represents the gear shifting movements. As denoted by the curve 1260, the clutch is initially engaged, and is thereafter disengaged while the selection proceeds from the front portion of a path to neutral; the clutch is fully disengaged when the transmission is shifted into neutral. The selection which follows in the fully disengaged condition of the clutch is effected by the actor which initiates the clutch actuating and the gear ratio selecting operations. The selection can take place in a path forwardly or rearwardly, as shown in the lower portion of FIG. 25b, and the clutch is thereupon reengaged.

Figure 26:
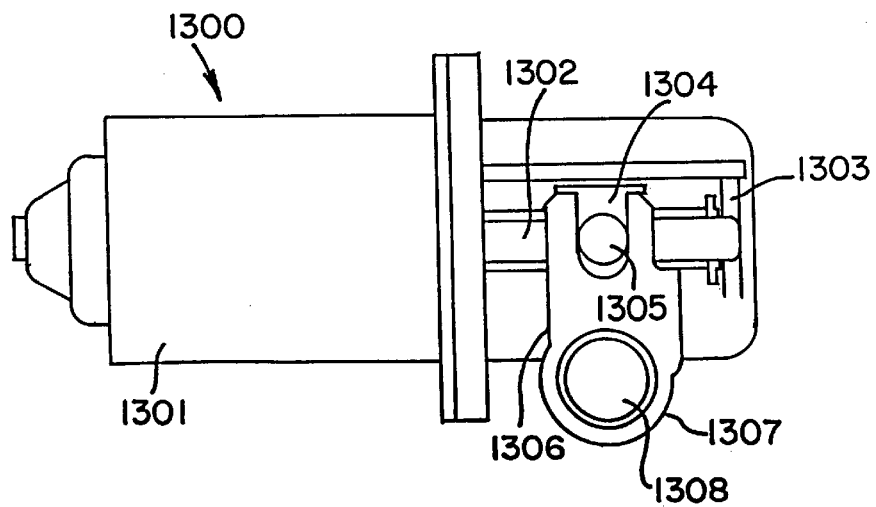
FIG. 26 an actuating arrangement.

FIG. 26 shows an actor 1300 for the shifting and selection of the ratio of the transmission, with a driving unit 1301, such as an electric motor. The output shaft of the motor is provided with a feed screw 1302 which is journalled at 1303. The feed screw 1302 drives a non-rotatably mounted but axially movable nut 1304 which is provided with at least one pin 1305. The pin 1305 extends into a claw 1306 which includes an annular portion 1307. For example, the annular portion 1307 surrounds the central shifting shaft 1308 of the transmission in such a way that axial shifting of the nut 1304 imparts a pivotal movement to the central shifting shaft which latter is held against axial movement. The nut 1304, which cannot turn, thus converts the rotary movement of the output shaft of the motor 1301, or more specifically of the feed screw 1302, into a linear movement (of the nut) and the lever, namely the claw 1306, converts the linear movements of the nut into a shifting or gear ratio selecting movement of the shaft 1308.

Figure 27:
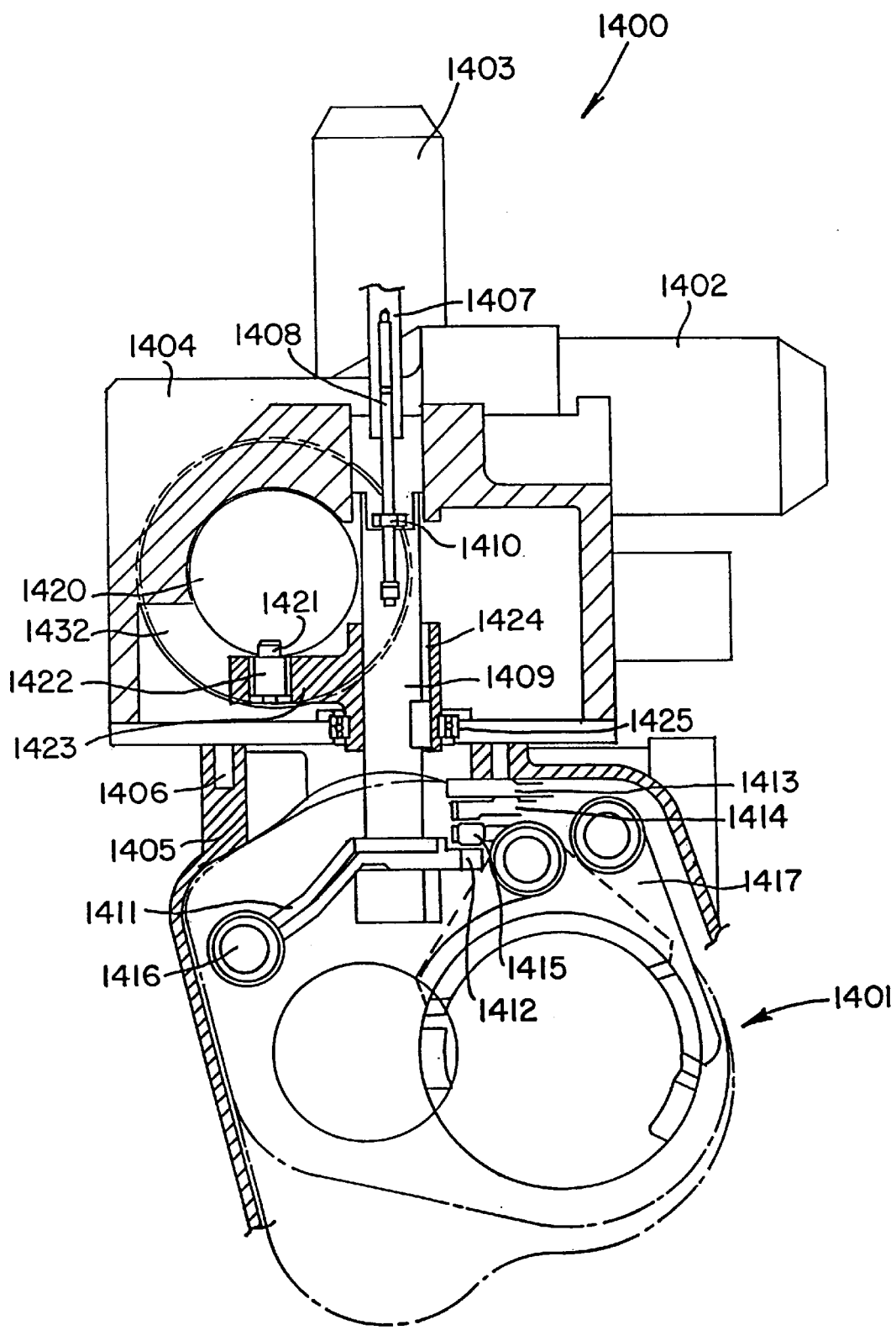
FIG. 27 an actuating arrangement.

FIG. 27 illustrates an actuating arrangement 1400 for a transmission 1401. This actuating arrangement serves to initiate an automated operation of a torque transmitting system and to initiate automated shifting and/or gear ratio selection by the transmission 1401. Such initiation is effected by two actors 1402, 1403 each of which can constitute an electric motor. The actor 1402 initiates the operation of the clutch and the shifting of the transmission into selected gears, whereas the actor 1403 effects the gear ratio selecting operation. The axes of the two actors are disposed at right angles to each other but such axes can also be parallel or the actors can be coaxial with one another. The actuating arrangement 1400 constitutes an integrated arrangement having a single (common) housing 1404 which is secured to the case or housing 1405 of the transmission 1401 by fastener means 1406, such as screws or the like. The actor 1403 is secured to or is integrated into the housing 1404, and its output shaft 1407 extends into the housing 1404. This output shaft 1407 constitutes an internally threaded feed screw which can mesh with an externally threaded feed screw 1408. When the feed screw 1407 is caused to rotate, the feed screw 1408, which is non-rotatably connected with the central shifting shaft 1409 of the transmission 1401, is caused to move forwardly or rearwardly. For example, the feed screw 1408 can be threadedly secured in the central shifting shaft 1409 and is fixed against rotation by a lock nut 1410. Therefore, when the feed screw 1408 performs an axial movement, it causes the central shifting or selector shaft 1409 to move axially and to carry out a gear ratio selecting operation.

The central shifting shaft 1409 is provided with shifting fingers 1411, 1412 which are disposed in the interior of the transmission 1401 and can be moved into actuating elements 1413, 1414, 1415, 1416 provided, for example, on a shifting fork 1417 for the establishment of an operative connection. The shifting fingers 1411, 1412 are projections or extensions of the central shifting shaft 1409 and extend substantially radially of and away from the latter into the receiving portions of the actuating elements. The actor 1403 can initiate a selection between the various gear ratios of the transmission.

The actor 1402 controls or regulates the actuation of the clutch as well as the shifting into various gears. The clutch is actuated by way of a cam disc and a pusher which engages the cam disc. The details of these features are shown in the following Figures.

The shifting into various gears is regulated as a result of rotation of the roller or cylinder cam 1420 in such a way that the actor 1402 can drive the roller by way of a worm gearing including a worm wheel. The peripheral surface of the roller 1420 is provided with a cam groove 1421 which receives a follower pin 1422. The modulation of the cam groove 1421 can be such that the pin 1422 can be displaced in the circumferential and/or in the axial direction of the roller 1420 so that the entraining means 1423 which is connected with the pin 1421 can turn the shifting shaft 1409 through a predeterminable angle to thus initiate an operation of the transmission to shift into a selected gear. The entraining means 1423 is provided with an internally toothed portion 1424 which meshes with external teeth provided on the central shifting shaft 1409 to thus ensure that any axial displacement of the central shifting shaft, in order to carry out a gear ratio selecting operation, is independent of the angular movement for the purpose of carrying out a gear shifting operation. A gear shifting operation involves an angular movement of the central shifting shaft 1409 about its own axis in a clockwise or in a counterclockwise direction; this causes the shifting fingers to act upon the motion receiving portions of the shifting forks 1417 and to displace these shifting forks in order to shift into a selected gear. The central shifting shaft 1409 is rotatable in a bearing 1425.

The actuating arrangement is an integrated unit which constitutes an aggregate adapted to be mounted on the transmission, and the transmission can be a manual change speed gear without the manually operable shifting means.

Figure 28:
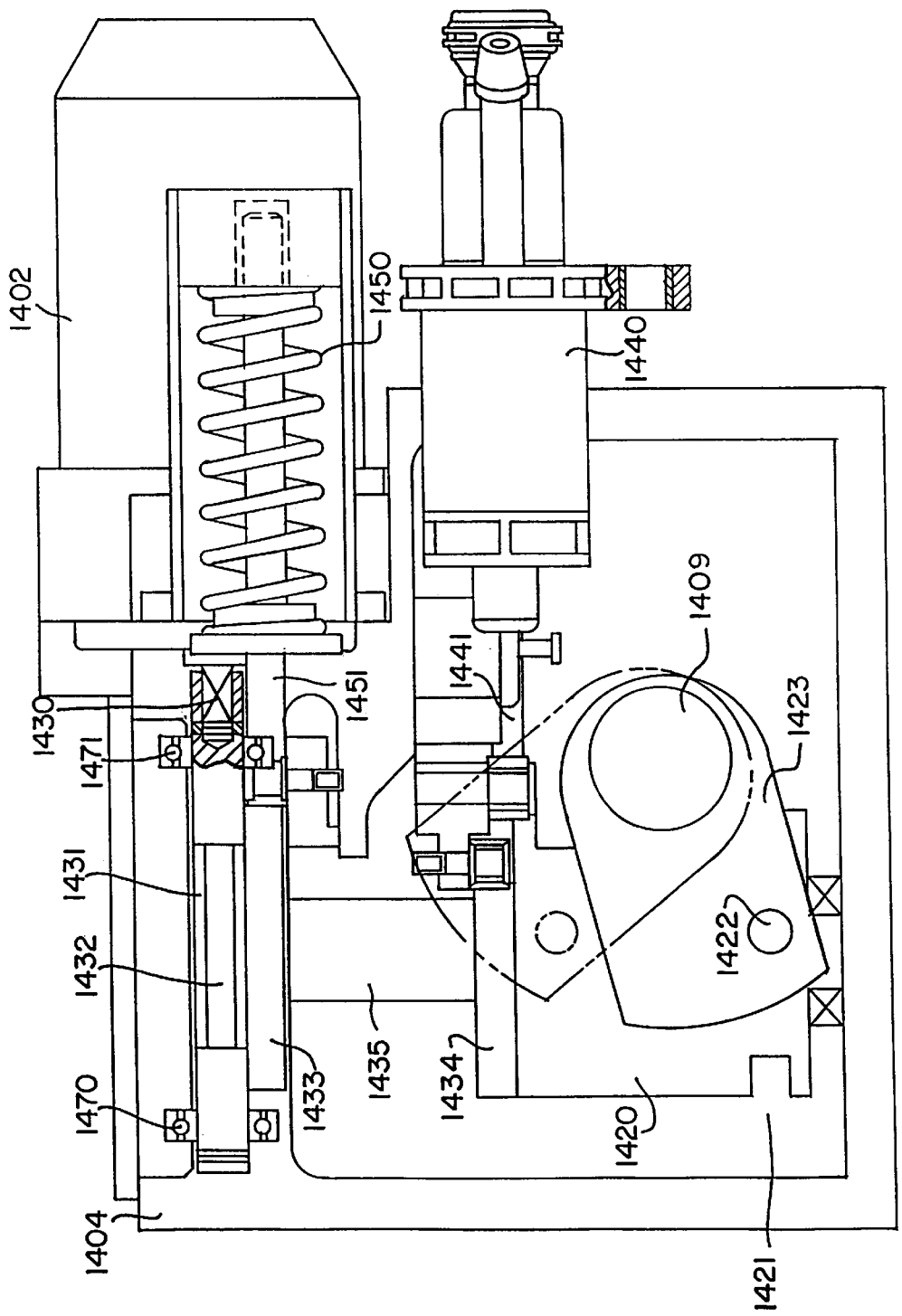
FIG. 28 an actuating arrangement.

FIG. 28 is another view of the actuating arrangement of FIG. 27 and shows, among other things, the actor 1402 which can constitute an electric motor. The output shaft 1430 of the electric motor drives a worm 1431 which meshes with a worm wheel 1432. The worm wheel 1432 is connected with a first disc cam 1433 and, by a distancing member 1435, with a further disc cam 1434 so that the parts 1431 to 1435 can rotate as a unit. The worm wheel 1432 is also connected with the roller 1420, e.g., in that the roller 1420 is connected or connectable with the cam disc 1434. It is also possible, and often desirable and advantageous, to make the worm wheel 1432, the disc cams 1433, 1434, the distancing member 1435 and the roller 1420 of one piece, e.g., as an injection molded part or from a metallic material. As mentioned above, the peripheral surface of the roller 1420 is provided with the cam groove 1421 for the follower pin 1422 of the actuating (rocking) means 1423. When the roller 1420 is caused to turn, the locus of penetration of the pin 1422 into the cam groove 1421 is shifted essentially in the axial direction of the roller so that the means or element 1423 is caused to pivot. The element 1423 and the central shifting shaft 1409 engage with each other by means of teeth or in any other suitable way so that the shaft 1409 is pivoted in response to pivoting of the element 1423. This renders it possible to carry out a planned or predetermined or predictable shifting of the transmission into a selected gear ratio.

Figure 29:
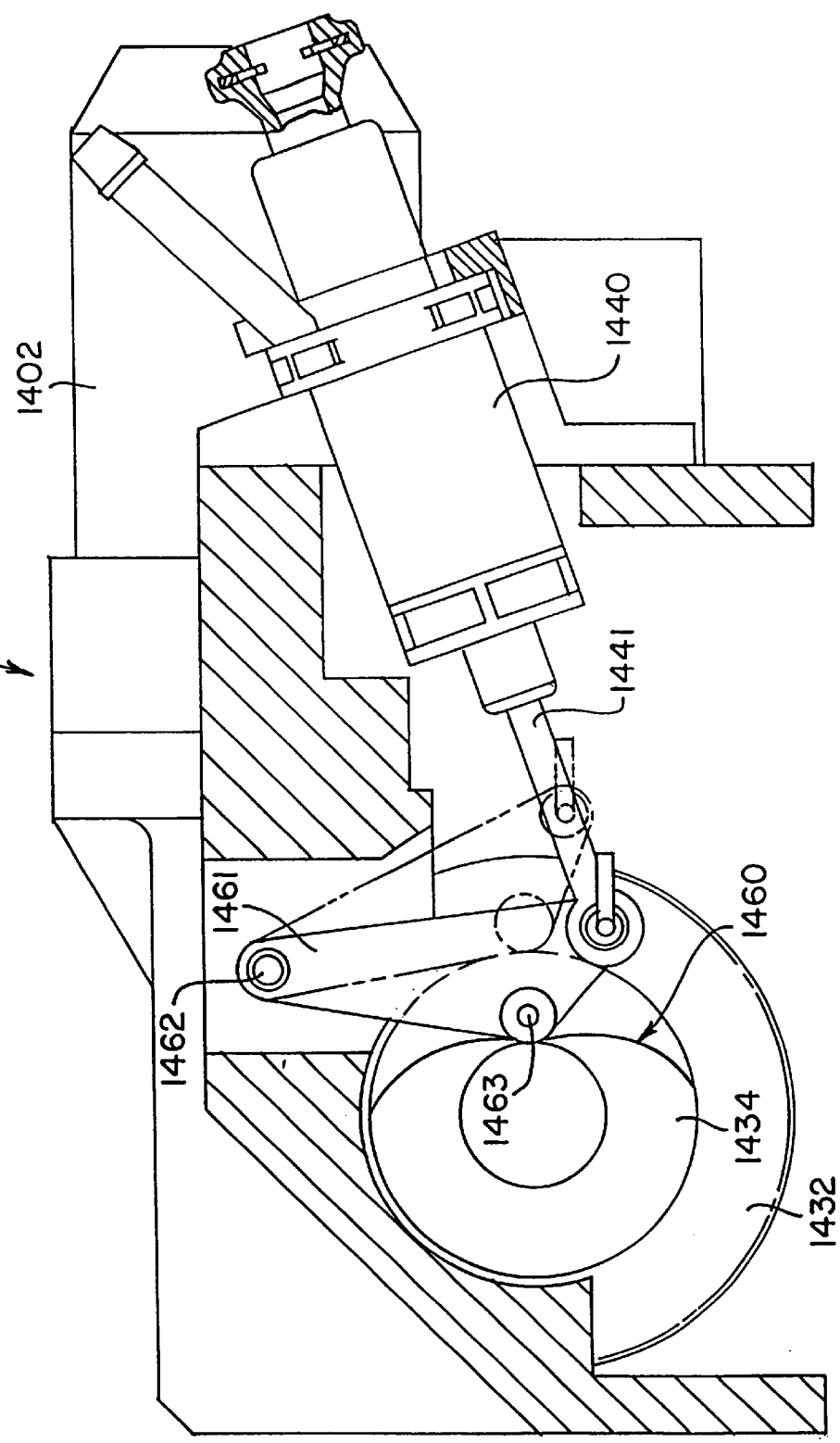
FIG. 29 an actuating arrangement.

In order to initiate the actuation of the torque transmitting system, such as a clutch, a hydraulic master cylinder 1440 is actuated by way of a pusher or piston rod 1441 and a follower which tracks the cam disc 1434. Reference should also be had to FIG. 29.

Figure 30:
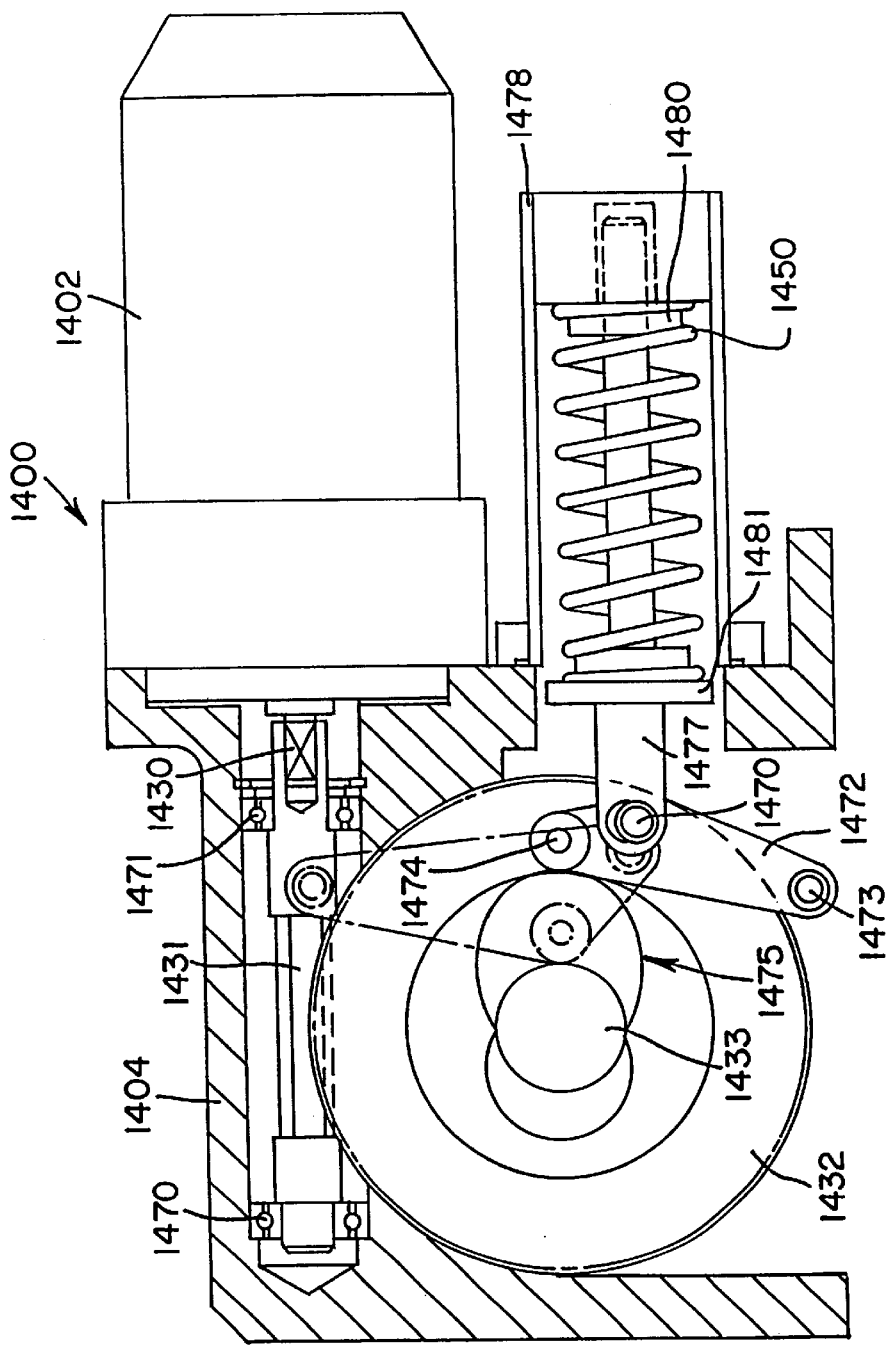
FIG. 30 an actuating arrangement.

Furthermore, an energy storing element 1450 is put to use to compensate for or to assist the force of the actor 1402, again by way of a pusher 1451 and a follower tracking the sam disc 1433. Reference should also be had to FIG. 30 which shows the manner in which the energy storing element 1450 acts upon various component parts.

FIG. 29 is a partly sectional view of the actuating arrangement 1400 and again shows the actor (electric motor) 1402. As mentioned before, the output shaft of the actor 1402 rotates the worm gearing including the worm wheel or worm gear 1432 which rotates the cam disc 1434. The latter has a peripheral cam profile 1460 which is configurated in such a way that it has a first portion of constant radius and a second portion having a region of maximum radius, a region of minimum radius and a region having a radius with a gradual transition between the maximum and minimum radii.

FIG. 29 further shows a lever 1461 which is pivotable at 1462 and carries a shoe or a roller follower (1463) in sliding or rolling engagement with the peripheral cam profile 1460 of the cam disc 1434. The lever 1461 is articulately connected with the pusher 1441 for the hydraulic master cylinder 1440, i.e., the cylinder 1440 is actuated in response to pivoting of the lever 1461 caused by rotation of the cam disc 1434. The master cylinder 1440 actuates the torque transmitting system by way of a hydraulic, pneumatic or other suitable motion transmitting arrangement.

The configuration of the peripheral cam face 1460 is such that a pivoting of the lever 1461 due to tracking (by the follower 1463) of a first portion of the cam face 1460 entails a disengagement of the clutch, the angular position of the lever 1461 thereupon remains substantially unchanged in order to maintain the clutch in the disengaged condition, and that a further portion of the cam face 1460 causes the lever 1461 to pivot in a direction to effect an engagement of the clutch.

FIG. 30 is another sectional view of the actuating arrangement 1400 and again shows the actor 1402 as well as the housing 1404. The output shaft 1430 of the actor (electric motor) 1402 drives the worm 1431 which mates with and rotates the worm wheel or worm gear 1432. The output shaft 1430 of the motor or actor 1402 is journalled in bearings 1470 and 1471. As mentioned before, the worm wheel 1432 is essentially non-rotatably connected with the cam disc 1433. A lever 1472 which is pivotably mounted at 1473 and carries a shoe or a roller follower (1474) in sliding or rolling engagement with the peripheral cam face 1475 of the cam disc 1433. The lever 1472 carries a stud 1476 or another suitable connector which is also secured to a pusher 1477 of the energy storing element 1450. The energy storing element 1450 is installed in a housing 1478 and cooperates with centering elements 1479, 1480. These centering elements extend in part into the respective end portions of the energy storing element 1450. The centering element 1480 is of one piece with or is connected to the housing 1478, and the centering element 1479 is connected to or of one piece with the pusher 1477. The pusher 1477 further comprises a collar 1481 or another suitable abutment which is in contact with the adjacent end convolution of the energy storing element 1450. Due to the engagement of the roller follower 1474 with the peripheral cam face 1475, a rotary movement of the cam disc 1433 results in a modulation of the movements of the pusher 1477 and hence of the energy which is being stored by the element 1450, such as a coil spring. Thus, the bias of the energy storing element 1450 is being modulated by the profile or cam face 1470 of the cam disc 1433. Therefore, the energy storing element 1450 assists at least certain stages of actuation of the actor (electric motor) 1402. The bias of the element 1450 can assist the actor 1402 for the purpose of shifting the transmission into a selected ratio and/or for the purpose of actuating the torque transmitting system (clutch).

Figure 31:
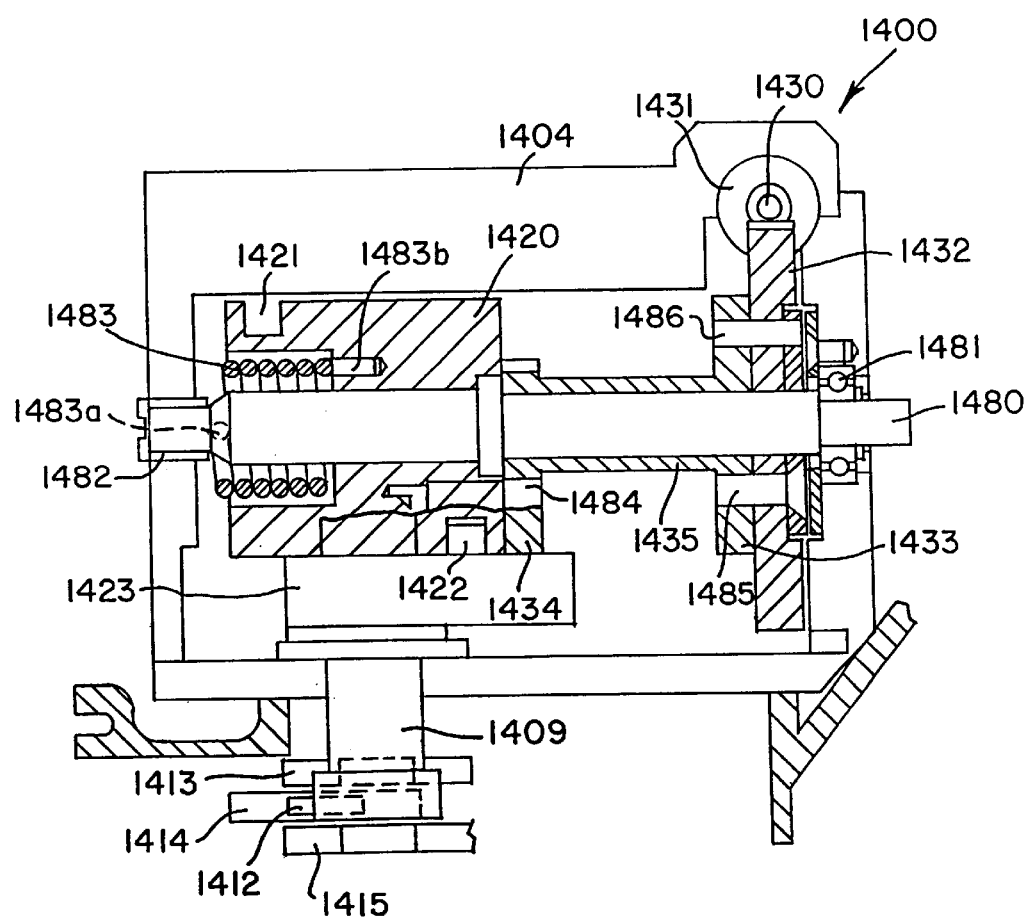
FIG. 31 an actuating arrangement.

FIG. 31 is a a further sectional view of the actuating arrangement 1400 and actor 1402. There are shown the output shaft 1430 of the actor (electric motor) 1402, the worm wheel 1432 to effect the movements of certain parts in the transmission as well as to actuate the torque transmitting system. The worm wheel 1432 is rotatably mounted on a shaft 1480 which is installed in bearings 1481 and 1482, such as antifriction bearings, friction bearings or needle bearings. This worm wheel is non-rotatably connected with the parts 1433, 1434, 1435 by fastener means 1485, 1486, such as rivets, screws, plug-in connectors or snap-on or snap-in connectors. However, and as already explained before, the parts 1433, 1434 and 1435 can be of one piece. These parts are rotatable on the shaft 1480. In lieu of being of one piece therewith, the cam disc 1434 can be secured to the roller or cylinder cam 1420 by fastener means 1484 which, in turn, are rotatably mounted on the shaft 1480. The peripheral surface of the roller 1420 has the at least one cam groove 1421 for the folower 1422 serving to pivot the lever 1423 and thus turn the central shifting shaft 1409 of the transmission. This causes the finger 1412 to move the gear shifting forks 1413 to 1415 in such a way that they can shift the transmission into the desired (selected) gears.

An energy storing element 1483 is interposed between the housing 1404 and the roller 1420, and this energy storing element can constitute or include a coil spring or a torsion spring. The end portion 1483*a* of the spring 1483 is anchored in the housing 1404 and the other end portion 1483*b* is anchored in the roller 1420. In lieu of the establishment of a form-locking connection (at 1483*b*) between the spring 1483 and the roller 1420, it is also possible to resort to a force-locking connection or to a mere frictional engagement between them. The spring 1483 can assist the actor 1402 in effecting changes in the extent of engagement or disengagement of the clutch and/or in shifting the transmission into a selected gear. It is also possible to design the form-locking or another suitable connection between the end portion 1483*b* of the spring 1483 and the roller 1420 in such a way that the spring does not assist the actor 1402 during certain stages of operation but that it does assist the actor during one or more additional or other stages of operation. Furthermore, the arrangement can be such that the spring 1483 is designed and installed to oppose one or more stages of operation of the actor.

The patent claims which were filed with this application are merely proposals without prejudicing the acquisition of additional and/or broader patent protection. Furthermore, applicants and their assignee reserve the right to claim features which, heretofore, can be found solely in the specification and/or in the drawings.

References made in the dependent claims to preceding claims are indicative of additional developments of the matter of the independent claims, such as of combinations of the features recited in the parent claims and in the respective dependent claims; they do not constitute a waiver of the acquisition of independent protection for the features of such dependent claims.

Thus, the features recited in the dependent claims can constitute independent inventions having a standing of their own regardless of the subject matter recited in the respective parent claims.

Moreover, the invention is not limited to the described and illustrated embodiment or embodiments. On the contrary, the invention encompasses numerous changes and modifications including, for example, all such modifications, elements, combinations and/or materials which are or which can be deemed to be novel and can be derived from or arrived at upon perusal of the specification and/or the present claims and/or the present drawings, not only as regards the structural features but also concerning the method or methods and/or the process or processes of manufacturing, assembling, converting, modifying, testing and/or others.

We claim:

1. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

at least two actors; and an electronic control unit operatively connected to the two actors, one of the two actors actuating, in a predetermined manner, two of the first, second and third means for the regulation of the transmission of torque, gear shifting or gear ratio selecting operations and the other of the two actors actuating, in a predetermined manner, one of the first, second, and third means for the regulation of the transmission of torque, gear shifting or gear ratio selecting operation and the other of the two actors actuating, in a predetermined manner, two of the first, second and third means for the initiation of the transmission of torque, gear shifting and gear ratio selecting operations.

2. The actuating arrangement according to claim 1, wherein the one actor actuates the first means and the second means, and the other actor actuates the first means and the third means.

3. The actuating arrangement according to claim 1, wherein the one actor actuates the second means and the third means, and the other actor actuates the first means and the second means.

4. The actuating arrangement according to claim 1, wherein the one actor actuates the first means and the third means, and the other actor actuates at least the second means.

5. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

an actor;

an electronic control unit operatively connected to the actor to regulate the actuation, in a predetermined manner, of the first means, second means and third means for the regulation of the transmission of torque, gear shifting and gear ratio selecting operations; and a second actor operatively connected to the electronic control unit which includes a central computer, the control unit operates the first actor and the second actor, the first actor actuates two of the first means, second means and third means for the initiation of the transmission of torque, gear shifting and gear ratio selecting operations, and the second actor actuates one of the first means, second means and third means for the initiation of the transmission of torque, gear shifting or gear ratio selecting operations which is not actuated by the first actor, wherein the first actor initiates the transmission of torque and the gear shifting operations, and the second actor initiates the gear selecting operation.

6. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

an actor;

an electronic control unit operatively connected to the actor to regulate the actuation, in a predetermined manner, of the first means, second means and third means for the regulation of the transmission of torque, gear shifting and gear ratio selecting operations; and a second actor operatively connected to the electronic control unit which includes a central computer, the control unit operates the first actor and the second actor, the first actor actuates two of the first means, second means and third means for the initiation of the transmission of torque, gear shifting and gear ratio selecting operations, and the second actor actuates one of the first means, second means and third means for the initiation of the transmission of torque, gear shifting or gear ratio selecting operations which is not actuated by the first actor, wherein the first actor initiates the transmission of torque and the gear ratio selection operations, and the second actor initiates the gear shifting operation.

7. An actuating arrangement for motor vehicles having an engine, a torque transmitting system and a transmission, the actuating arrangement comprising:

a first means for use with the torque transmitting system for initiating, discontinuing or regulating the transmission of torque;

at least one shaft for use with the transmission, the at least one shaft being actuatable to select a gear ratio or to shift within a gear shifting gate to one of a plurality of gear shifting paths;

a second means for use with the transmission for the initiation of the shifting operation within the gear shifting paths;

a third means for use with the transmission for the initiation of the gear ratio selecting operation between the gear shifting paths and for engaging the gearing of the transmission;

at least one actor;

an electronic control unit operatively connected to the at least one actor, the at least one actor actuates at least two of the first means, second means and third means to regulate the transmission of torque, gear shifting and gear ratio selecting operations; and a second actor operatively connected to the electronic control unit which includes a central computer, the control unit operates the first actor and the second actor, the first actor actuates two of the first means, second means and third means for the initiation of the transmission of torque, gear shifting and gear ratio selecting operations, and the second actor actuates one of the first means, second means and third means for the initiation of the transmission of torque, gear shifting or gear ratio selecting operations which is not actuated by the first actor, wherein the first actor initiates the transmission of torque and gear shifting operations, and the second actor initiates the gear ratio selecting operation.

8. An actuating arrangement for motor vehicles having an engine, a torque transmitting system and a transmission, the actuating arrangement comprising:

a first means for use with the torque transmitting system for initiating, discontinuing or regulating the transmission of torque;

at least one shaft for use with the transmission, the at least one shaft being actuatable to select a gear ratio or to shift within a gear shifting gate to one of a plurality of gear shifting paths;

a second means for use with the transmission for the initiation of the shifting operation within the gear shifting paths;

a third means for use with the transmission for the initiation of the gear ratio selecting operation between the gear shifting paths and for engaging the gearing of the transmission;

at least one actor;

an electronic control unit operatively connected to the at least one actor, the at least one actor actuates at least two of the first means, second means and third means to regulate the transmission of torque, gear shifting and gear ratio selecting operations; and a second actor operatively connected to the electronic control unit which includes a central computer, the control unit operates the first actor and the second actor, the first actor actuates two of the first means, second means and third means for the initiation of the transmission of torque, gear shifting and gear ratio selecting operations, and the second actor actuates one of the first means, second means and third means for the initiation of the transmission of torque, gear shifting or gear ratio selecting operations which is not actuated by the first actor, wherein the first actor initiates the transmission of torque and the gear ratio selecting operations, and the second actor initiates the gear shifting operation.

9. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

an actor; and an electronic control unit operatively connected to the actor to regulate the actuation, in a predetermined manner, of the first means, second means and third means for the regulation of the transmission of torque, gear shifting and gear ratio selecting operations, wherein the actor having a driving element, the actor converting, by at least one transfer gearing, a driving movement of the driving element into movements of at least two of the first means, second means and third means for the initiation of the transmission of torque, gear shifting or gear ratio selecting operation.

10. The actuating arrangement according to claim 9, wherein the at least one transfer gearing is comprised of one of a cam gearing, a disc cam mechanism, a geneva movement, a slider crank, a lifting crank assembly, a worm gearing or a planetary, the at least one transfer gearing initiating at least one of the transmission of torque, gear shifting or gear ratio selecting operations.

11. The actuating arrangement according to claim 10, wherein the at least one transfer gearing is a unidirectionally acting cam gearing.

12. The actuating arrangement according to claim 10, wherein the at least one transfer gearing is a cam gearing with a form-locking coupling.

13. The actuating arrangement according to claim 12, wherein the form-locking coupling is a lever that selectively enters a groove in the cam.

14. The actuating arrangement according to claim 10, wherein the at least one transfer gearing is a cam gearing that effects one of an axial displacement, a radial displacement or a pivotal movement of a lever that is provided with a roller.

15. The actuating arrangement according to claim 10, wherein the at least one transfer gearing is a cam gearing, a roller travels along a surface of the cam to initiate the movement of at least one of the first means, second means or third means in response to an axial or radial displacement of said roller.

16. An actuating arrangement for motor vehicles having an engine, a torque transmitting system and a transmission, the actuating arrangement comprising:

a first means for use with the torque transmitting system for initiating, discontinuing or regulating the transmission of torque;

at least one shaft for use with the transmission, the at least one shaft being actuatable to select a gear ratio or to shift within a gear shifting gate to one of a plurality of gear shifting paths;

a second means for use with the transmission for the initiation of the shifting operation within the gear shifting paths;

a third means for use with the transmission for the initiation of the gear ratio selecting operation between the gear shifting paths and for engaging the gearing of the transmission;

at least one actor; and an electronic control unit operatively connected to the at least one actor, the at least one actor actuates at least two of the first means, second means and third means to regulate the transmission of torque, gear shifting and gear ratio selecting operations, wherein the at least one actor having a driving element, the at least one actor converting, by at least one transfer gearing, a driving movement of the driving element into movements of at least two of the first means, second means and third means for the initiation of the transmission of torque, gear shifting or gear ratio selecting operation.

17. The actuating arrangement according to claim 16, wherein the at least one transfer gearing is comprised of one of a cam gearing, a disc cam mechanism, a geneva movement, a slider crank, a lifting crank assembly, a worm gearing or a planetary, the at least one transfer gearing initiating at least one of the transmission of torque, gear shifting or gear ratio selecting operations.

18. The actuating arrangement according to claim 17, wherein the at least one transfer gearing is a unidirectionally acting cam gearing.

19. The actuating arrangement according to claim 17, wherein the at least one transfer gearing is a cam gearing with a form-locking coupling.

20. The actuating arrangement according to claim 19, wherein the form-locking coupling is a lever that selectively enters a groove in the cam.

21. The actuating arrangement according to claim 16, wherein the at least one transfer gearing is a cam gearing that effects one of an axial displacement, a radial displacement or a pivotal movement of a lever that is provided with a roller.

22. The actuating arrangement according to claim 16, wherein the at least one transfer gearing is a cam gearing, a roller travels along a surface of the cam to initiate the movement of at least one of the first means, second means or third means in response to an axial or radial displacement of said roller.

23. An actuating arrangement for motor vehicles having an engine, a torque transmitting system and a transmission, the actuating arrangement comprising:
a first means for use with the torque transmitting system for initiating, discontinuing or regulating the transmission of torque;
at least one second means for use with the transmission for initiating a gear shifting operation within one of a plurality of gear shifting paths;
a third means for use with the transmission for initiating a gear ratio selecting operation between the gear shifting paths;
at least one actor; and
an electronic control unit operatively connected to the at least one actor, the at least one actor activating, in a predetermined manner, one of the first means, second means and third means for the regulation of the transmission of torque, gear shifting or gear ratio selecting operation, wherein the at least one actor having a driving element, the at least one actor converting, by at least one transfer gearing, a driving movement of the driving element into movements of at least two of the first means, second means and third means for the initiation of the transmission of torque, gear shifting or gear ratio selecting operation.

24. The actuating arrangement according to claim 23, wherein the at least one transfer gearing is comprised of one of a cam gearing, a disc cam mechanism, a geneva movement, a slider crank, a lifting crank assembly, a worm gearing or a planetary, the at least one transfer gearing initiating at least one of the transmission of torque, gear shifting or gear ratio selecting operations.

25. The actuating arrangement according to claim 24, wherein the at least one transfer gearing is a unidirectionally acting cam gearing.

26. The actuating arrangement according to claim 24, wherein the at least one transfer gearing is a cam gearing with a form-locking coupling.

27. The actuating arrangement according to claim 26, wherein the form-locking coupling is a lever that selectively enters a groove in the cam.

28. The actuating arrangement according to claim 23, wherein the at least one transfer gearing is a cam gearing that effects one of an axial displacement, a radial displacement or a pivotal movement of a lever that is provided with a roller.

29. The actuating arrangement according to claim 23, wherein the at least one transfer gearing is a cam gearing, a roller travels along a surface of the cam to initiate the movement of at least one of the first means, second means or third means in response to an axial or radial displacement of said roller.

30. An actuating arrangement for motor vehicles having an engine, a torque transmitting system and a transmission, the actuating arrangement comprising:
a first means for use with the torque transmitting system for initiating, discontinuing or regulating the transmission of torque;
at least one second means for use with the transmission for initiating a gear shifting operation within one of a plurality of gear shifting paths;
a third means for use with the transmission for initiating a gear ratio selecting operation between the gear shifting paths;
at least one actor; and
an electronic control unit operatively connected to the at least one actor, the at least one actor activating, in a predetermined manner, one of the first means, second means and third means for the regulation of the transmission of torque, gear shifting or gear ratio selecting operation, wherein a driving movement of the at least one actor is converted by a transfer gearing into an actuating movement for initiating the transmission of torque, shifting of the gear or selecting of the gear ratio, the kinematics of the at least one actor determine the characteristics of the actuation.

31. The actuating arrangement according to claim 30, wherein a sequence of functions for the initiation of at least two of the functions of initiating, shifting or selecting is carried out by a hydrostatic assembly that includes a displaceable piston.

32. The actuating arrangement according to claim 31, wherein the hydraulic assembly includes a plurality of valves which are activatable to respectively initiate the transmission of torque, the gear shifting or the gear ratio selecting operation.

33. An actuating arrangement for motor vehicles having an engine, a torque transmitting system and a transmission, the actuating arrangement comprising:
a first means for use with the torque transmitting system for initiating, discontinuing or regulating the transmission of torque;
at least one second means for use with the transmission for initiating a gear shifting operation within one of a plurality of gear shifting paths;
a third means for use with the transmission for initiating a gear ratio selecting operation between the gear shifting paths;
at least two actors; and
an electronic control unit operatively connected to the two actors, one of the two actors actuating, in a predetermined manner, two of the first, second and third means for the regulation of the transmission of torque, gear shifting or gear ratio selecting operations and the other of the two actors actuating, in a predetermined manner, one of the first, second, and third means for the regulation of the transmission of torque, gear shifting or gear ratio selecting operation, wherein a driving movement of the at least two actors is converted by a transfer gearing into an actuating movement for initiating the transmission of torque, shifting of the gear or selecting of the gear ratio, the kinematics of the at least two actors determine the characteristics of the actuation.

34. The actuating arrangement according to claim 33, wherein a sequence of functions for the initiation of at least two of the functions of initiating, shifting or selecting is carried out by a hydrostatic assembly that includes a displaceable piston.

35. The actuating arrangement according to claim 34, wherein the hydraulic assembly includes a plurality of valves which are activatable to respectively initiate the transmission of torque, the gear shifting or the gear ratio selecting operation.

36. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

an actor; and an electronic control unit operatively connected to the actor to regulate the actuation, in a predetermined manner, of the first means, second means and third means for the regulation of the transmission of torque gear shifting and gear ratio selecting operations, wherein a driving movement of the actor is converted by a transfer gearing into an actuating movement for initiating the transmission of torque, shifting of the gear or selecting of the gear ratio, the kinematics of the actor determine the characteristics of the actuation.

37. The actuating arrangement according to claim 36, wherein a sequence of functions for the initiation of at least two of the functions of initiating, shifting or selecting is carried out by a hydrostatic assembly that includes a displaceable piston.

38. The actuating arrangement according to claim 37, wherein the hydraulic assembly includes a plurality of valves which are activatable to respectively initiate the transmission of torque, the gear shifting or the gear ratio selecting operation.

39. An actuating arrangement for motor vehicles having an engine, a torque transmitting system and a transmission, the actuating arrangement comprising:

a first means for use with the torque transmitting system for initiating, discontinuing or regulating the transmission of torque;

at least one shaft for use with the transmission, the at least one shaft being actuatable to select a gear ratio or to shift within a gear shifting gate to one of a plurality of gear shifting paths;

a second means for use with the transmission for the initiation of the shifting operation within the gear shifting paths;

a third means for use with the transmission for the initiation of the gear ratio selecting operation between the gear shifting paths and for engaging the gearing of the transmission;

at least one actor; and an electronic control unit operatively connected to the at least one actor, the at least one actor actuates at least two of the first means, second means and third means to regulate the transmission of torque, gear shifting and gear ratio selecting operations, wherein a driving movement of the at least one actor is converted by a transfer gearing into an actuating movement for initiating the transmission of torque, of the gear or selecting of the gear ratio, the kinematics of the at least one actor determine the characteristics of the actuation.

40. The actuating arrangement according to claim 39, wherein a sequence of functions for the initiation of at least two of the functions of initiating, shifting or selecting is carried out by a hydrostatic assembly that includes a displaceable piston.

41. The actuating arrangement according to claim 40, wherein the hydraulic assembly includes a plurality of valves which are activatable to respectively initiate the transmission of torque, the gear shifting or the gear ratio selecting operation.

42. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

at least one actor; and an electronic control unit operatively connected to the at least one actor, the at least one actor activating, in a predetermined manner, one of the first means, second means and third means for the regulation of the transmission of torque, gear shifting or gear ratio selecting operation, wherein at least one of the transmission of torque, gear shifting and the gear ratio selecting operation can be imaged at the periphery or in the axial direction of a cylinder, either periodically or in series, and is carried out in response to the setting in motion of the cylinder either in a circumferential direction or axially to thus initiate the operation of the transmission of torque and of the transmission with a sequentially proper periodicity.

43. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

at least two actors; and an electronic control unit operatively connected to the two actors, one of the two actors actuating, in a predetermined manner, two of the first, second and third means for the regulation of the transmission of torque, gear shifting or gear ratio selecting operations and the other of the two actors actuating, in a predetermined manner, one of the first, second, and third means for the regulation of the transmission of torque, gear shifting or gear ratio selecting operation, wherein at least one of the transmission of torque, gear shifting and the gear ratio selecting operation can be imaged at the periphery or in the axial direction of a cylinder, either periodically or in series, and is carried out in response to the setting in motion of the cylinder either in a circumferential direction or axially to thus initiate the operation of the transmission of torque and of the transmission with a sequentially proper periodicity.

44. An actuating arrangement for motor vehicles having an engine, a torque transmitting system and a transmission, the actuating arrangement comprising:

a first means for use with the torque transmitting system for initiating, discontinuing or regulating the transmission of torque;

at least one second means for use with the transmission for initiating a gear shifting operation within one of a plurality of gear shifting paths;

a third means for use with the transmission for initiating a gear ratio selecting operation between the gear shifting paths;

an actor; and an electronic control unit operatively connected to the actor to regulate the actuation, in a predetermined manner, of the first means, second means and third means for the regulation of the transmission of torque, gear shifting and gear ratio selecting operations, wherein at least one of the transmission of torque, gear shifting and the gear ratio selecting operation can be imaged at the periphery or in the axial direction of a cylinder, either periodically or in series, and is carried out in response to the setting in motion of the cylinder either in a circumferential direction or axially to thus initiate the operation of the transmission of torque and of the transmission with a sequentially proper periodicity.

45. An actuating arrangement for motor vehicles having an engine, a torque transmitting system and a transmission, the actuating arrangement comprising:

a first means for use with the torque transmitting system for initiating, discontinuing or regulating the transmission of torque;

at least one shaft for use with the transmission, the at least one shaft being actuatable to select a gear ratio or to shift within a gear shifting gate to one of a plurality of gear shifting paths;

a second means for use with the transmission for the initiation of the shifting operation within the gear shifting paths;

a third means for use with the transmission for the initiation of the gear ratio selecting operation between the gear shifting paths and for engaging the gearing of the transmission;

at least one actor; and an electronic control unit operatively connected to the at least one actor, the at least one actor actuates at least two of the first means, second means and third means to regulate the transmission of torque, gear shifting and gear ratio selecting operations, wherein at least one of the transmission of torque, gear shifting and the gear ratio selecting operation can be imaged at the periphery or in the axial direction of a cylinder, either periodically or in series, and is carried out in response to the setting in motion of the cylinder either in a circumferential direction or axially to thus initiate the operation of the transmission of torque and of the transmission with a sequentially proper periodicity.

46. An actuating arrangement for motor vehicles having an engine, a torque transmitting system and a transmission, the actuating arrangement comprising:

a first means for use with the torque transmitting system for initiating, discontinuing or regulating the transmission of torque;

at least one shaft for use with the transmission, the at least one shaft being actuatable to select a gear ratio or to shift within a gear shifting gate to one of a plurality of gear shifting paths;

a second means for use with the transmission for the initiation of the shifting operation within the gear shifting paths;

a third means for use with the transmission for the initiation of the gear ratio selecting operation between the gear shifting paths and for engaging the gearing of the transmission;

at least one actor; and an electronic control unit operatively connected to the at least one actor, the at least one actor actuates at least two of the first means, second means and third means to regulate the transmission of torque, gear shifting and gear ratio selecting operations, wherein the first means, second means and third means are disposed externally of a housing of the transmission to automate the gear shifting, the gear ratio selecting and the transmission of torque operations, the first, second and third means act upon the shaft in the interior of the transmission by a transfer device.

47. The actuating arrangement according to claim 46, wherein the at least one actor is disposed externally of the housing of the transmission.

* * * * *